(12) United States Patent
Nishimura et al.

(10) Patent No.: US 7,747,144 B2
(45) Date of Patent: Jun. 29, 2010

(54) INFORMATION PROCESSING APPARATUS, INFORMATION PROCESSING METHOD, RECORDING MEDIUM, CONTROL

(75) Inventors: Hajime Nishimura, Kanagawa (JP); Tamon Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 1419 days.

(21) Appl. No.: 10/262,219

(22) Filed: Sep. 30, 2002

(65) Prior Publication Data
US 2003/0081938 A1      May 1, 2003

(30) Foreign Application Priority Data

| Oct. 1, 2001 | (JP) | ............................. 2001-304961 |
| Oct. 9, 2001 | (JP) | ............................. 2001-311220 |
| Oct. 18, 2001 | (JP) | ............................. 2001-320110 |

(51) Int. Cl.
*H04N 5/00*      (2006.01)

(52) U.S. Cl. ........................ 386/125; 386/95; 386/124; 386/126

(58) Field of Classification Search ......... 386/124–126, 386/95, 104–106
See application file for complete search history.

(56) References Cited

U.S. PATENT DOCUMENTS

| 6,148,140 A | * | 11/2000 | Okada et al. ................. 386/105 |
| 6,629,194 B2 | * | 9/2003 | Kumar et al. ............... 711/104 |
| 6,862,401 B1 | * | 3/2005 | Higashida et al. ........... 386/100 |

* cited by examiner

*Primary Examiner*—Marsha D Banks Harold
*Assistant Examiner*—Daniel Tekle
(74) *Attorney, Agent, or Firm*—Frommer Lawrence & Haug LLP; William S. Frommer; Thomas F. Presson

(57) ABSTRACT

The invention is associated with an information processing apparatus and method, a control program for the information apparatus, and a recording medium recording the control program. As directed by a host apparatus, control data are reproduced by controlling access means, outputting at least file control data to a host apparatus, and at least identification data are held in a predetermined memory; in response to a read directive based on the control data transmitted from the host apparatus, a control unit is sequentially detected in which the desired file associated with the read directive is sequentially recorded on the basis of the identification data held in the predetermined memory; and the access means is controlled on the basis of a result of the detection to sequentially reproduce and output data of files associated with the read directive to the host apparatus.

14 Claims, 52 Drawing Sheets

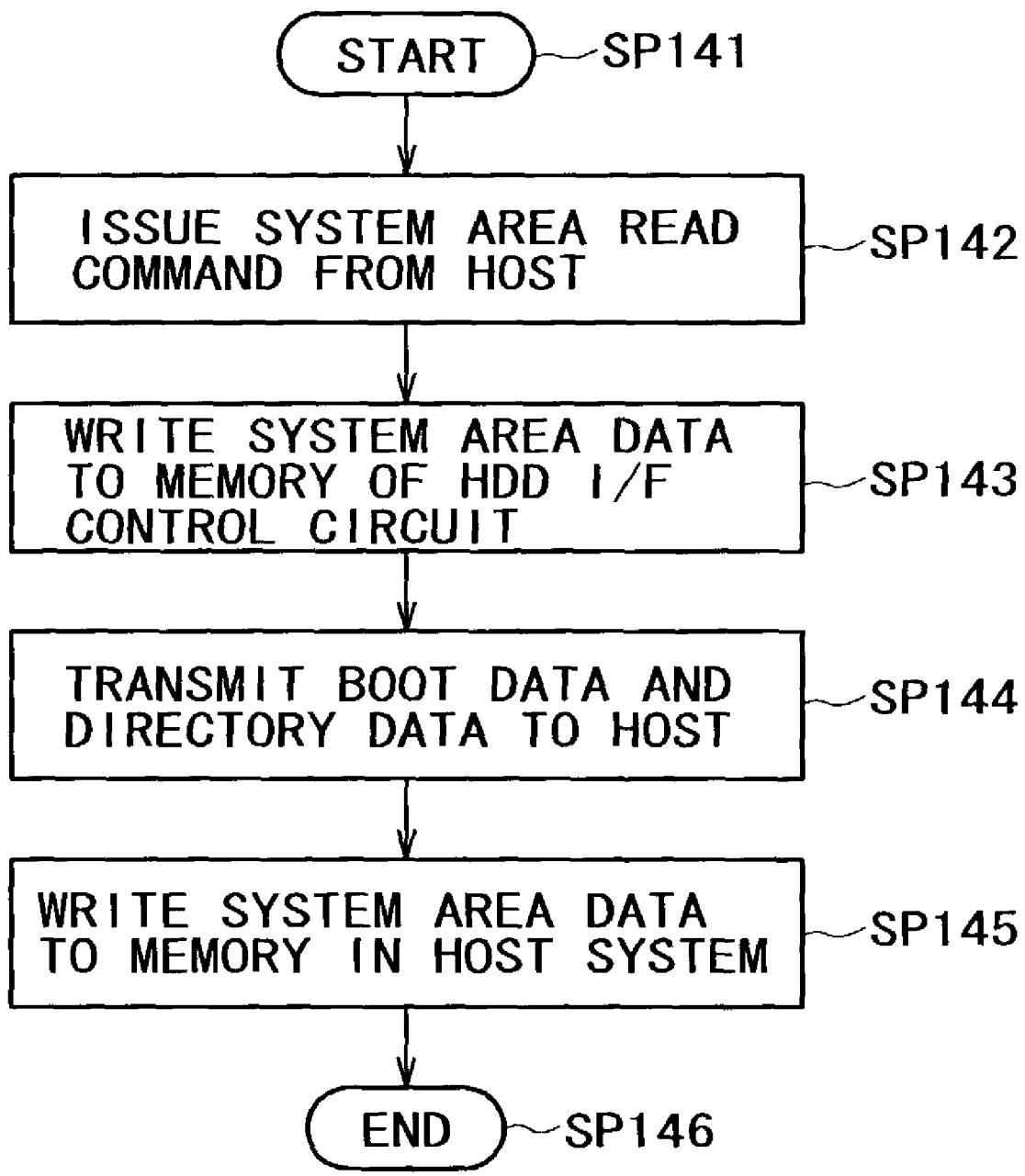

F I G. 8

| BIT / BYTE | 8 | 7 | 6 | 5 | 4 | 3 | 2 | 1 | 0 |
|---|---|---|---|---|---|---|---|---|---|
| 0 | COMMAND CODE ||||||||| 
| 1 | NUMBER OF FILES |||||||||

FIG. 9

| BIT<br>BYTE | 8 | 7 | 6 | 5 | 4 | 3 | 2 | 1 | 0 |
|---|---|---|---|---|---|---|---|---|---|
| 0 | COMMAND CODE ||||||||||
| 1 | NUMBER OF FILES |||||||||
| 2 | TagNo |||||||||
| 3 | FILE 1 START ADDRESS |||||||||
| 4 | FILE 1 START ADDRESS |||||||||
| 5 | FILE 1 START ADDRESS |||||||||
| 6 | FILE 1 START ADDRESS |||||||||
| 7 | TagNo |||||||||
| 8 | FILE 2 START ADDRESS |||||||||
| 9 | FILE 2 START ADDRESS |||||||||
| 10 | FILE 2 START ADDRESS |||||||||
| 11 | FILE 2 START ADDRESS |||||||||

F I G. 17

| 8 BYTES | 3 BYTES | 1 BYTES | 10 BYTES | 2 BYTES | 2 BYTES | 2 BYTES | 4 BYTES |
|---|---|---|---|---|---|---|---|
| NAME | EXTENSION | ATTRIBUTE | RESERVED | RECORDING TIME | RECORDING DATE | START CLUSTER NUMBER | FILE LENGTH |

FIG. 18

| FAT VALUE (IN HEX) | MEANING |
|---|---|
| 0000h | CORRESPONDING CLUSTER IS FREE |
| 0002h~FFF6h | CORRESPONDING CLUSTER IS ALREADY ALLOCATED AND CORRESPONDING VALUE IS CLUSTER NUMBER TO BE CONTINUED |
| FFF7h | DEFECTIVE CLUSTER |
| FFF8h~FFFFh | CORRESPONDING CLUSTER IS ALREADY ALLOCATED AND FILE END (EOF) |

FIG. 22

| BIT<br>BYTE | 8 | 7 | 6 | 5 | 4 | 3 | 2 | 1 | 0 |
|---|---|---|---|---|---|---|---|---|---|
| 0 | COMMAND CODE ||||||||| 
| 1 | ADDRESS ||||||||| 
| 2 | ADDRESS ||||||||| 
| 3 | ADDRESS ||||||||| 
| 4 | ADDRESS ||||||||| 
| 5 | TRANSFER LENGTH |||||||||

F I G. 3 1
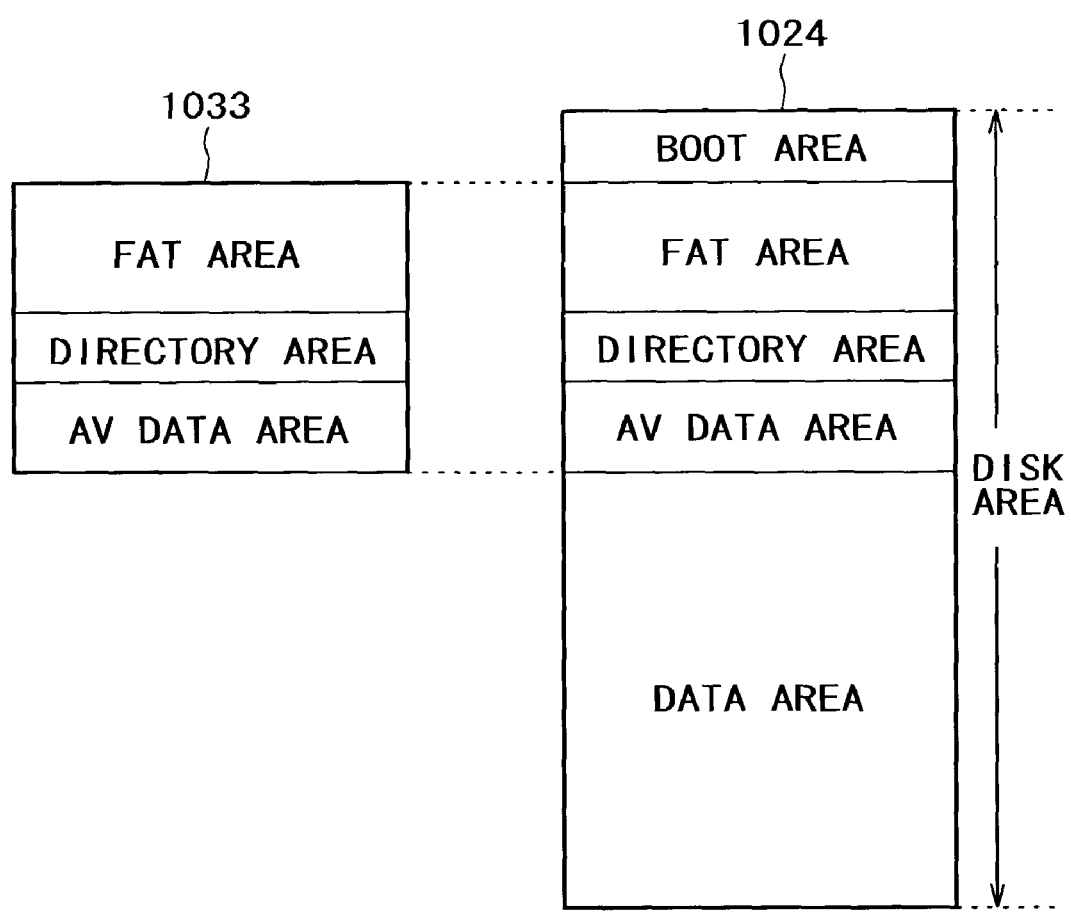

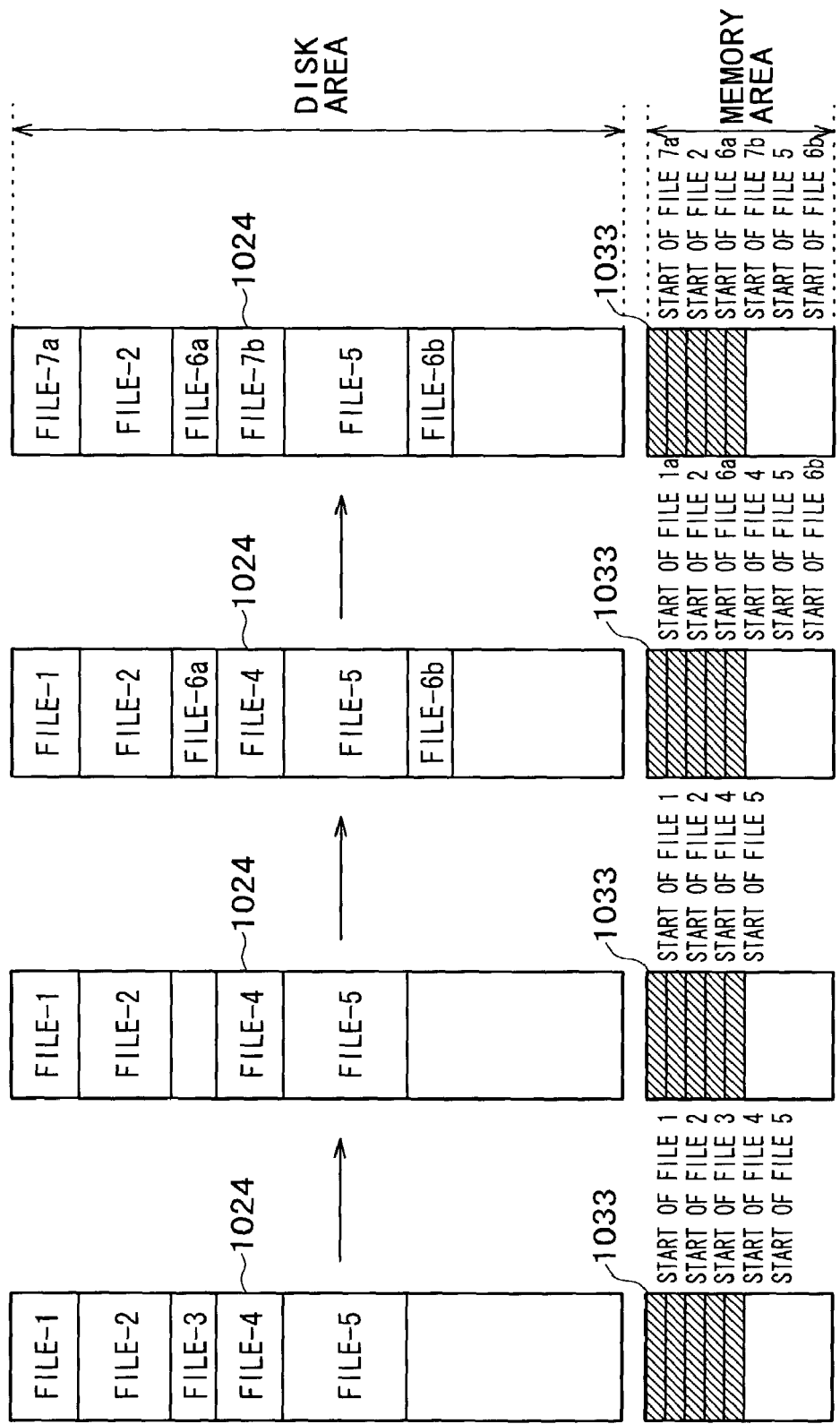

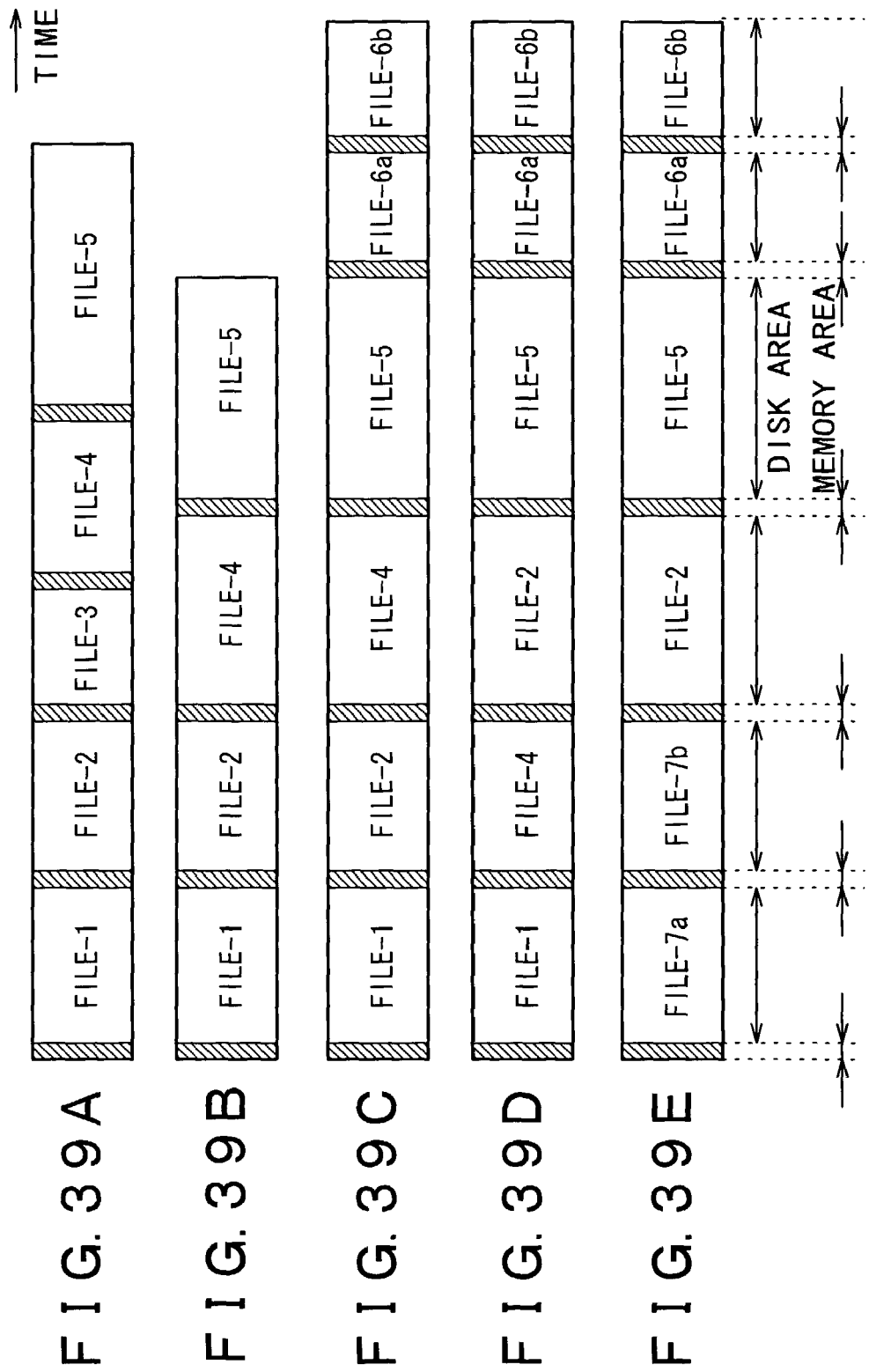

F I G. 4 1

| LAST CLUSTER NUMBER (XXXXh) OF FILE 1 | START CLUSTER NUMBER (XXXXh) LINKED TO FILE 1 |
| LAST CLUSTER NUMBER (XXXXh) OF FILE 2 | START CLUSTER NUMBER (XXXXh) LINKED TO FILE 2 |
| LAST CLUSTER NUMBER (XXXXh) OF FILE 5 | START CLUSTER NUMBER (XXXXh) LINKED TO FILE 5 |
| LAST CLUSTER NUMBER (XXXXh) OF FILE 6 | START CLUSTER NUMBER (XXXXh) LINKED TO FILE 6 |
| | |

LINK FILE INFORMATION AREA (IN DATA AREA)

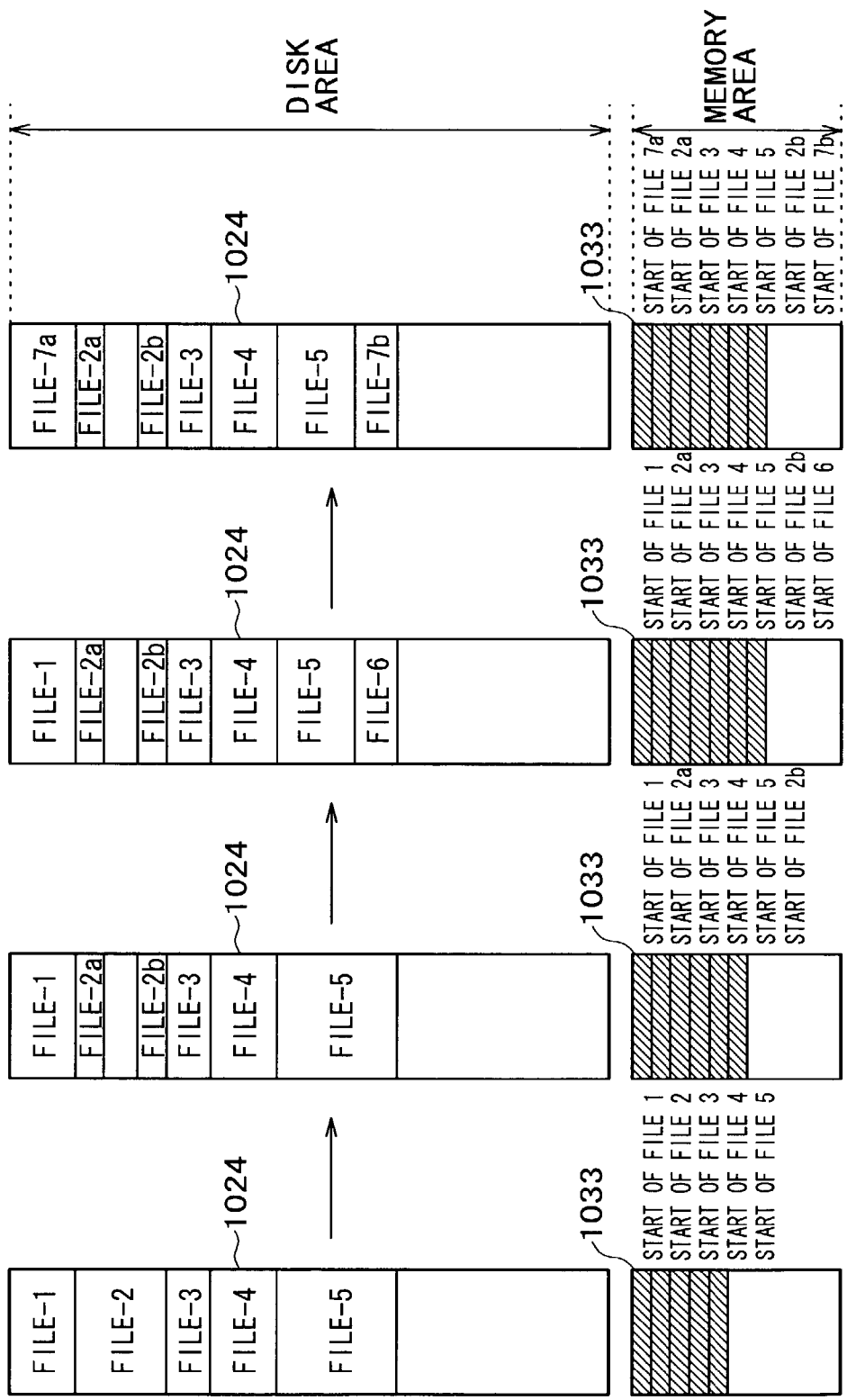

F I G. 4 5
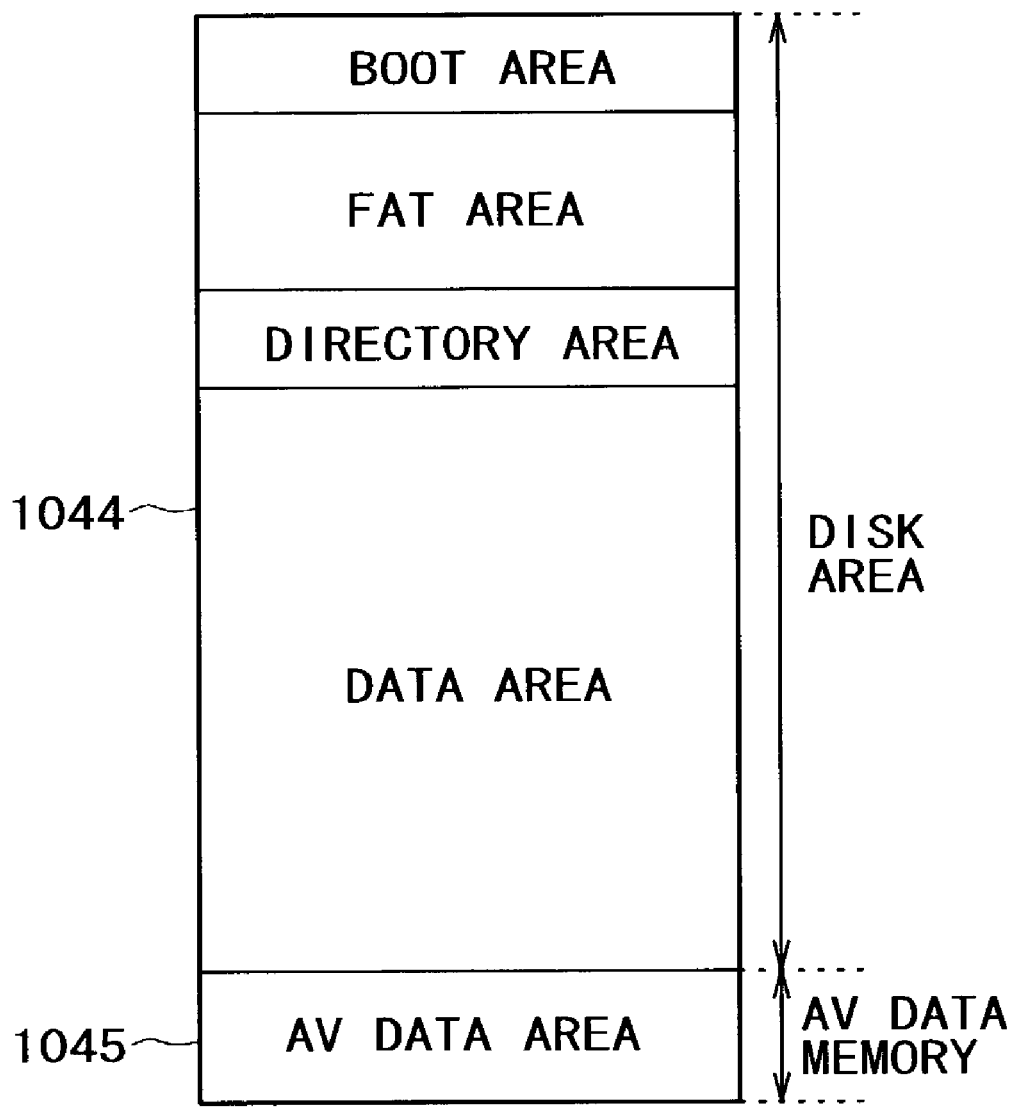

INFORMATION PROCESSING APPARATUS, INFORMATION PROCESSING METHOD, RECORDING MEDIUM, CONTROL

BACKGROUND OF THE INVENTION

The present invention relates generally to an information processing apparatus and method. For example, the present invention is applicable to magnetic disk apparatus such as hard disk apparatuses for recording video data for example and optical disk apparatuses for recording video data for example. The present invention, by the processing of a recording/reproducing apparatus corresponding to one command, sequentially reproduces files to output the reproduced files and sequentially detects free areas to record files to the detected free areas, thereby shortening the time necessary for dubbing as compared with related-art configurations.

Further, the present invention relates generally to an information processing apparatus, an information processing apparatus control method, an information processing apparatus control program, and a recording medium recording the information processing apparatus control program. For example, the present invention is applicable to hard disk apparatuses an so on for recording video data for example. The present invention is intended to instantaneously output the data in a desired file by storing in memory the data for a predetermined duration of time from a reproduction start position, thereby effectively avoiding waste power dissipation. At the time of reproduction, the present invention stores, in memory, by a predetermined data amount, the data at the start portion of a position which requires to access by a seek operation; during a period in which it is difficult to reproduce data from a disk type recording medium by the seek operation, the stored data are outputted to effectively prevent the access speed by the seek operation from being lowered.

Conventional hard disk apparatuses for use as peripheral devices to personal computers are capable of random access operations. Recently, these hard disk apparatuses are increasingly small in size and high in data recording density. Therefore, various propositions are made for these hard disk apparatuses to be applied to the recording of audio data and video data (hereafter referred to as AV data), thereby applying these hard disk apparatuses to home servers and vehicle equipment.

In these hard disk apparatuses, the data recorded to a hard disk are controlled in a control unit based on a cluster composed of plural sectors by control data recorded in the hard disk and this control is executed by a personal computer for example which is a host apparatus.

Now, referring to FIG. 15, there is shown a block diagram illustrating a hard disk apparatus. A hard disk apparatus 1 is connected to a host apparatus 2 which is one of various video equipment to record AV data outputted from the host apparatus 2 onto a hard disk 3. The host apparatus 2 is a video device in which AV data composed of moving images and/or still images are recorded to a mass-storage recording medium such as a hard disk drive (HDD) 2C and the recorded AV data are held therein; for example, the host apparatus 2 is an electronic still camera.

To the hard disk 3, MS-DOS compliant file system format is applied as shown in FIG. 16. Namely, the hard disk 3 is divided in the information recording surface into the inner peripheral side and the outer peripheral side, the former being allocated to a data area and latter to a system entry area. The data area is fragmented into clusters, to each of which AV data for example are recorded with a data amount of the predetermined number of frames used as a unit.

Further, the hard disk 3 is concentrically divided in the information recording surface into plural zones, each track in each zone being divided by a predetermined length along the circumference into plural sectors. In the hard disk 3 thus sectorized, physical addresses are set by the surface number of the information recording surface, the track numbers continuously allocated from the outer peripheral side of the information recording surface, and the sector numbers identifying the sectors of each track. In addition, user data are controlled in file by the logical addresses which are sequentially set from the outer peripheral side of the information recording surface in correspondence to these physical addresses.

Each logical address is represented in a cluster number with a cluster obtained by collecting plural logical sectors used as a unit. Namely, each logical sector provides an area corresponding to a recording unit of data which is set with the start area (located at the outermost periphery in this case) in the information recording surface defined as sector 0. In this embodiment, one physical sector corresponds to one logical sector, each logical sector number being represented in a relation that logical sector number=the number of sectors in one track×(surface number+the number of surface×track number)+sector number−1. It should be noted that the surface number, track number, and sector number are based on physical address.

In this embodiment, a logical sector is configured so that data of 512 bytes are recorded to one logical sector in terms of user data and one cluster is configured by plural logical sectors. It should be noted that one cluster is generally configured by the number of sectors equal to a power of 2 and is identified by a cluster number which is a serial number starting with 2 which is the beginning of a file area in the data area to which user data are recorded.

In the data area, a cluster number is allocated to each cluster thus set and the data area is accessed on a cluster basis with reference to the cluster number. It should be noted that, in this embodiment, each cluster number is represented in 4-digit hexadecimal notation.

The system entry area is further divided into a boot area, a FAT (Fail Allocation Table) area, and a directory area. To the boot area, the data for defining a disk structure is recorded. To the FAT area and the directory area, the address information and so on necessary for accessing the AV data recorded in the data area are recorded.

To be more specific, the file name of each file recorded to the data area and the cluster number of the start cluster which is the recording start position of each file are recorded to the directory area. To the FAT area, the cluster numbers of the clusters following the start cluster of each file are recorded. This allows the hard disk 3 to detect the addresses of consecutive clusters constituting one file by detecting the start cluster number of the desired file name from the directory area and then sequentially detecting the cluster numbers following the start cluster number from the FAT area.

As shown in FIG. 16, if file 1 is recorded to clusters having cluster numbers 1234h through 1240h in the data area, the code indicative of cluster number 1234h of a first cluster of file 1 is recorded to the directory area and the cluster numbers following this cluster number 1234h are sequentially recorded to the corresponding areas of the FAT area. It should be noted that EOF (End Of File) is identification information indicative of the last cluster of one file.

To be more specific, the directory area records for each file recorded in the data area the file control data for identifying each file recorded in the data area, the file control data having a configuration shown in FIG. 17. Namely, in the file control data, the first 8 bytes are allocated to file name and the next 3 bytes are allocated to extension. The following one byte is allocated to attribute followed by 10 bytes allocated to data for reservation. The next 2 bytes are allocated to recording start time, followed by 2 bytes allocated to recording date, followed by 2 bytes allocated to cluster number which is the start cluster number. The last 4 bytes are allocated to file length.

The FAT area (FIG. 16) records the identification data indicative of the association of clusters, each of which provides a unit in which the data area is controlled. Namely, in the FAT area, cluster addresses are allocated in correspondence with the cluster numbers in the data area and the cluster numbers of the clusters following the cluster addresses are recorded. As shown in FIG. 18, of the codes which are not allocated to these cluster numbers, predetermined codes are allocated to the identification information indicative of a free area, defective cluster, and EOF.

Consequently, the hard disk 3 accesses the FAT area to detect free areas in the data area. Also, the hard disk 3 executes alternative processing with reference to a defective sector. Further, at the time of recording, the hard disk 3 registers a defective sector by retry processing based on write-and-verify operation. Thus, like the file control system to be applied to a personal computer, the hard disk 3 controls the information recording surface on a predetermined block basis.

A servo circuit 4 (FIG. 15) drives a motor (M) 6 under the control of a hard disk control circuit 5 to drive the hard disk 3 at a predetermined rotational speed. Also, the servo circuit 4 drives a motor (M) 8 to cause the magnetic head to perform a seek operation and perform tracking control.

At the time of recording, a read/write data channel section 9 encodes the output data of the hard disk control circuit 5 by a scheme suited to the characteristics of the recording/reproducing system to generate bit-series data under the control of the hard disk control circuit 5, driving the magnetic head on the basis of the generated data. At the time of reading, the read/write data channel section 9 performs a signal processes on the reproduction signal obtained from the magnetic head to generate reproduction data, outputting them to the hard disk control circuit 5.

The hard disk control circuit 5 controls the data stored on the hard disk 3 as directed by an interface control circuit 7 and controls the operation of the servo circuit 4 in accordance with the AV data entered via a buffer memory 10 and, by outputting the AV data to the read/write data channel section 9, records the AV data to a cluster specified by the interface control circuit 7. At the time of reading, the hard disk control circuit 5 controls the operation of the servo circuit 4 to output the data from the read/write data channel section 9 to the buffer memory 10, thereby reproducing the cluster specified by the interface control circuit 7.

An interface control circuit (IF control) 7 is constituted by a SCSI controller, an IDE controller, or an ATA controller for example to configure an input/output circuit for inputting and outputting data and control commands to be transferred with the host apparatus 2. Namely, the interface control circuit 7 receives commands and interprets their parameters to control the operations of the hard disk control circuit 5 and so on. At the time of writing, the interface control circuit 7 outputs the AV data entered from the host apparatus 2 to the hard disk control circuit 5 via the buffer memory 10. On the other hand, at the time of reading, the interface control circuit 7 outputs the AV data received from the hard disk control circuit 5 to the host apparatus 2 via the buffer memory 10.

In response, the host apparatus 2 transmits various commands and so on to the hard disk apparatus 1 as directed by an upper controller on the basis of the processing of a central processing unit (CPU) 2A for which a work area is allocated in a host memory 2B.

In this processing, the central processing unit 2A performs a predetermined processing procedure at the time of power-on sequence to upload the data in the boot area, the FAT area, and the directory area which are the control data recorded in the system entry area of the hard disk 3 to the host memory 2B and transmits various commands having the parameters set with reference to the uploaded data.

Referring to FIG. 19, there is shown the processing procedure for uploading the control data. The hard disk apparatus 1 goes step SP1 to SP2 at the time of power-on sequence for example, in which the host apparatus 2 issues a command for reading the system entry area. In step SP3, the data in the system entry area are reproduced by the hard disk 3 in response to this command and the reproduced data are transmitted to the host apparatus 2. In the related-art system, the data in the system entry area are recorded to the host memory 2B of the host apparatus 2 in step SP4 for use in the issuance of a sequence of read and write commands and then the hard disk apparatus 1 goes to step SP5 to end this processing procedure.

The host apparatus 2 thus sets parameters with reference to the uploaded control data and instructs the hard disk apparatus 1 for access. Namely, to read a desired file for example, the host apparatus 2 sets the start address of this file (the FAT entry number of the directory) and the transfer length in cluster basis of this file as parameters and issues a read command having these parameters. Likewise, at the time of writing, the host apparatus 2 issues a write command to sequentially transmit the data to be recorded.

Referring to FIG. 20, there is shown a flowchart indicative of the write processing to be executed with reference to the control data recorded in the host memory 2B of the host apparatus 2. In this case, the host apparatus 2 goes from step SP11 to step SP12 and searches the control data recorded in the host memory 2B to detect a cluster number (a free cluster address) set with a code indicative of a free area.

When a free cluster address is detected, the host apparatus 2 sets the parameters of this free cluster address and transfer length and issues a write command having these parameters in step SP13. In step SP14, the host apparatus 2 transmits the data to the hard disk apparatus 1 by the specified transfer length to be recorded. In the case of the ATA standard, the transfer length for one command is a sequence of consecutive sectors less than 256 sectors. In step SP15, the hard disk apparatus 1 records the data received in accordance with the write command to the buffer memory 10. In step SP16, the hard disk apparatus 1 sequentially records the data recorded in the buffer memory 10 to the free clusters specified by the host apparatus 2.

When the recording of the data received from the host apparatus 2 has been completed, the hard disk apparatus 1 causes an interrupt onto the host apparatus 2 in step SP17. This interrupt causes the host apparatus 2 to go to step SP18 to determined whether the transfer of the data to be recorded has all been completed. If the decision is NO, the host apparatus 2 returns to step SP12. Thus, the host apparatus 2 repeats the issuance of a write command for a file having an amount of data which cannot be recorded by a single write operation. In response to the repetitive issuance, the hard disk apparatus 1 sequentially records the data to the free clusters specified by the host apparatus 2.

When the transfer of the data to be recorded has all been completed, and the decision in step SP18 is YES, the host apparatus 2 goes to step SP19 to update the contents of the system entry area recorded to the host memory 2B so that these contents correspond to the recording of the file and instructs the hard disk apparatus 1 to update the system entry area. In step SP20, the host apparatus 2 ends this processing procedure.

Referring to FIG. 21, there is shown a flowchart indicative of a processing procedure for reading the AV data recorded as described above with reference to the control data recorded in the host memory 2B of the host apparatus 2. In this case, the host apparatus 2 goes from step SP21 to step SP22 and searches the control data recorded in the host memory 2B to detect the start cluster number of the file to be read from the data in the directory area.

Upon detection of the start cluster number, the host apparatus 2 goes to step SP23 and sets this start cluster address and the transfer length as parameters to issue a read command. In the case of the ATA standard, the transfer length of one command is a sequence of sectors less than 256 sectors. To be more specific, the host apparatus 2 issues a read command having the format shown in FIG. 22. Namely, the command code is set to the first one byte so as to identify each command. Subsequently, addresses are each set to one byte by cluster number, lastly followed by one byte of transfer length.

When a read command is issued from the host apparatus 2 as described above, the hard disk apparatus 1 reads the data specified by this command from the hard disk 3 in step SP24. In step SP25, the hard disk apparatus 1 temporarily stores the retrieved data in the buffer memory 10. When the reading has been completed, the hard disk apparatus 1 causes an interrupt onto the host apparatus 2 in step SP26. This interrupt causes the host apparatus 2 to go to step SP27 to instruct the hard disk apparatus 1 for data transfer. In response, the hard disk apparatus 1 outputs the AV data temporally stored from the buffer memory 10 to host apparatus 2.

Receiving the AV data corresponding to one read command, the host apparatus 2 searches the host memory 2B to detect the following cluster address on the basis of link cluster number from the data of the FAT area in step SP28. Further, in step SP29, the host apparatus 2 determines the code based on the detected address to determine whether EOF has been reached.

If the decision is NO, the host apparatus 2 returns to step SP23 and sets parameters again on the basis of the address detected in step SP28 and issues a read command. As for a file having an amount data which cannot be transferred by one read command, the host apparatus 2 repetitively issues read commands. In response, the hard disk apparatus 1 sequentially reproduces AV data from the clusters specified by the host apparatus 2.

When EOF has been detected from the data in the FAT area, the decision is in step SP29 is YES, so that the host apparatus 2 goes to step SP30. For the remaining AV data up to the cluster having EOF, the host apparatus 2 sets the necessary parameters to issue a read command.

In response to the read command issued by the host apparatus 2, the hard disk apparatus 1 reads the data specified in this command from the hard disk 3 in step SP31. In step SP32, the hard disk apparatus 1 temporarily stores the retrieved data in the buffer memory 10. When the reading has been completed, the hard disk apparatus 1 causes an interrupt onto the host apparatus 2 in step SP33. This interrupt causes the host apparatus 2 to go to step SP34 to instruct the hard disk apparatus 1 for data transfer. In response, the hard disk apparatus 1 outputs the AV data temporally stored from the buffer memory 10 to the host apparatus 2 and goes to step SP35 to end this processing procedure.

Conventionally, for a file having an amount of data which cannot be transferred only single commands, a write command and a read command are issued to access the hard disk 3 for each predetermined data amount or every time the continuity of clusters is lost.

In some related-art configurations such as mentioned above, two files are processed concurrently. Referring to FIGS. 23 and 24, there are shown flowcharts indicative of a processing procedure for processing two files in a so-called multiple-write operation in which plural files are written concurrently.

In this case, the host apparatus 2 goes from step SP31 to step SP32 and, for file 1, searches the control data recorded in the host memory 2B to detect the cluster number (free cluster address) set with a code indicative of free area.

When the free cluster address has been detected, the host apparatus 2 sets this free cluster address and the transfer length as parameters for this first file in step SP33 and issues a write command having these parameters. In step SP34, the host apparatus 2 transmits the data to be recorded to the hard disk apparatus 1 by the amount specified by the transfer length. In step SP35, in response to this write command, the hard disk apparatus 1 stores the data in file 1 into the buffer memory 10. In step SP36, the hard disk apparatus 1 sequentially records the data from the buffer memory 10 to the free cluster specified by the host apparatus 2.

When the recording of the data received from the host apparatus 2 has been completed, the hard disk apparatus 1 causes an interrupt onto the host apparatus 2 in step SP37. This interrupts causes the host apparatus 2 to go to step SP38 to determined whether the data have been recorded by the predetermined amount. The predetermined data amount is set so that, when two files are alternately recorded, the buffer memory for temporarily holding these two files does not overflow or underflow, thereby preventing the continuity of the two pieces of AV data from being lost in the host apparatus 2.

If the decision is NO, the host apparatus 2 goes to step SP39 to determined whether the transfer of the data in file 1 to be recorded has all been completed. If the decision is NO, the host apparatus 2 returns to step SP32. In this case, the host apparatus 2 repetitively issues write commands until the recording of the data in one file is completed by the predetermined amount, transmitting the data to be written. In response to these write commands, the hard disk apparatus 1 sequentially records the data to the free clusters specified by the host apparatus 2.

When the recording of the AV data in file 1 has been completed by the predetermined amount, the decision in step SP38 is YES, upon which the host apparatus 2 goes from step SP38 to step SP40. The host apparatus 2 determines whether the transfer of the data in file 2 to be recorded has all been completed. If the decision is NO, the host apparatus 2 goes to step SP41.

The host apparatus 2 searches the control data recorded in the host memory 2B to detect a free cluster address set with a code indicative of free area for file 2. In step SP42, the host apparatus 2 sets this cluster address and the transfer length as parameters for this second file and issues a write command having these parameters. In step SP43, the host apparatus 2 transfers the data to be recorded to the hard disk apparatus 1 by the specified transfer length. In step SP44, in response to this write command, the hard disk apparatus 1 records the data of file 2 into the buffer memory 10. In step SP45, the hard disk apparatus 1 sequentially records the data from the buffer memory 10 to the free cluster specified by the host apparatus 2.

When the recording of the data received from the host apparatus 2 has been completed, the hard disk apparatus 1 causes an interrupt onto the host apparatus 2 in step SP46. This interrupt causes the host apparatus 2 to go to step SP47 to determined whether the data have been recorded by the predetermined amount. The predetermined amount is set under the same conditions as with the decision of step SP38 so that the continuity of the AV data in the consecutive two pieces of data is not lost in the host apparatus 2.

If the decision is NO, the host apparatus 2 goes to step SP40 to determined whether the transfer of the data to be recorded has all been completed for file 2. Thus, for file 2, the host apparatus 2 repetitively issues write commands until the recording of the data in one file has been completed by the predetermined amount, transmitting the data to be written. In response, the host apparatus 2 sequentially records the data to the free clusters specified by the host apparatus 2.

When the AV data in one file have been recorded by the predetermined data amount in response to the repetitively issued commands to the hard disk 3, the host apparatus 2 performs the same processing procedure as described above on the AV data of the other file.

When the recording has been completed as described above for file 1, the decision of step SP39 is YES, so that the host apparatus 2 goes from step SP39 to step SP49 (FIG. 24). The host apparatus 2 searches the control data recorded in the host memory 2B to detect free cluster addresses set with a code indicative of free area for file 2. In step SP50 the host apparatus 2 sets this free cluster address and the transfer length as parameters for this second file and issues a write command having these parameters. In step SP51, the host apparatus 2 transmits the data to be written to the hard disk apparatus 1 by the amount equivalent to the transfer length.

In step SP52, in response to this write command, the hard disk apparatus 1 records the data in file 2 into the buffer memory 10. In step SP53, the hard disk apparatus 1 sequentially records the data from the buffer memory 10 to the free cluster specified by the host apparatus 2.

When the recording of the data received from the host apparatus 2 has been completed, the hard disk apparatus 1 causes an interrupt onto the host apparatus 2 in step SP54. This interrupt causes the host apparatus 2 to go to step SP55 to determine whether the recording of the data in the second file has been completed. If the decision is NO, the host apparatus 2 returns to step SP49.

The host apparatus 2 repetitively issues write commands for the data in file 2. When the writing of file 2 has been completed, the decision of step SP55 is YES, so that the host apparatus 2 goes from step SP55 to step SP56 to update the data in the system entry area stored in the host memory 2B in accordance with the above-mentioned processing and update the system entry area of the hard disk 3, and then goes to step SP57 to end this processing procedure.

Conversely, if the recording of file 2 has been completed first, the decision of step SP40 is YES (FIG. 23), so that the host apparatus 2 goes from step SP40 to step SP58 (FIG. 24). The host apparatus 2 searches the control data stored in the host memory 2B to detect a free cluster address set with a code indicative of free area for file 1. In step SP59, the host apparatus 2 sets this free cluster address and the transfer length as parameters for file 1 and issues a write command having these parameters. In step SP60, the host apparatus 2 transmits the data to be recorded to the hard disk apparatus 1 by the amount equivalent to the transfer length.

In step SP61, the hard disk apparatus 1 records the data of file 1 to be transmitted in response to this write command into the buffer memory 10. In step SP62, the hard disk apparatus 1 sequentially records the data from the buffer memory 10 to the free cluster specified by the host apparatus 2.

When the recording of the data received from the host apparatus 2 has been completed, the hard disk apparatus 1 causes an interrupt onto the host apparatus 2 in step SP63. This interrupt causes the host apparatus 2 to go to step SP64 to determine whether the recording has been completed for file 1. If the decision is NO, the host apparatus 2 returns to step SP58.

The host apparatus 2 repetitively issues write commands for the data in file 1. When the writing has been completed for file 1, the decision of step SP64 is YES, so that the host apparatus 2 goes from step SP64 to step SP56 to update the data in the system entry area stored in the host memory 2B and update the system entry area of the hard disk 3, going to step SP57 to end this processing procedure.

Referring to FIGS. 25 through 28, there are shown flowcharts indicative of a processing procedure for processing two files in a so-called multiple-read operation in which plural files are read concurrently. In this case, the host apparatus 2 goes from step SP71 to SP72 and searches the control data recorded in the host memory 2B to detect the start cluster numbers from the data in the directory area for file 1 and file 2 to be read.

When these start cluster numbers are detected, the host apparatus 2 goes to step SP73 and sets the start cluster address and the transfer length as parameters for file 1 to issue a read command having these parameters.

In response to the read command issued by the host apparatus 2, the hard disk apparatus 1 reads the data specified by this command from the hard disk 3 in step SP74. In step SP75, hard disk apparatus 1 temporarily stores the retrieved data into the buffer memory 10. When the reading has been completed, the hard disk apparatus 1 causes an interrupt onto the host apparatus 2 in step SP76. This interrupt causes the host apparatus 2 to go to step SP77 and instruct the hard disk apparatus 1 for data transfer. In response, the hard disk apparatus 1 outputs the AV data from the buffer memory 10 to the host apparatus 2.

Receiving the AV data corresponding to one read command, the host apparatus 2 determined in step SP78 whether the data have been read by the predetermined amount. This predetermined amount is set to a amount so that, when two files have been alternately read, the buffer memory of the host apparatus for temporarily storing these file does not overflow or underflow, thereby preventing the continuity of the continuous two pieces of AV data from being lost in the host apparatus 2.

If the decision is NO, the host apparatus 2 goes to step SP79 and searches the host memory 2B to detect, from the FAT area data, the next cluster address on the basis of the link cluster number of file 1. Then, in step SP80, the host apparatus 2 determines the code based on the detected address to determine whether EOF has been reached.

If the decision is NO, the host apparatus 2 goes to step SP73 and sets the address detected in step SP78 as a parameter to issue a read command having this parameter. Thus, the host apparatus 2 repetitively issues read commands for the predetermined amount of data. In response, the hard disk apparatus 1 sequentially reproduces the AV data in file 1 on the basis of the cluster specified by the host apparatus 2, by the predetermined amount.

When the AV data in file 1 have been read by the predetermined amount, the decision of step SP78 is YES, so that the host apparatus 2 goes from step SP78 to step SP81 (FIG. 26). The host apparatus 2 searches the host memory 2B to detect, from the FAT area data, the next cluster address on the basis of the link cluster number of file 2. If the host apparatus 2 has issued no read command for file 2, the processing of step SP81 is skipped. In step SP82, the host apparatus 2 determines the code based on the detected address to determine whether EOF has been reached.

If the decision is NO, the host apparatus 2 goes to step SP83. The host apparatus 2 sets the cluster address detected in step 81 (if no read command has been issued for file 2, the start cluster number detected in step SP72) and the transfer length as parameters to issue a read command having these parameters.

In response to the read command issued by the host apparatus 2, the hard disk apparatus 1 reads the data specified by this command from the hard disk 3 in step SP84. In step SP85, the hard disk apparatus 1 temporarily stores the retrieved data into the buffer memory 10. When the reading has been completed, the hard disk apparatus 1 causes an interrupt onto the host apparatus 2 in step SP86. This interrupt causes the host apparatus 2 to go to step SP87 to instruct the hard disk apparatus 1 for data transfer. In response, the hard disk apparatus 1 outputs the AV data from the buffer memory 10 to the host apparatus 2.

Receiving the AV data corresponding to one read command, the host apparatus 2 determines whether the data have been read by the predetermined amount in step SP88. This predetermined amount is set in the same manner as with step SP78.

If the decision is NO, the host apparatus 2 goes to step SP81 and searches the host memory 2B to detect, from the FAT area data, the next cluster address based on the link cluster number of file 2. In step SP82, the host apparatus 2 determines the code based on the detected address to determine whether EOF has been reached.

For file 2, the host apparatus 2 also repetitively issues read command for the predetermined data amount. In response, the hard disk apparatus 1 reproduces, by the specified data amount, the AV data in file 1 based on the cluster specified by the host apparatus 2.

When the AV data of one file have been read from the hard disk 3 by the specified data amount by the repetitively issued read commands, the host apparatus 2 performs the same processing procedure on the AV data of the other file, repeating the above-mentioned processing.

When EOF has been detected for file 1 by repeating the above-mentioned processing procedure, the decision is YES in step SP80 (FIG. 25), so that the host apparatus 2 goes from step SP80 to SP90. The host apparatus 2 sets parameters to issue read commands for the remaining AV data up to the cluster on which EOF is detected.

When the read command is issued by the host apparatus 2, the hard disk apparatus 1 reads the data specified by the read command from the hard disk 3 in step SP91 (FIG. 27). In step SP92, the hard disk apparatus 1 temporarily records the retrieved data into the buffer memory 10. When the reading has been completed, the hard disk apparatus 1 causes an interrupt onto the host apparatus 2 in step SP93. This interrupt causes the host apparatus 2 to go to step SP94 to instruct the hard disk apparatus 1 for data transfer. In response, the hard disk apparatus 1 outputs the AV data from the buffer memory 10 to the host apparatus 2, going to step SP95.

In step S95, the host apparatus 2, upon completion of the reading, detects the next link cluster for file 2. In step SP96, the host apparatus 2 determines the code based on the detected address to determine whether EOF has been reached.

If the decision is NO, the host apparatus 2 goes to step SP97 and sets the cluster address detected in step SP95 and the transfer length as parameters for file 2 to issue a read command having these parameters. In response to the read command issued by the host apparatus 2, the hard disk apparatus 1 reads the data specified by this read command from the hard disk 3 in step SP98. In step SP99, hard disk apparatus 1 temporarily stores the retrieved data into the buffer memory 10. In step SP100, the hard disk apparatus 1 causes an interrupt onto the host apparatus 2. This interrupt causes the host apparatus 2 to go to step SP101 to instruct the hard disk apparatus 1 for data transfer. In response, the hard disk apparatus 1 outputs the AV data from the buffer memory 10 to the host apparatus 2.

Receiving the AV data corresponding to one read command, the host apparatus 2 goes to step SP95 and searches the host memory 2B to detect, from the FAT area data, the next cluster address based on the link cluster number of file 2. In step SP96, the host apparatus 2 determines the code based on the detected address to determine whether EOF has been reached.

The host apparatus 2 repetitively issues read commands for file 2 to read the AV data from the hard disk 3. When EOF has been reached, the decision of step SP96 is YES, so that the host apparatus 2 goes to step SP102 (FIG. 29). The host apparatus 2 sets the parameters to issue read commands for the remaining AV data up to the cluster on which EOF is detected.

When the read command is issued from the host apparatus 2, the hard disk apparatus 1 reads the data specified by this read command from the hard disk 3 in step SP103. In step SP104, the hard disk apparatus 1 temporarily records the retrieved data into the buffer memory 10. When the reading has been completed, the hard disk apparatus 1 causes an interrupt onto the host apparatus 2 in step SP105. This interrupt causes the host apparatus 2 to go to step SP106 to instruct the hard disk apparatus 1 for data transfer. In response, the hard disk apparatus 1 outputs the AV data from the buffer memory 10 to the host apparatus 2 and goes to step SP107 to end this processing procedure.

If file 2 has reached EOF first, the decision of step SP82 is YES (FIG. 26), the host apparatus 2 goes from step SP82 to step SP109. The host apparatus 2 sets the parameters to issue read commands on the remaining AV data up to the cluster on which EOF is detected.

In response to the read command issued by the host apparatus 2, the hard disk apparatus 1 reads the data specified by this read command from the hard disk 3 in step SP110 (FIG. 28). In step SP111, the hard disk apparatus 1 temporarily stores the retrieved data into the buffer memory 10. When the reading has been completed, the hard disk apparatus 1 causes an interrupt onto the host apparatus 2 in step SP112. This interrupt causes the host apparatus 2 to go to step SP113 to instruct the hard disk apparatus 1 for data transfer. In response, the hard disk apparatus 1 outputs the AV data from the buffer memory 10 to the host apparatus 2, going to step SP115.

When the reading of file 2 has been completed, the host apparatus 2 detects the next link cluster for file 1 in step SP115. In step SP116, the host apparatus 2 determines the code based on the detected address to determine whether EOF has been reached.

If the decision is NO, the host apparatus 2 goes to step SP117 and sets the cluster address detected in step SP115 and the transfer length as parameters to issue a read command for file 1. In response to the read command issued by the host apparatus 2, the hard disk apparatus 1 reads the data specified by this read command from the hard disk 3 in step SP118. In step SP119, the hard disk apparatus 1 temporarily stores the retrieved data into the buffer memory 10. In step SP120, the hard disk apparatus 1 causes an interrupt onto the host apparatus 2. In response, the host apparatus 2 goes to step SP121 to instruct the hard disk apparatus 1 for data transfer. In response, the hard disk apparatus 1 outputs the AV data from the buffer memory 10 to the host apparatus 2.

Receiving the AV data corresponding to one read command, the host apparatus 2 goes to step SP115 and searches the host memory 2B to detect, from the FAT area data, the next cluster address based on the link cluster number of file 1. In step SP116, the host apparatus 2 determines the code based on the detected address to determine whether EOF has been reached.

The host apparatus 2 repetitively issues read commands for file 1 to read AV data from the hard disk 3. When EOF has been reached, the decision of step SP116 is YES, so that the host apparatus 2 goes to step SP122 (FIG. 29). The host apparatus 2 sets the parameters to issue read commands for the remaining AV data until the cluster on which EOF is detected.

In response to the read command issued by the host apparatus 2, the hard disk apparatus 1 reads the data specified by this command from the hard disk 3 in step SP123. In step SP124, hard disk apparatus 1 temporarily stores the retrieved data into the buffer memory 10. When the reading has been completed, the hard disk apparatus 1 causes an interrupt onto the host apparatus 2 in step SP125. This interrupt causes the host apparatus 2 to go to step SP126 to instruct the hard disk apparatus 1 for data transfer. In response, the hard disk apparatus 1 outputs the AV data from the buffer memory 10 to the host apparatus 2 and goes to step SP127 to end this processing procedure.

The recording/reproducing apparatuses of the above-mentioned type are required to transfer data at high speeds. Namely, the recording/reproducing apparatuses having high data transfer rates are applicable to the recording of AV data to record AV data of high resolutions.

Also, the recording/reproducing apparatuses having high data transfer rates can reduce the time required for dubbing. Namely, with audio equipment for example, the data transfer rate necessary at the time of data reproduction is about several hundred Kbps; if a data transfer rate of about several tens of Mbps can be provided at the time of recording, plural music files for example can be copied almost instantaneously. Therefore, in dubbing AV data, which are a result of an imaging operation, to a home server for example, a data transfer rate of about several hundred Mbps can significantly enhance the ease of use of audio equipment.

In disk storages such as hard disk, these data transfer rates are dependent on disk size, rotational speed, linear recording density, error processing, defect correction, and interface protocol. Data transfer rates are lower on hard disks of smaller size than those of larger size. Data transfer rates can be enhanced by optimizing the above-mentioned various conditions.

However, even if data transfer rates are enhanced by the optimization of these conditions, use of related-art access methods takes time for dubbing. To be more specific, when simply writing one file to a hard disk and reading one file therefrom, related-art access methods issue a command on a predetermined data amount basis and on a continuous area basis, so that commands must be repetitively issued for accessing one file. The repetitive issuance of commands takes time in the handshaking operation in interface, which lowers the data transfer rate for actually transferring AV data, making the dubbing of the AV data longer in time.

The longer dubbing time increases power dissipation.

Likewise, in the case of multiple-write and multiple-read schemes, the processing operations are alternately repeated on a predetermined data mount basis, which further increases the number of times commands are issued, making the dubbing time longer than simply dubbing two files continuously.

Further, conventional hard disk apparatuses for use as peripheral devices to personal computers are capable of random access operations. Recently, these hard disk apparatuses are increasingly small in size and high in data recording density. Therefore, various propositions are made for these hard disk apparatuses to be applied to the recording of AV data, thereby applying these hard disk apparatuses to home servers, vehicle equipment and the like.

In these hard disk apparatuses, the data recorded to a hard disk are controlled by control data recorded in the hard disk based on a cluster composed of plural sectors and this control is executed by a personal computer for example which is a host apparatus.

Now, referring to FIG. 15, there is shown a block diagram illustrating a hard disk apparatus. A hard disk apparatus 1 is connected to a host apparatus 2 which is one of various video equipment to record AV data outputted from the host apparatus 2 onto a hard disk 3. The host apparatus 2 is a video device which outputs AV data for example.

To the hard disk 3, MS-DOS compliant file system format is applied as shown in FIG. 16. Namely, the hard disk 3 is divided in the information recording surface into the inner peripheral side and the outer peripheral side, the former being allocated to a data area and latter to a system entry area. The data area is fragmented into clusters, to each of which AV data for example are recorded with a data amount of the predetermined number of frames used as a unit.

Further, the hard disk 3 is concentrically divided in the information recording surface into plural zones, each track in each zone being divided by a predetermined length along the circumference into plural sectors. In the hard disk 3 thus sectorized, physical addresses are set by the surface number of the information recording surface, the track numbers continuously allocated from the outer peripheral side of the information recording surface, and the sector numbers identifying the sectors of each track. In addition, user data are controlled in file by the logical address which are sequentially set from the outer peripheral side of the information recording surface in correspondence to these physical addresses.

Each logical address is represented in a cluster number with a cluster obtained by collecting plural logical sectors used as a unit. Namely, each logic sector provides an area corresponding to a recording unit of data which is set with the start area (located at the outermost periphery in this case) in the information recording surface defined as sector 0. In this embodiment, one physical sector corresponds to one logical sector, each logical sector number being represented in a relation that logical sector number=the number of sectors in one track×(surface number+the number of surface×track number)+sector number−1. It should be noted that surface number, track number, and sector number are based on physical address.

In this embodiment, a logical sector is configured so that data of 512 bytes are recorded to one logical sector in terms of user data and one cluster is configured by plural logical sectors. It should be noted that one cluster is generally configured by the number of sectors equal to a power of 2 and is identified by a cluster number which is a serial number starting with 2 which is the beginning of a file area in the data area to which user data are recorded.

In the data area, a cluster number is allocated to each cluster thus set and the data area is accessed on a cluster basis with reference to the cluster number. It should be noted that, in this embodiment, each cluster number is represented in 4-digit hexadecimal notation.

The system area is further divided into a boot area, a FAT (Fail Allocation Table) area, and a directory area. To the boot area, the data for defining a disk structure is recorded. To the FAT area and the directory area, the address information and so on necessary for accessing the AV data recorded in the data area are recorded.

To be more specific, the file name of each file recorded to the data area, the cluster number of the start cluster which is the recording start position of each file and the like are recorded to the directory area. To the FAT area, the cluster numbers of the clusters following the start cluster of each file are recorded. This allows the hard disk 3 to detect the addresses of consecutive clusters constituting one file by detecting the start cluster number of the desired file name from the directory area and then sequentially detecting the cluster numbers following the start cluster number from the FAT area.

As shown in FIG. 16, if file 1 is recorded to clusters having cluster numbers 1234h through 1240h in the data area, the code indicative of cluster number 1234h of a first cluster of file 1 is recorded to the directory area and the cluster numbers following this cluster number 1234h are sequentially recorded to the corresponding areas of the FAT area. It should be noted that, in FIG. 16, EOF (End Of File) is identification information indicative of the last cluster of one file.

To be more specific, the directory area records the file control data for identifying each file recorded in the data area, the file control data having a configuration shown in FIG. 17. Namely, in the file control data, the first 8 bytes are allocated to file name and the next 3 bytes are allocated to extension. The following 1 byte is allocated to attribute followed by 10 bytes allocated to data for reservation. The next 2 bytes are allocated to recording start time, followed by 2 bytes allocated to recording date and time, followed by 2 bytes allocated to cluster number which is the start cluster number. The last 4 bytes are allocated to file length.

The FAT area (FIG. 16) records the identification data indicative of the association of clusters, each of which provides a unit in which the data area is controlled. Namely, in the FAT area, cluster addresses are allocated in correspondence with the cluster numbers in the data area and the cluster numbers of the clusters following the cluster addresses are recorded. As shown in FIG. 18, of the codes which are not allocated to these cluster numbers, predetermined codes are allocated to the identification information indicative of free area, defective cluster, and EOF.

Consequently, the hard disk 3 accesses the FAT area to detect free areas in the data area. Also, the hard disk 3 executes alternative processing with reference to a defective sector. Further, at the time of recording, the hard disk 3 registers a defective sector by retry processing based on write-and-verify operation. Thus, the hard disk 3 is controlled in its information recording surface on a predetermined block basis as with the file control system applied to personal computers.

A servo circuit 4 drives a motor (M) 6 under the control of a hard disk control circuit 5 to drive the hard disk 3 at a predetermined rotational speed. Also, the servo circuit 4 drives a motor (M) 8 to cause the magnetic head to perform a seek operation and perform tracking control.

At the time of recording, a read/write data channel section 9 encodes the output data of the hard disk control circuit 5 by a scheme suited to the characteristics of the recording/reproducing system to generate bit-series data under the control of the hard disk control circuit 5, driving the magnetic head on the basis of the generated data. At the time of reading, the read/write data channel section 9 processes the reproduction signal obtained from the magnetic head to generate reproduction data, outputting them to the hard disk control circuit 5.

The hard disk control circuit 5 controls the data stored on the hard disk 3 as directed by an interface control circuit 7 and controls the operation of the servo circuit 4 in accordance with the AV data entered via a buffer memory 10 and, by outputting the AV data to the read/write data channel section 9, records sequentially the AV data to a cluster specified by the interface control circuit 7. At the time of reading, the hard disk control circuit 5 controls the operation of the servo circuit 4 to output the data from the read/write data channel section 9 to the buffer memory 10, thereby reproducing the cluster specified by the interface control circuit 7.

An interface control circuit (IF control) 7 is constituted by a SCSI (Small Computer System Interface) controller, an IDE (Intelligent Drive Electronics) controller, for example to configure an input/output circuit for inputting and outputting data and control commands to be transferred with the host apparatus 2. Namely, the interface control circuit 7 receives commands from the host apparatus 2 and interprets their parameters to control the operations of the hard disk control circuit 5 and so on. At the time of writing, the interface control circuit 7 outputs via the buffer memory 10 the AV data entered from the host apparatus 2 to the hard disk control circuit 5. On the other hand, at the time of reading, the interface control circuit 7 outputs via the buffer memory 10 the AV data received from the hard disk control circuit 5 to the host apparatus 2.

In response, the host apparatus 2 transmits various commands and so on to the hard disk apparatus 1 as directed by a user on the basis of the processing of a central processing unit (CPU) 2A for which a work area is allocated in a system memory 2B.

In this processing, at a power-on sequence, the central processing unit 2A performs a predetermined processing procedure to issue a command to the hard disk apparatus 1 so as to reproduce the control data stored in the system entry area of the hard disk 3 and records the data in the system entry area consequently outputted from the hard disk apparatus 1 to the system memory 2B. Consequently, the central processing unit 2A gets the control data recorded to the hard disk 3 and sets parameters on the basis of the control data, outputting various commands to the hard disk apparatus 1.

To be more specific, when the reproduction of a predetermined file is specified by the user, the central processing unit 2A detects the corresponding file control data from the system memory 2B to detect the start cluster number from the file control data. The central processing unit 2A also sequentially searches the data in the FAT area on the basis of the start cluster number to detect continuous cluster numbers recorded on the hard disk 3 for the file specified by the user. On the basis of a result of this detection, the central processing unit 2A sets parameters such as start cluster number and data length to issue a reproduction command. In response to the reproduction command, the hard disk apparatus 1 reproduces and outputs the data recorded to the hard disk 3. The central processing unit 2A and the hard disk apparatus 1 retrospectively follow the recordings of the control data on a predetermined data length basis to repeat the issuance of commands and the reproduction of data, thereby reproducing the file specified by the user.

When the recording of data is specified by the user, the central processing unit 2A sequentially follows the data in the FAT area recorded in the system memory 2B to detect a free area and sets parameters for recording data to the clusters in the detected free area, issuing a write command. In response to this write command, the hard disk apparatus 1 records the sequentially entered data to the hard disk 3. The central processing unit 2A and the hard disk apparatus 1 retrospectively follow the recordings of the control data on a predetermined data length basis to repeat the issuance of commands and the recording of data, thereby recording the file specified by the user.

When the recording of a file has been completed as described above, the central processing unit 2A updates the recording of the system memory 2B so as to make the recording of the system memory 2B correspond to the recording of this file and instructs the hard disk apparatus 1 to update the system entry area so as to make the system entry area correspond to the recording of the system memory 2B, thereby newly reproducing of the file recorded as described.

Hard disk apparatuses have a problem of reduced access speed due because it takes time to start the reproduction of data recorded to a hard disk after a seek operation starts (this time is hereinafter referred to as a seek time).

To be more specific, the reproduction of data in a desired cluster by a seek operation in a hard disk apparatus requires the hard disk apparatus to wait from the positioning of the magnetic head to a target track to the scanning of a target cluster by the magnetic head. Therefore, a total time of the time required for moving to the target track (this time is referred to as a seek time) and the time necessary for the scanning of the target cluster (this time is referred to as a rotational delay time) is required for each seek operation.

In hard disk apparatuses, the seek time is as short as about several milliseconds in general. However, if many files are recorded over plural areas in a scattered manner as a result of the repetitive recording/reproducing and editing operations, the time necessary for seek operations becomes not negligible, thereby substantially lowering the transfer rate of the data reproduced from the hard disk, which in turn significantly lowers access speed.

One of the methods to overcome the above-mentioned problem is to access the hard disk by command queuing for example. In this method, the hard disk is sequentially accessed from a reproduction start position nearer than the current position of the magnetic head and the reproduced data are sorted by buffering before being outputted. This method shortens seek time as compared with the access method in which the hard disk is sequentially accessed. However, this method presents a problem of a complicated control mechanism and shortens the seek time only slightly of the time required for an entire seek time, thereby limiting the enhancement in access speed.

Another problem with hard disk apparatuses is that it takes time for them to start up. To be more specific, the hard disk starts rotating when the hard disk apparatus is powered on, the rotational speed of the hard disk is increased to a predetermined level, and then the servo mechanism such as tracking control is locked, thereby making the hard disk ready for access. This process, from power-on to readiness for access, takes about two to three seconds in general in each hard disk apparatus.

Consequently, hard disk apparatuses cannot instantaneously start the reproduction of desired files when they are connected to video equipment for reproducing AV data.

To overcome the above-mentioned problem, a method is proposed in which the hard disk is always rotated to a servo-locked state (namely, holding the hard disk in a standby state). This method, however, involves a problem of waste power dissipation. Therefore, if this method is applied to battery-driven portable equipment, their serviceable time becomes limited. Especially, if a hard disk apparatus is used as the recording unit of a portable imaging device and if the time for holding the standby state is much longer than the time for recording AV data, desired scenes may not be recorded due to the power dissipation for maintaining the standby state.

SUMMARY OF THE INVENTION

It is therefore an object of the present invention to provide an information processing apparatus and method which shorten the time necessary for dubbing as compared with related-art configurations.

It is another object of the present invention to provide an information processing apparatus and method, a control program for controlling the information processing apparatus, and a recording medium recording the control program which effectively avoid the reduction in access time caused by the time required for a seek operation.

It is still another object of the present invention to provide an information processing apparatus and method, a control program for controlling the information processing apparatus, and a recording medium recording the control program which effectively avoid waste power dissipation and instantaneously output the data of desired files.

According to one aspect of the present invention, there is provided an information processing apparatus including:

a recording medium on which a desired file is recorded in a data area divided by a predetermined control unit and control data for controlling the data area are recorded in a control data recording area;

access means for accessing the recording medium to reproduce and output the data recorded on the recording medium; and control means for controlling the access means;

the control data having file control data for identifying at least the desired file recorded in the data area and, identification data, as associated with the file control data, indicating the association in the control unit; and the control means, as directed by a host apparatus, reproducing the control data by controlling the access means, outputting at least the file control data to the host apparatus, and holding at least the identification data in a predetermined memory, sequentially detecting, in response to a read directive based on the control data transmitted from the host apparatus, the control unit in which the desired file associated with the read directive are sequentially recorded on the basis of the identification data held in the predetermined memory, and controlling the access means on the basis of a result of the detection to sequentially reproduce and output data of files associated with the read directive to the host apparatus.

According to another aspect of the present invention, there is provided an information processing apparatus including:

a recording medium on which a desired file is recorded in a data area divided by a predetermined control unit and control data for controlling the data area are recorded in a control data recording area;

access means for accessing the recording medium to record desired data to the recording medium and reproduce and output the desired data recorded to the recording medium; and control means for controlling the access means;

the control data having file control data for identifying at least the desired file recorded in the data area and, identification data, as associated with the file control data, indicating the association in the control unit; and the control means, as directed by a host apparatus, reproducing the control data and holding at least the identification data in a predetermined memory, sequentially detecting, in response to a directive for writing from the host apparatus, the control unit of a free area in the recording medium on the basis of the identification data held in the memory, and controlling the access means on the basis of a result of the detection to sequentially record data of files sequentially entered from the host apparatus to the free area and sequentially updating corresponding the identification data to record the file control data.

According to still another aspect of the present invention, there is provided an information processing apparatus including:

a recording medium on which a desired file is recorded in a data area divided by a predetermined control unit and control data for controlling the data area are recorded in a control data recording area;

access means for accessing the recording medium to reproduce and output the data recorded to the recording medium; and control means for controlling the access means;

the control data having file control data for identifying at least the desired file recorded in the data area and, identification data, as associated with the file control data, indicating the association in the control unit; and the control means, as directed by a host apparatus, reproducing the control data by controlling the access means, outputting at least the file control data to the host apparatus, and holding at least the identification data in a predetermined memory, sequentially detecting, in response to a directive for reading a first file and a second file on the basis of the control data transmitted from the host apparatus, the control unit in which the first file and the second file are sequentially recorded on the basis of the identification data held in the predetermined memory, and controlling the access means on the basis of a result of the detection to alternately reproduce and output data in the first file and the second file in a predetermined unit.

According to still another aspect of the present invention, there is provided an information processing apparatus including:

a recording medium on which a desired file is recorded in a data area divided by a predetermined control unit and control data for controlling the data area are recorded in a control data recording area;

access means for accessing the recording medium to record desired data to the recording medium and reproduce and output the desired data recorded to the recording medium; and control means for controlling the access means;

the control data having file control data for identifying at least the desired file recorded in the data area and, identification data, as associated with the file control data, indicating the association in the predetermined control unit; and the control means, as directed by a host apparatus, controlling the access means to reproduce the control data and hold at least the identification data in a predetermined memory, sequentially detecting, as directed by the host apparatus for writing a first file and a second file, the predetermined control unit of a free area in the recording medium on the basis of the identification data held in the predetermined memory, and sequentially recording, to the free area, data of the first file and the second file alternately entered from the host apparatus in a predetermined unit by controlling the access means on a basis of a result of the detection and sequentially updating corresponding the identification data to record the file control data.

According to still another aspect of the present invention, there is provided an information processing method for accessing a recording medium on which a desired file is recorded in a data area divided by a predetermined control unit and control data for controlling the data area are recorded in a control data recording area, the control data having file control data for identifying at least the desired file recorded in the data area and, identification data, as associated with the file control data, indicating the association in the predetermined control unit;

the information processing method including the steps of:

reproducing, as directed by a host apparatus, the control data to output at least the file control data to the host apparatus and holding at least the identification data in a predetermined memory;

sequentially detecting, as directed by the host apparatus for reading on the basis of the control data, the control unit in which files associated with the read directive are sequentially recorded on the basis of the identification data held in the predetermined memory; and sequentially reproducing and outputting, on the basis of a result of the detection, data of the files associated with the read directive.

According to still another aspect of the present invention, there is provided an information processing method for accessing a recording medium on which a desired file is recorded in a data area divided by a predetermined control unit and control data for controlling the data area are recorded in a control data recording area, the control data having file control data for identifying at least the desired file recorded in the data area and, identification data, as associated with the file control data, indicating the association in the predetermined control unit;

the information processing method including the steps of:

reproducing, as directed by a host apparatus, the control data and holding at least the identification data in a predetermined memory;

sequentially detecting, as directed by the host apparatus, the control unit of a free area in the recording medium on the basis of the identification data held in the predetermined memory; and sequentially recording, on the basis of a result of the detection, data of files sequentially entered from the host apparatus to the free area and sequentially updating the identification data to record the file control data.

According to still another aspect of the present invention, there is provided an information processing method for accessing a recording medium on which a desired file is recorded in a data area divided by a predetermined control unit and control data for controlling the data area are recorded in a control data recording area, the control data having file control data for identifying at least the desired file recorded in the data area and, identification data, as associated with the file control data, indicating the association in the predetermined control unit;

the information processing method including the steps of:

reproducing, as directed by a host apparatus, the control data to output at least the file control data to the host apparatus and holding at least the identification data in a predetermined memory;

sequentially detecting, as directed by the host apparatus for reading a first file and a second file on the basis of the control data, the control unit in which the first file and the second file are sequentially recorded on the basis of the identification data held in the predetermined memory; and alternately reproducing and outputting, on the basis of a result of the detection, data in the first file and the second file in a predetermined unit.

According to still another aspect of the present invention, there is provided an information processing method for accessing a recording medium on which a desired file is recorded in a data area divided by a predetermined control unit and control data for controlling the data area are recorded in a control data recording area, the control data having file control data for identifying at least the desired file recorded in the data area and, identification data, as associated with the file control data, indicating the association in the predetermined control unit;

the information processing method including the steps of:

reproducing, as directed by a host apparatus, the control data and holding at least the identification data in a predetermined memory;

sequentially detecting, as directed by the host apparatus for writing a first file and a second file, the control unit of a free area in the recording medium on the basis of the identification data held in the predetermined memory; and sequentially recording, on the basis of a result of the detection, to the free area, data in the first file and the second file alternately entered from the host apparatus in a predetermined unit and sequentially updating corresponding the identification data to record the file control data.

According to still another aspect of the present invention, there is provided an information processing apparatus including:

driving means for driving recordable at least a recording medium;

access means for signal-processing a reproduction signal obtained from the recording medium and reproducing data recorded to the recording medium;

a memory for holding the reproduction data outputted from the access means; and control means for controlling operations of the driving means, the access means, and the memory;

wherein the control means, at the time of startup, controls the operations so that the data recorded to the recording medium are reproduced by an amount equivalent to a predetermined period of time for each reproduction start position of a file recorded to the recording medium and, upon being instructed for reproduction, controls the operations so that, after outputting corresponding data from the memory, data that follow the corresponding data are reproduced from the recording medium.

According to still another aspect of the present invention, there is provided an information processing apparatus including:

driving means for driving recordable at least a recording medium;

access means for signal-processing a reproduction signal obtained from the recording medium to reproduce data recorded on the recording medium and recording predetermined data to the recording medium;

a non-volatile memory for holding the data; and control means for controlling operations of the driving means, the access means, and the non-volatile memory;

wherein the control means records, of sequentially entered data, data of an amount equivalent to a period of time from a reproduction start position into the non-volatile memory and then records data that follow the data recorded in the non-volatile memory to the recording medium.

According to still another aspect of the present invention, there is provided a control method for controlling an information processing apparatus for driving a recording medium under predetermined conditions to access the recording medium, including the steps of:

reproducing, upon startup, data of an amount equivalent to a predetermined period of time from a reproduction start position of data recorded to the recording medium and holding the reproduced data in a memory;

starting to drive the recording medium upon instruction for reproducing a file recorded to the recording medium; and outputting the data held in the memory and then outputting the data reproduced from the recording medium.

According to still another aspect of the present invention, there is provided a control method for an information processing apparatus for driving a recording medium under predetermined conditions to access the recording medium, including the steps of:

recording, upon instruction for recording, of sequentially entered data, data of an amount equivalent to a predetermined period of time from a reproduction start position into a memory; and recording data that follow the data recorded in the memory to the recording medium.

According to still another aspect of the present invention, there is provided a control program for an information processing apparatus for driving a recording medium under predetermined conditions to access the recording medium, including the steps of:

reproducing, upon startup, data of an amount equivalent to a predetermined period of time from a reproduction start position of data recorded to the recording medium and holding the reproduced data in a memory;

starting to drive the recording medium, upon instruction for reproducing a file recorded to the recording medium; and outputting the data held in the memory and then outputting the data reproduced from the recording medium.

According to still another aspect of the present invention, there is provided a control program for an information processing apparatus for driving a recording medium under predetermined conditions to access the recording medium, including the steps of:

recording, upon instruction for recording, of sequentially entered data, data of an amount equivalent to a predetermined period of time from a reproduction start position into a memory; and recording data that follow the data recorded in the memory to the recording medium.

According to still another aspect of the present invention, there is provided a recording medium recording a control program for an information processing apparatus for driving a recording medium under predetermined conditions to access the recording medium, including the steps of:

reproducing, upon startup, data of an amount equivalent to a predetermined period of time from a reproduction start position of data recorded to the recording medium and holding the reproduced data in a memory;

starting to drive the recording medium upon instruction for reproducing a file recorded to the recording medium; and outputting the data held in the memory and then outputting the data reproduced from the recording medium.

According to still another aspect of the present invention, there is provided a recording medium recording a control program for an information processing apparatus for driving a recording medium under predetermined conditions to access the recording medium, including the steps of:

recording, upon instruction for recording, of sequentially entered data, data of an amount equivalent to a predetermined period of time from a reproduction start position into a memory; and recording data that follow the data recorded in the memory to the recording medium.

According to still another aspect of the present invention, there is provided an information processing apparatus for accessing a disk type recording medium, including:

seek means for making a pickup seek a desired track;

access means for signal-processing a reproduced signal obtained through the pickup to reproduce data recorded in the disk type recording medium;

a memory for holding, when the data are recorded to the disk type recording medium, the data allocated to the start portion of a position which must be accessed by seeking at the time of reproduction at least for a period of time from starting of the seeking to a time at which the disk type recording medium becomes reproducible; and control means for controlling operations of the seek means, the access means, and the memory;

wherein, under the control of the control means, the data held in the memory are outputted at least for a period in which it is difficult to reproduce data from the disk type recording medium because of the seeking by the seek means.

According to still another aspect of the present invention, there is provided a control method for an information processing apparatus for accessing a disk type recording medium, including the steps of:

recording, when the data are recorded to the disk type recording medium, in a predetermined memory, the data allocated to the start portion of a position which must be accessed by seeking at the time of reproduction at least for a period of time from starting of the seeking to a time at which the disk type recording medium becomes reproducible; and reproducing the data by outputting the data held in the predetermined memory at least for a period in which it is difficult to reproduce data from the disk type recording medium because of the seeking by the seek means.

According to still another aspect of the present invention, there is provided a control program for an information processing apparatus for accessing a disk type recording medium, including the steps of:

recording, when the data are recorded to the disk type recording medium, in a predetermined memory, the data allocated to the start portion of a position which must be accessed by seeking at the time of reproduction at least for a period of time from starting of the seeking to a time at which the disk type recording medium becomes reproducible; and reproducing the data by outputting the data held in the predetermined memory at least for a period in which it is difficult to reproduce data from the disk type recording medium because of the seeking by the seek means.

According to still another aspect of the present invention, there is provided a recording medium recording a control program for an information processing apparatus for accessing a disk type recording medium, including the steps of:

recording, when the data are recorded to the disk type recording medium, in a predetermined memory, the data allocated to the start portion of a position which must be accessed by seeking at the time of reproduction at least for a period of time from starting of the seeking to a time at which the disk type recording medium becomes reproducible; and reproducing the data by outputting the data held in the predetermined memory at least for a period in which it is difficult to reproduce data from the disk type recording medium because of the seeking by the seek means.

According to the present invention, as directed by a host apparatus, the control data are reproduced by controlling the access means, outputting at least the file control data to the host apparatus, and at least the identification data are held in a predetermined memory; in response to a read directive based on the control data transmitted from the host apparatus, the control unit is sequentially detected in which the desired file associated with the read directive is sequentially recorded on the basis of the identification data held in the predetermined memory; and the access means is controlled on the basis of a result of the detection to sequentially reproduce and output data of files associated with the read directive to the host apparatus. This allows the information processing apparatus side to sequentially detect the control unit, and to reproduce and output the file to the host apparatus. Consequently, the host apparatus may only transmit a single command which is a directive for reading one file to the source apparatus to continuously obtain the data of one file, thereby saving the repetitive issuance of commands to enhance the data transfer rate, which in turn shortens the time required for dubbing.

According to the present invention, as directed by a host apparatus, the control data are reproduced and at least the identification data are held in a predetermined memory; in response to a directive for writing from the host apparatus, the control unit of a free area in the recording medium is sequentially detected on the basis of the identification data held in the memory; and, on the basis of a result of the detection, the access means is controlled to sequentially record data of files sequentially entered from the host apparatus to the free area and the corresponding identification data are sequentially updated to record the file control data. This allows the information processing apparatus side to sequentially detect free areas to record files therein. Consequently, the host apparatus may only transmit a single command which is a directive for writing one file to the source apparatus to continuously transmit the data of one file for recording, thereby saving the repetitive issuance of commands to enhance the data transfer rate, which in turn shortens the time required for dubbing.

According to the present invention, as directed by a host apparatus, the control data are reproduced by controlling the access means, outputting at least the file control data to the host apparatus and at least the identification data are held in a predetermined memory; in response to a directive for reading a first file and a second file on the basis of the control data transmitted from the host apparatus, the control unit is sequentially detected in which the first file and the second file are sequentially recorded on the basis of the identification data held in the predetermined memory; and, on the basis of a result of the detection, the access means is controlled to alternately reproduce and output data in the first file and the second file in a predetermined unit. This allows the information processing apparatus side to sequentially detect the control unit, and to reproduce and output the first and second files to the host apparatus. Consequently, the host apparatus may only transmit a single command which is a directive for reading the first and second files to the source apparatus to alternately obtain the date in the first and second files, thereby saving the repetitive issuance of commands to enhance the data transfer rate, which in turn shortens the time required for dubbing.

According to the present invention, as directed by a host apparatus, the access means is controlled to reproduce the control data and at least the identification data is held in a predetermined memory; as directed by the host apparatus for writing a first file and a second file, the control unit of a free area in the recording medium is sequentially detected on the basis of the identification data held in the predetermined memory; and data of the first file and the second file alternately entered from the host apparatus in a predetermined unit are sequentially recorded to the free area by controlling the access means on a basis of a result of the detection and the corresponding identification data are sequentially updated to record the file control data. This allows the information processing apparatus side to sequentially detect free areas to record the first and second files therein. Consequently, the host apparatus may only transmit a single command which is a directive for writing the first and second files to the source apparatus to alternately transmit the data in the first and second files for recording, thereby saving the repetitive issuance of commands to enhance the data transfer rate, which in turn shortens the time required for dubbing.

According to the present invention, there is provided an information processing method for shortening the time necessary for dubbing.

According to the present invention, there is provided an information processing apparatus for accessing a disk type recording medium including a memory for holding, when the data are recorded to the disk type recording medium, the data allocated to the start portion of a position which must be accessed by seeking at the time of reproduction at least for a period of time from starting of the seeking to a time at which the disk type recording medium becomes reproducible, wherein the data held in the memory are outputted for a period in which it is difficult to reproduce data from the disk type recording medium because of the seeking. Consequently, the data held in the memory are allocated during a period in which it is difficult to reproduce data because of the seeking, thereby continuously outputting the data to effectively prevent the access speed from being lowered by the seeking.

According to the present invention, there are provided a control method for an information processing apparatus, a control program for the information processing apparatus, and a recording medium recording the control program which can effectively prevent the access speed from being lowered by seeking.

According to the present invention, data recorded to a recording medium are reproduced and recorded to a memory for every reproduction start position of a file recorded to the recording medium for a predetermined period of time at the time of startup and, upon instruction for reproduction, the corresponding data stored in the memory are outputted and then the following data are reproduced from the recording medium. This allows to output, upon instruction for reproduction, the data prefetched and held in the memory at the time of startup and then output the data reproduced from the recording medium. Consequently, by starting the driving of the recording medium upon instruction for starting reproduction, power dissipation can be prevented and the prefetched data can be used until the recording medium becomes accessible, thereby preventing waste power dissipation from occurring and instantaneously outputting the data of a desired file.

According to the present invention, there is provided an information processing apparatus, wherein, upon instruction for recording, of sequentially entered data, the data of an amount equivalent to a predetermined period of time from a reproduction start position are recorded in a memory and the data following the data recorded in the memory are recorded to a recording medium, so that, upon instruction for reproduction, the data reproduced from the recording medium can be outputted after outputting the data recorded in the memory. Consequently, by starting the driving of the recording medium upon instruction for reproduction to prevent power dissipation, the data held in the memory can be used until the recording medium becomes accessible, thereby effectively preventing waste power dissipation from occurring and instantaneously outputting the data of a desired file.

According to the present invention, there is provided a control method for an information processing apparatus which can effectively prevent waste power dissipation and instantaneously output the data of a desired file.

According to the present invention, there is provided a control program for an information processing apparatus which can effectively prevent waste power dissipation and instantaneously output the data of a desired file.

According to the present invention, there is provided a recording medium recording a control program for an information processing apparatus which can effectively prevent waste power dissipation and instantaneously output the data of a desired file.

BRIEF DESCRIPTION OF THE DRAWINGS

These and other objects of the invention will be seen by reference to the description, taken in connection with the accompanying drawing, in which:

FIG. 3 is a flowchart describing a processing procedure of the AV system 11 to be executed at a power-on sequence;

FIG. 8 is a diagram illustrating a multiple-write command;

FIG. 9 is a diagram illustrating a multiple-read command;

FIG. 17 is a diagram illustrating data to be recorded to a directory area shown in FIG. 16;

FIG. 18 is a diagram illustrating codes to be recorded to a FAT area shown in FIG. 16;

FIG. 22 is a diagram illustrating a read command to be used in the processing of FIG. 21;

FIG. 31 is a diagram illustrating recording areas in the video camera shown in FIG. 30;

FIGS. 38A through 38D are diagrams illustrating editing jobs;

FIGS. 39A through 39E are diagrams illustrating a reproducing operation as contrasted with FIGS. 38A through 38D.

FIG. 41 is a diagram illustrating another example of file information indicative of link relationships between files;

FIGS. 42A through 42D are diagrams illustrating file processing in a video camera practiced as a second embodiment of the invention;

FIG. 45 is a diagram illustrating recording areas in the video camera shown in FIG. 44;

DETAILED DESCRIPTION OF PREFERRED EMBODIMENTS

This invention will be described in further detail by way of example with reference to the accompanying drawings.

(1) Configuration of the First Embodiment

Figure 2:
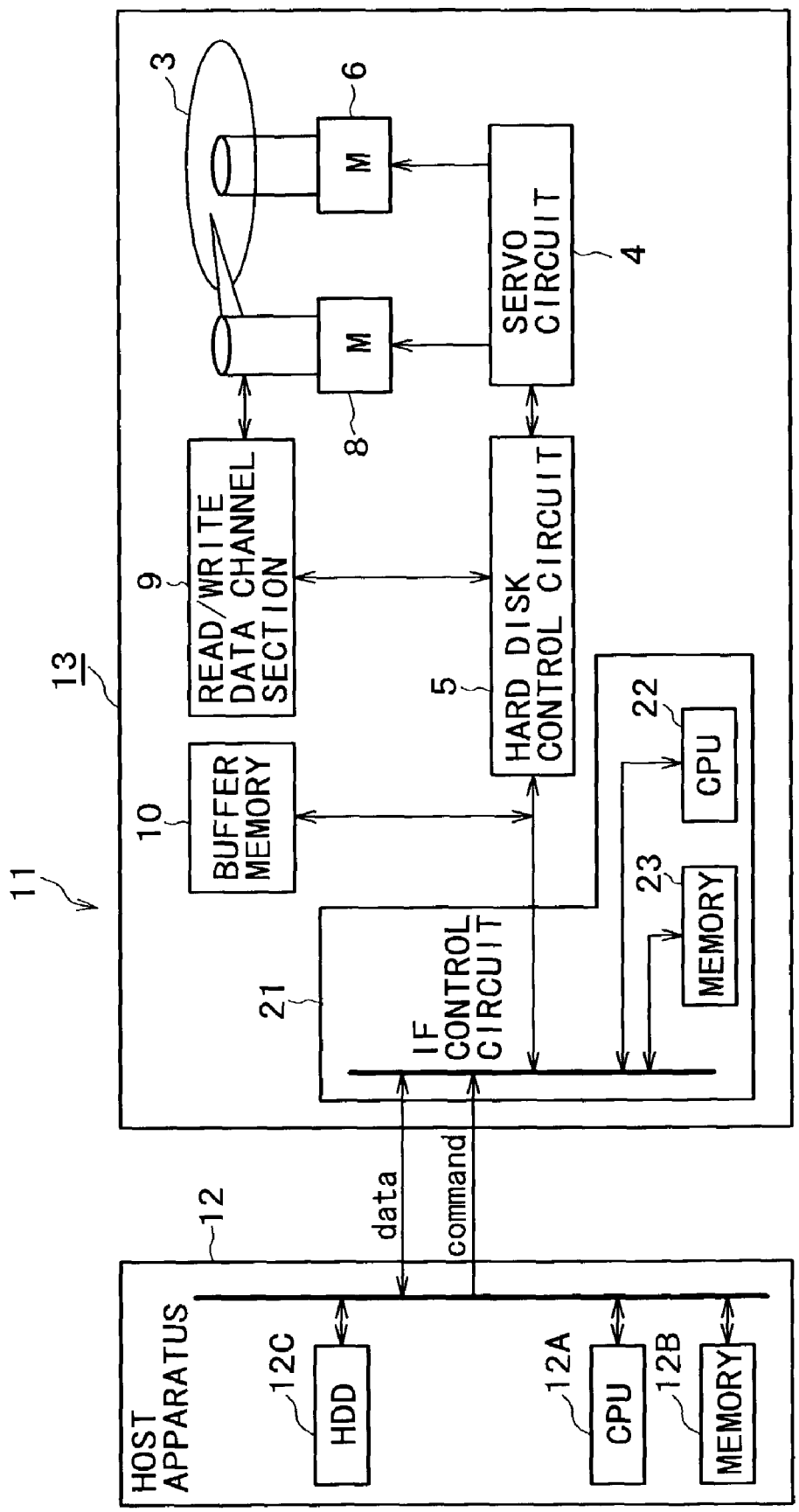
FIG. 2 is a block diagram illustrating the AV system 11.
Figure 15:
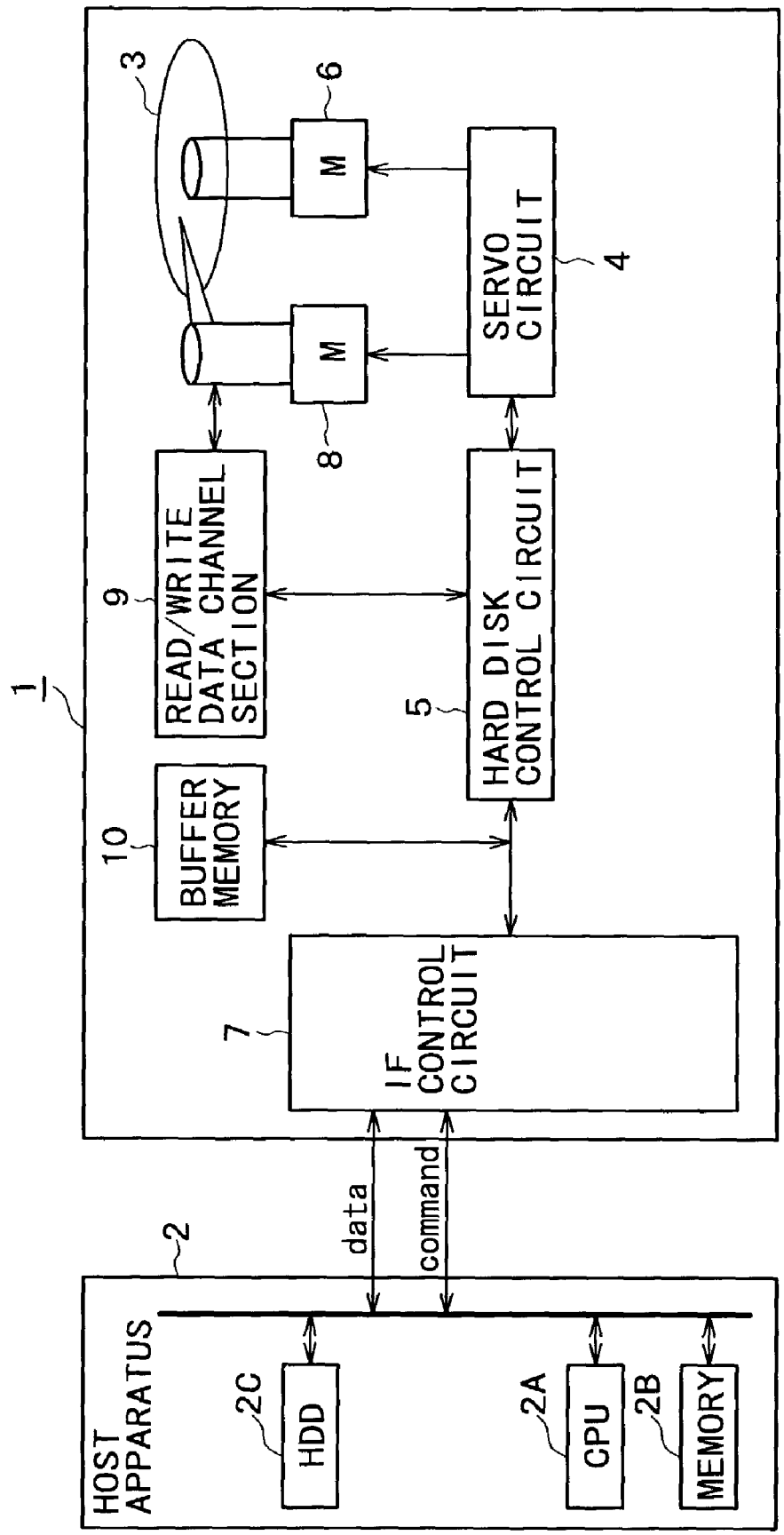
FIG. 15 is a block diagram illustrating an AV system having a related-art configuration.

Referring to FIG. 2, there is shown a block diagram illustrating an AV system associated with one embodiment of the invention. In an AV system 11, a hard disk apparatus 13 is connected to a host apparatus 12, which is one of video devices, and AV data outputted therefrom are recorded on the hard disk apparatus 13. The host apparatus 12 is a video device which records and holds AV data composed of moving and still images onto a mass-storage recording medium such as a hard disk drive 12C for example and is constituted by an electronic still camera or a video camera for example. It should be noted that, with reference to FIG. 2, components similar to those previously described with reference to FIG. 15 are denoted by the same reference numerals and will be not described in a duplicate manner.

In the hard disk apparatus 13, a hard disk 3 is adapted to control a data area by control data recorded on a system entry area as with related art.

An interface control circuit (IF control) 21 is constituted by a SCSI controller, an IDE controller, or an ATA controller for example to configure an input/output circuit for inputting and outputting data, control commands or the like to be transferred with the host apparatus 12. Namely, the interface control circuit 21 receives commands inputted from the host 12 at its internal bus and outputs these commands to a central processing unit (CPU) 22. The interface control circuit 21 receives, at its internal bus, various commands obtained by analysis of the commands in the central processing unit 22 to output the obtained commands to a hard disk control circuit 5 and so on.

Also, the interface control circuit 21 outputs AV data entered by the host apparatus 12 to the hard disk control circuit 5 via a buffer memory 10 as a result of the transmission of the above-mentioned commands. At the time of reproduction, the interface control circuit 21 outputs AV data received from the hard disk control circuit 5 to the host apparatus 12 via the buffer memory 10, stores the data of a system entry area obtained by reproducing the data stored in the hard disk 3 into a memory 23, and outputs these data to the host apparatus 12.

The central processing unit 22 is a controller for controlling the operation of the hard disk apparatus 13, analyzes the commands entered via the internal bus, transmits various commands obtained by the analysis to the hard disk control circuit 5, and transmits various status data and so on to the host apparatus 12.

The memory 23 constitutes a work area of the central processing unit 22 and records and holds the data necessary for the processing by the central processing unit 22.

In the host apparatus 12, the hard disk drive 12C records and holds AV data. A central processing unit 12A is a controller for controlling the operation of the host apparatus 12, controlling the operation of the entire host apparatus 12 by executing a processing procedure by allocating a work area in a memory 12B.

In this AV system 11, by the cooperation between the central processing unit 12A arranged in the host apparatus 12 and the central processing unit 22 arranged in the hard disk apparatus 13, AV data are written to the hard disk 3 and read therefrom.

Referring to FIG. 3, there is shown a flowchart describing a processing procedure of the central processing unit 12A and 22 to be executed at a power-on sequence. In the AV system 11, central processing unit 12A of the host apparatus 12 goes from step SP141 to step SP142 at the time of power-on sequence for example, issuing a system entry area read command. In step SP143, the central processing unit 22 of the hard disk apparatus 13 controls the operation of the hard disk control circuit 5 so that the data in the system entry area are reproduced in response to this command and stores the resultant system entry area data into the memory 23.

In step SP144, of the system entry area data thus obtained, the central processing unit 22 transmits boot area data and directory area data to the host apparatus 12. In the central processing unit 12A of the host apparatus 12, the received boot area data and directory area data are stored in the memory 12B in step SP145. This processing procedure comes to an end in step SP146.

Consequently, in the AV system 11, only the file control data indicative of the file contents recorded to the hard disk 3 are managed by the host apparatus 12, thereby dividing the management of system entry area into that to be performed by the host apparatus 12 and that to be performed by the hard disk apparatus 13 to enhance data transfer rate.

Figure 1:
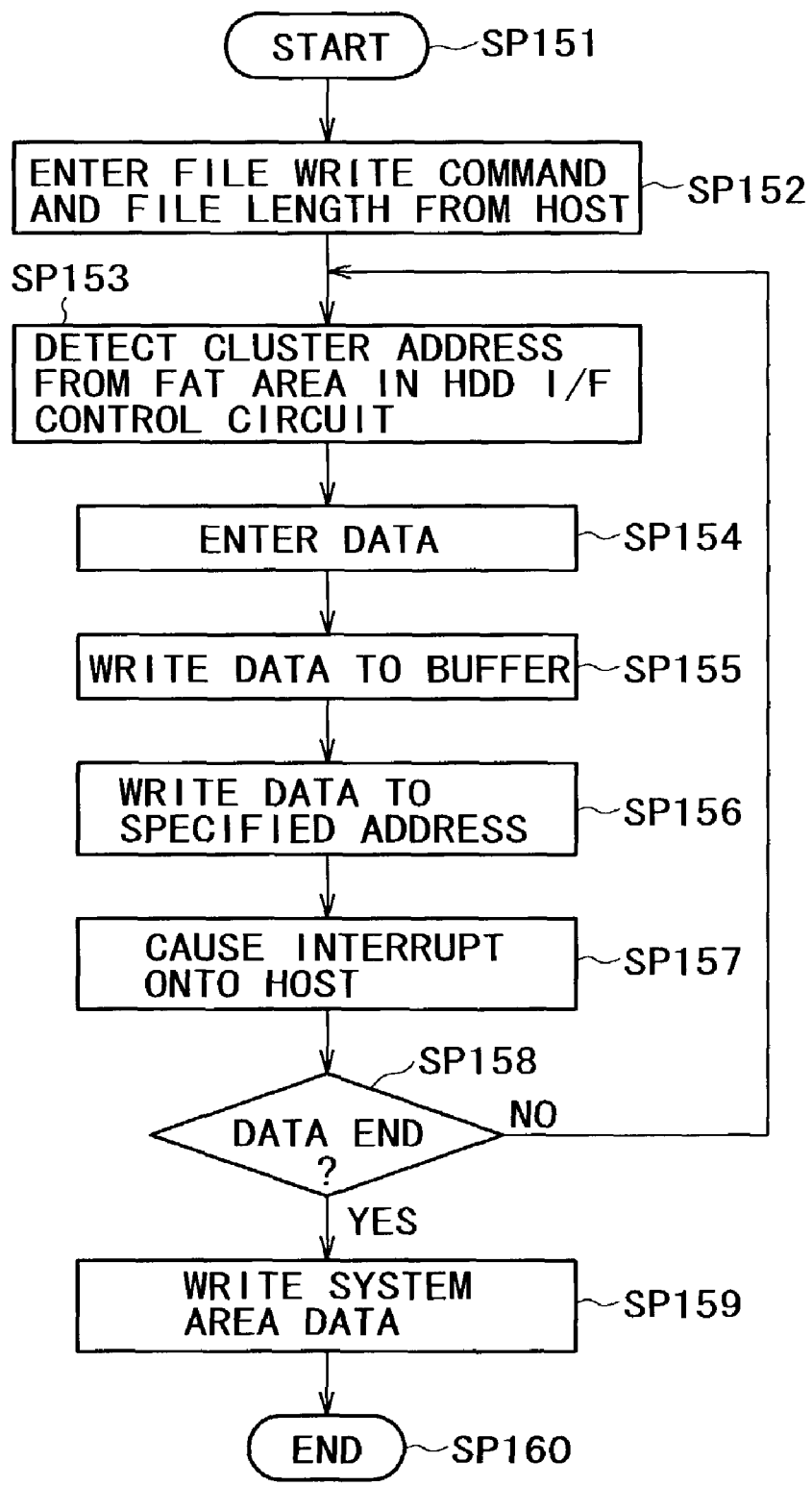
FIG. 1 is a flowchart describing a processing procedure for writing data in an AV system 11 practiced as one embodiment of the invention.

Referring to FIG. 1, there is shown a flowchart describing a processing procedure to be executed at the time of writing AV data. In this case, the central processing unit 12A of the host apparatus 12 goes from step SP151 to step SP152 to issue a file write command for an AV data file to be written. In the present embodiment, the central processing unit 12A issues the write command by setting a command code, a file name, and a file length as parameters.

In step SP53, the central processing unit 22 of the hard disk apparatus 13 searches the FAT data recorded in the memory 23 for cluster numbers (free cluster addresses) sequentially each set with a code indicative of free area.

Upon detection of the free cluster addresses as described above, the central processing unit 22 of the hard disk apparatus 13 transmits a response to the host apparatus 12 to enter, only by a predetermined amount, the AV data to be recorded. In step SP155, the central processing unit 22 stores the entered AV data into the buffer memory 10.

In step SP156, the central processing unit 22 specifies each free cluster detected in step SP153 as an address and instructs the hard disk control circuit 5 to record the AV data held in the buffer memory 10, thereby recording the AV data entered in step SP154 to the hard disk 3. Next, in step SP157, the central processing unit 22 causes an interrupt onto the host apparatus 12, by which the central processing unit 12A of the host apparatus 12 determines in step SP158 whether all of the AV data haven been recorded or not. If the decision is NO, the central processing unit 12A of the host apparatus 12 transmits next AV data to the hard disk apparatus 13, upon which the central processing unit 22 of the hard disk apparatus 13 returns to step SP152 to repeat the AV data processing.

Consequently, in the present embodiment, by a single issuance of read command, free clusters are sequentially detected on the side of the hard disk apparatus 13 to record continuous AV data, without repetitively issuing commands, thereby enhancing data transfer rate.

When the recording of continuous AV data has been completed as described above, the decision of the central processing unit 12A in step SP158 is YES, and therefore the central processing unit 12A of the host apparatus 12 notifies the hard disk apparatus 13 of the end of the processing.

As a result, in step SP159, the central processing unit 22 of the hard disk apparatus 13 updates the recordings of the memory 23 and the hard disk 3 so that these recordings correspond to the recording of AV data to the hard disk 3. In addition, the central processing unit 22 transmits the directory information corresponding to the new recording of AV data file to the host apparatus 12, which adds the received directory information to the memory 12B. Then, the central processing unit 22 goes to step SP160 to end this processing procedure.

Figure 4:
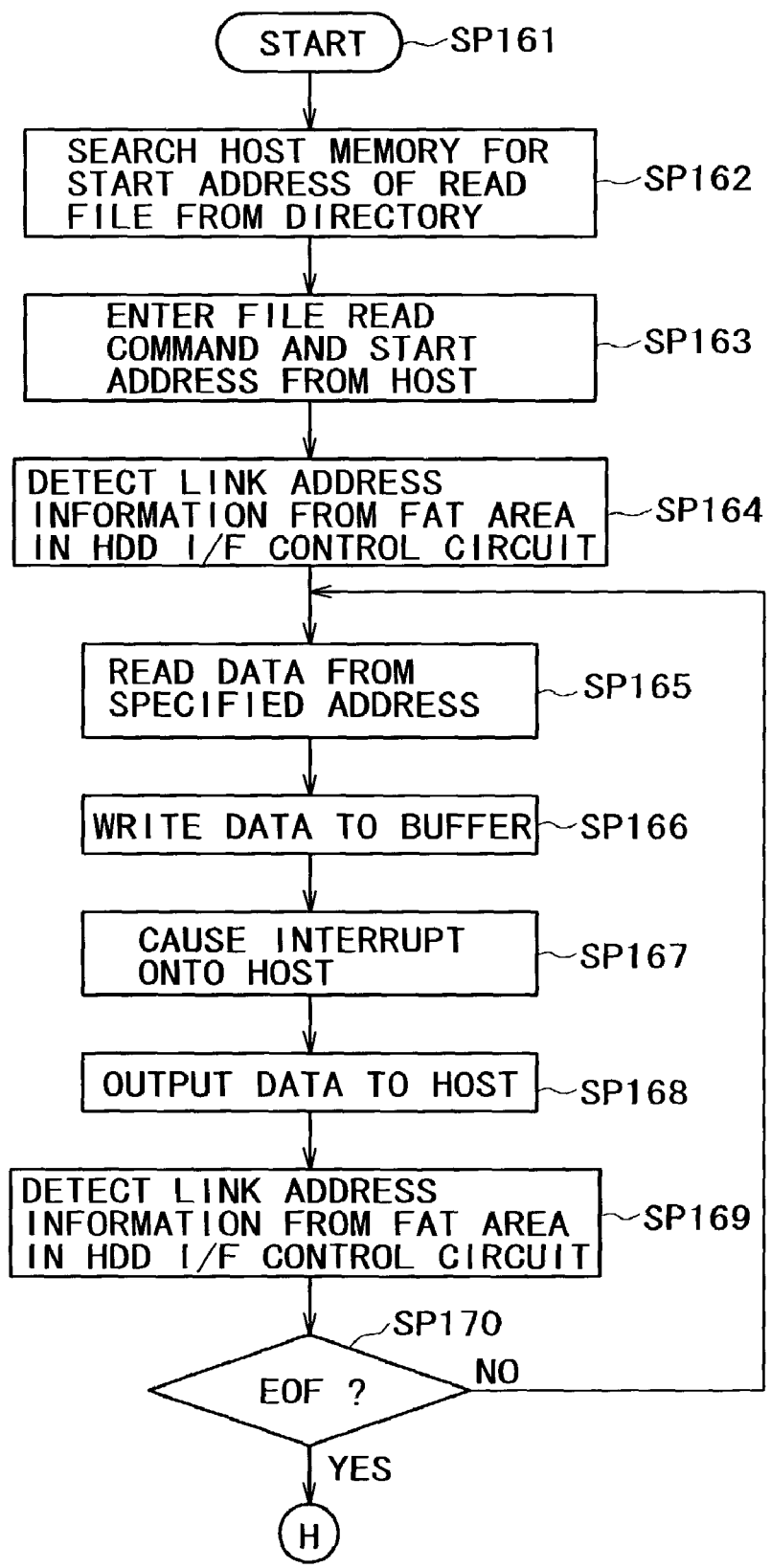
FIG. 4 is a flowchart describing a processing procedure of the AV system 11 to be executed at a read operation.
Figure 5:
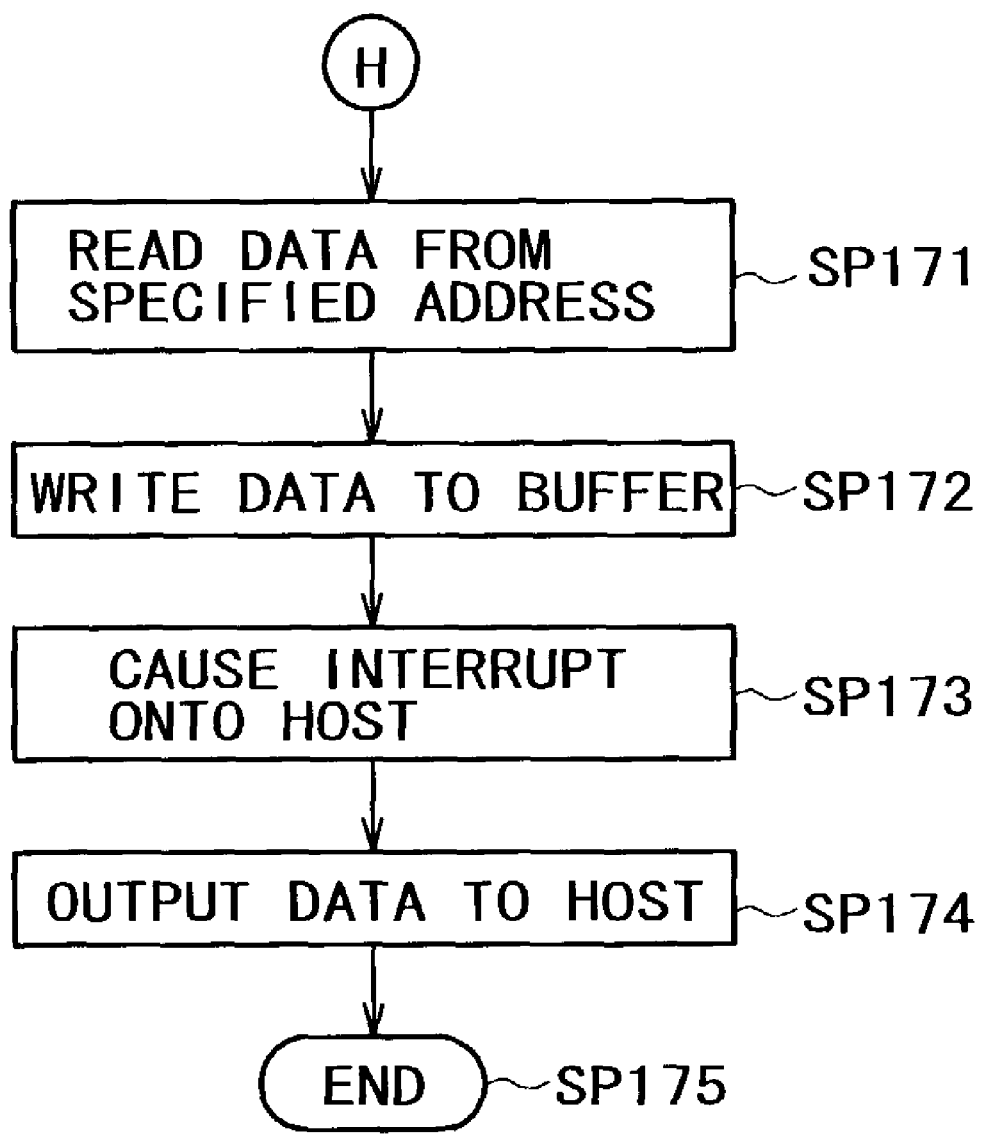
FIG. 5 is a flowchart continued from the flowchart of FIG. 4.

FIGS. 4 and 5 are a flowchart indicative of a processing procedure to be executed at the time of a read operation. In this case, the central processing unit 12A of the host apparatus 12 goes from step SP161 to step SP162 to access the memory 12B, detecting, from the directory information, the start address of a file associated with reading.

In step SP163, the central processing unit 12A sets the obtained start address and so on as parameters to issue a read command. When this read command is issued, the central processing unit 22 of the hard disk apparatus 13 searches, in step SP164, data in the FAT area recorded to the memory 23 for corresponding link cluster numbers sequentially. In step SP165, the central processing unit 22 sets each detected cluster number as an address and instructs the hard disk control circuit 5 to read a predetermined amount of data, thereby reading AV data from the hard disk 3. In step SP166, the central processing unit 22 stores the retrieved AV data into the buffer memory 10 and then causes an interrupt onto the host apparatus 12 in step SP167.

When this interrupt causes the host apparatus 12 to permit the data transfer, the central processing unit 22 transfers the AV data from the buffer memory 10 to the host apparatus 12 in step 168. In step SP169, the central processing unit 22 detects the next cluster number from the memory 23. In step SP170, the central processing unit 22 determines from a detection result in step SP169 whether an EOF has been reached. If the decision is NO, the central processing unit 22 returns to step SP165.

Consequently, in the present embodiment, by a single file read command, the clusters of continuous AV data are detected on the side of the hard disk apparatus 13 and the AV data are read in units of predetermined data amount by these clusters to be outputted to the host apparatus 12. As a result, in the AV system 11, the read command need not be repetitively issued, thereby enhancing AV data transfer rate.

When an EOF has been reached after sequentially reproducing the continuous AV data, the central processing unit 22 goes to step SP171 (FIG. 5) because the decision is YES in step SP170, thereby instructing the hard disk control circuit 5 to read the AV data up to the detected EOF. In step SP172, central processing unit 22 stores the retrieved AV data into the buffer memory 10. In step SP173, the central processing unit 22 causes an interrupt onto the host apparatus 12. When this interrupts causes the host apparatus 12 to permit the data transfer, the central processing unit 22 transmits the AV data from the buffer memory 10 to the host apparatus 12 in step SP174 and goes to step SP175 to end this processing procedure.

Figure 6:
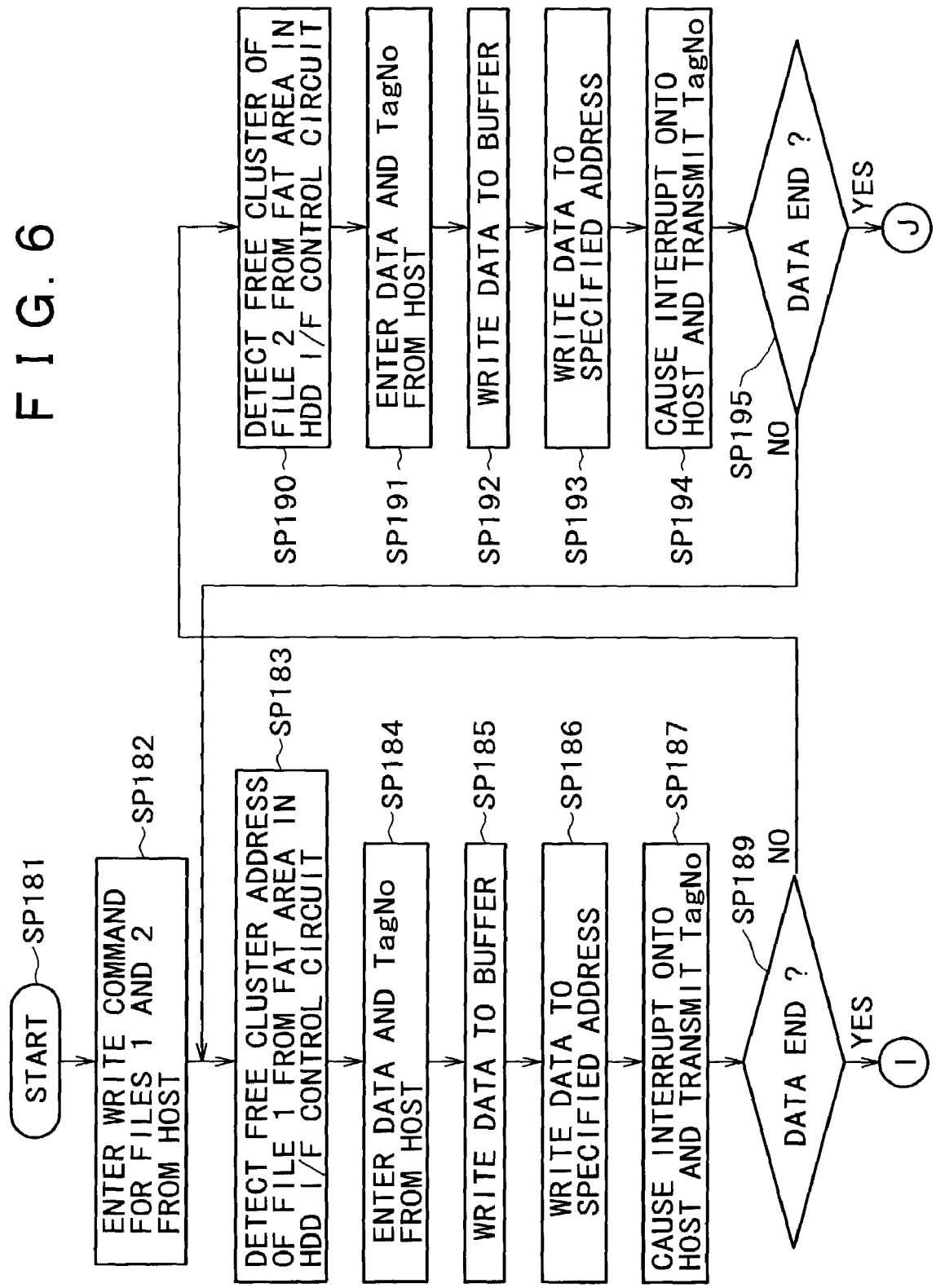
FIG. 6 is a flowchart describing a processing procedure of the AV system 11 to be executed at a multiple-write operation.
Figure 7:
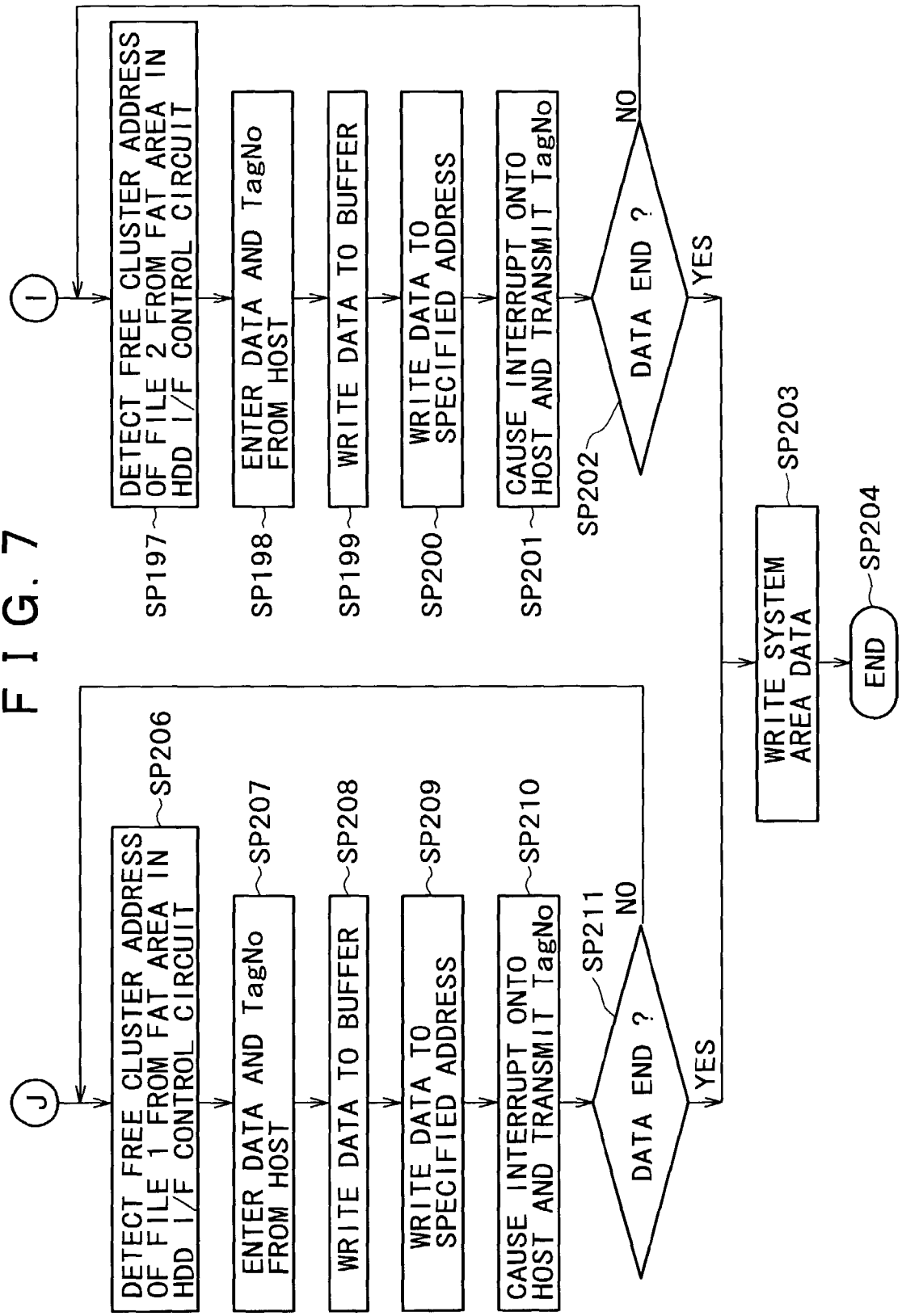
FIG. 7 is a flowchart continued from the flowchart of FIG. 6.

FIGS. 6 and 7 are flowcharts describing a processing procedure for processing two files by multiple write operations.

Figure 8:
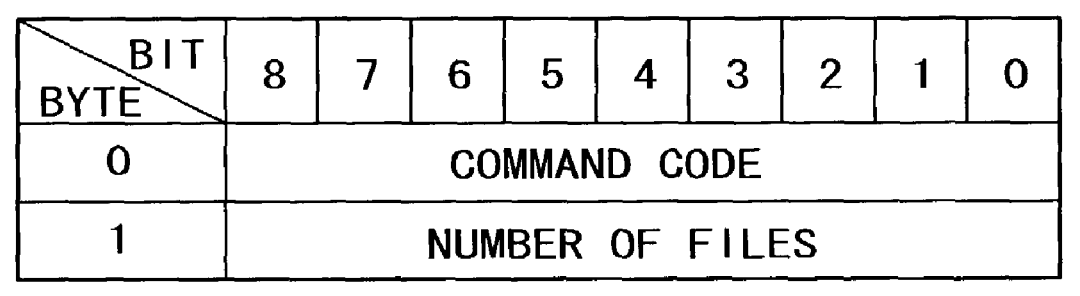

In this case, the central processing unit 12A of the host apparatus 12 goes from step SP181 to step SP182 to issue a multiple-write command. The multiple-write command is formed by setting the number of files associated with writing to a command code as shown in FIG. 8.

Consequently, in the hard disk apparatus 13, the AV data of multiple files specified in this write command and entered from the host apparatus 12 in a predetermined sequence and in units of predetermined data amount depending on the processing by the host apparatus 12 are identified by a target number to be described later, a free area is detected for each of these files, and the AV data are recorded to the detected free area on the hard disk 3.

To be more specific, if the number of files to be written by this command is set to 2, the issuance of this command causes the central processing unit 22 of the hard disk apparatus 13 to search the control data in the memory 23 in step SP183 for the cluster number set with a code indicative of a free area for file 1. When a response comes from the hard disk apparatus 13, the central processing unit 12A of the host apparatus 12 sets a target number (TagNo) which is the identification code of file 1 associated with the multiple-write operation in step SP184 and outputs the AV data of file 1 indicated by this target number. In step SP185, the central processing unit 22 of the hard disk apparatus 13 stores the AV data in this file into the buffer memory 10.

In step SP186, the central processing unit 22 records the AV data from the buffer memory 10 to the cluster detected in step SP183 and causes an interrupt onto the host apparatus in step SP187. It should be noted that the interrupt caused here is executed by sending the target number of the file of which recording has been completed. Upon detecting this interrupt, the central processing unit 12A of the host apparatus 12 goes to step SP189 to determine whether the recording of file 1 has been completed. If the decision is NO, then the central processing unit 12A returns a predetermined response to the hard disk apparatus 13, going to step SP190.

Upon reception of this response, the central processing unit 22 of the hard disk apparatus 13 detects a cluster number set with a code indicative of a free area for file 2 in step SP190. In addition, upon reception of the response from the hard disk apparatus 13, the central processing unit 12A of the host apparatus 12 sets a target number (TagNo) which is the identification code of file 2 associated with the multiple writing in step SP191 and outputs the data of file 2 indicated by this target number. In step SP192, the central processing unit 22 of the hard disk apparatus 13 stores the data in this file into the buffer memory 10.

In step SP193, the central processing unit 22 records the AV data from the buffer memory 10 to the free cluster detected in step SP190. In step SP194, the central processing unit 22 causes an interrupt onto the host apparatus in the same manner as with step SP187. This interrupt causes the central processing unit 12A of the host apparatus 12 to go to step SP195 to determine whether the recording of file 2 has been completed. If the decision is NO, the central processing unit 12A returns a predetermined response to the hard disk apparatus 13, going to step PS183.

Consequently, in this AV system 11, the AV data in files 1 and 2 are alternately outputted to the hard disk apparatus 13 in units of data amount which do not cause the buffer memory in the host apparatus to overflow or underflow. By the detection of the free clusters on the hard disk apparatus 13, the AV data in files 1 and 2 are sequentially recorded to the hard disk 3.

When the recording of all AV data has been completed for file 1, the host apparatus 12 transmits to the hard disk apparatus 13, because the decision is YES in step S189, the information indicative of the completion of the recording of file 1 and a file ID for identifying the file of the AV data to be transmitted next, thereby going to step SP197 (FIG. 7). Then, the central processing unit 22 of the hard disk apparatus 13 detects a following free cluster for file 2. Upon response from the hard disk apparatus 13, the central processing unit 12A of the host apparatus 12 outputs the target number (TagNo) of file 2 and the data in file 2 to the hard disk apparatus 13 in step SP198. In step SP199, the central processing unit 22 of the hard disk apparatus 13 stores the data of this file into the buffer memory 10.

In step SP200, central processing unit 22 records the AV data from the buffer memory 10 to the free cluster detected in step SP197. In step SP201, central processing unit 22 causes an interrupt onto the host apparatus 12 as with in step SP187. This interrupt causes the central processing unit 12A of the host apparatus 12 to go to step SP202 to determine whether the recording of file 2 has been completed. If the decision is NO, the central processing unit 12A transmits a predetermined response to the hard disk apparatus 13, returning to step SP197. Consequently, the AV system 11 repeats the processing procedure of steps SP197 to SP198 to SP199 to SP200 to SP201 to SP202 to SP197, thereby sequentially recording the AV data outputted from the host apparatus 12 for file 2.

When the recording has been completed as described above, because YES is obtained in step SP202, the central processing unit 12A of the host apparatus 12 notifies the hard disk apparatus 13 of the end of the processing and goes to step SP203. In response, the central processing unit 22 of the hard disk apparatus 13 updates the data in the system entry area recorded to the memory 23 so that these data become corresponding to the recording of files 1 and 2 and, at the same time, updates the system entry area of the hard disk 3. Likewise, the host apparatus 12 gets the file control data from the hard disk apparatus 13 as necessary to update the contents of the memory 12B so that the these contents become corresponding to the recording of files 1 and 2 and goes to step SP204 to end this processing procedure.

When the recording of file 2 has been completed, the central processing unit 12A of the host apparatus 12 gets YES in step SP195 (FIG. 6). Also, in this case, the central processing unit 12A sends to the hard disk apparatus 13 the information about the completion of the recording of file 2 and the file ID for identifying a file having AV data to be transmitted next, going to step SP206. Consequently, the central processing unit 22 of the hard disk apparatus 13 detects a following free area for remaining file 1. Receiving the response from the hard disk apparatus 13, the central processing unit 12A of the host apparatus 12 outputs the target number (TagNo) of file 1 and the data of this file 1 in step SP207. In step S208, the central processing unit 22 of the hard disk apparatus 13 stores the file data into the buffer memory 10.

In step SP209, central processing unit 22 records the AV data from the buffer memory 10 to the free cluster detected in step SP206. In step SP210, the central processing unit 22 causes an interrupt onto the host apparatus 12 as in step SP187. This interrupt causes the central processing unit 12A of the host apparatus 12 to go to step SP211 to determine whether the recording of file 1 has been completed. If the decision is NO, the central processing unit 12A sends a predetermined response to the hard disk apparatus 13, returning to step SP206. Consequently, the AV system 11 repeats the processing procedure of steps SP206 to SP207 to SP208 to SP209 to SP210 to SP211 to SP206 to sequentially record the AV data outputted from the host apparatus 12 for remaining file 1.

When the recording has been completed as described above, because YES is obtained in step SP211, the central processing unit 12A of the host apparatus 12 notifies the hard disk apparatus 13 of the end of the processing and goes to step SP203. In response, the central processing unit 22 of the hard disk apparatus 13 updates the data in the system entry area recorded to the memory 23 so that these data become corresponding to the recording of files 1 and 2 and, at the same time, updates the system entry area of the hard disk 3. Likewise, the host apparatus 12 gets the file control data from the hard disk apparatus 13 as necessary to update the contents of the memory 12B so that these contents become corresponding to the recording of files 1 and 2 and goes to step SP204 to end this processing procedure.

In the processing procedures shown in FIGS. 6 and 7, the host apparatus 12 alternately outputs the data of the two files. If only one of the two files is required to be written in real time, the host apparatus 12 may repeatedly output the AV data of that file alone instead of the alternate outputting of the AV data of the two files. In this case, in the above-mentioned processing procedure, the procedure may be returned in which return is made from step SP189 to step SP183 instead of going from step SP189 to step SP190 for example. Also, instead of the multiple-write operation for two files mentioned above, a multiple-write operation for three or more files may be executed. In such a case, the hard disk apparatus 13 identifies the outputs of the AV data of these files by the target numbers depending on the processing by the host apparatus and sequentially records the AV data of these files to the hard disk 3.

Consequently, in the present embodiment, the AV data of plural files may be sequentially recorded by attaching target numbers to the data, without issuing the read/write commands repetitively every time free clusters become inconsecutive on the hard disk 3 and every unit of predetermined data amount, thereby enhancing data transfer rate.

Referring to FIG. 9, there is shown a configuration of a multiple-read command. The host apparatus arranges one byte of a command code associated with a multiple-read operation and one byte of the number of files associated with reading, followed by setting of the parameters for each of the files associated with the multiple-read operation. The parameters include a target number (TagNo) for identifying each file and file start cluster numbers for each file identified by the target number.

Consequently, in the present embodiment, the processing for detecting consecutive clusters by these commands is turned over to the side of the hard disk apparatus 13, thereby saving the repetitive issuance of commands.

FIGS. 10 through 14 are a flowchart describing the processing procedure associated with a multiple-read operation to be performed on two files. In this processing, the central processing unit 12A of the host apparatus 12 goes from step SP211 to SP212 and accesses the memory 12B to detect the start cluster numbers of file 1 and file 2 associated with the multiple-read operation. In step SP213, the central processing unit 12A issues a multiple-read command having the above-mentioned format. In response, in step SP214, the central processing unit 22 of the hard disk apparatus 13 accesses the memory 23 to detect the link cluster number for file 1 based on target number 1.

In step SP215, on the basis of the start cluster number set to this read command and the link cluster numbers detected in step SP214, the central processing unit 22 sequentially reproduces the AV data from the hard disk 3. In step SP216, the central processing unit 22 stores the AV data into the buffer memory 10. In step SP217, the central processing unit 22 determines whether the AV data have been stored in the buffer memory 10 by the predetermined amount. If the decision is NO, the central processing unit 22 goes to step SP218. The specified data amount is set to such a value as not lose the continuity of the AV data due to buffer memory overflow or underflow in the processing by the host apparatus 12.

The central processing unit 22 accesses the memory 23 again to detect the link cluster number for file 1 based on target number 1 and returns to step SP215. Consequently, the central processing unit 22 repeats the processing procedure of steps SP215 to SP216 to SP217 to SP218 to SP219 to SP215 until the predetermined amount of AV data is accumulated in the buffer memory 10. When the AV data have been accumulated in the buffer memory 10 by the predetermined amount, the decision in step SP217 becomes YES, upon which the central processing unit 22 goes from step SP217 to step SP220, causing an interrupt onto the host apparatus 12. It should be noted that this interrupt is executed by sending the target number of the AV data stored in the buffer memory 10.

Figure 11:
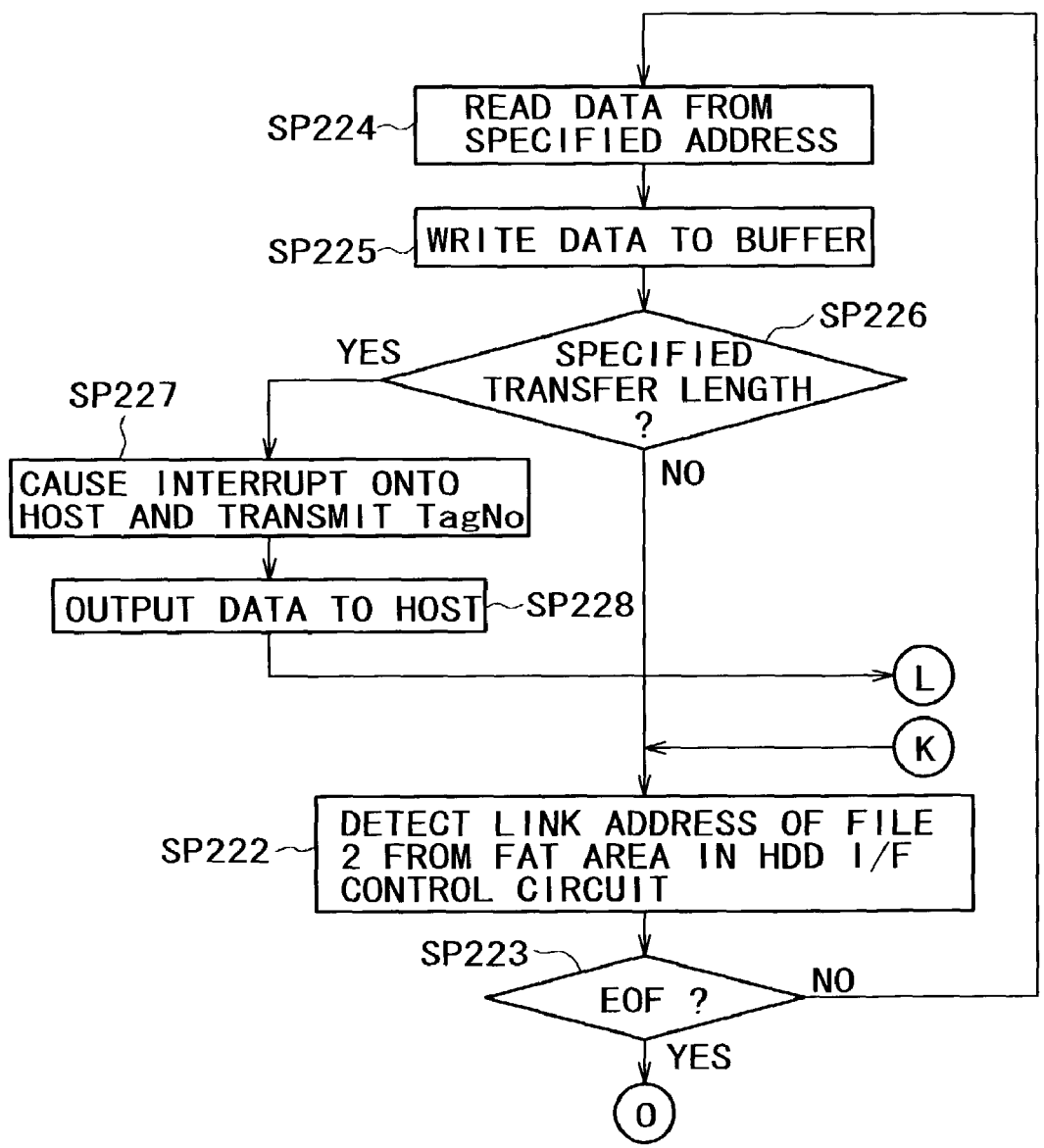
FIG. 11 is a flowchart continued from the flowchart of FIG. 10.

When this interrupt causes the host apparatus 12 to issue a permission of data transfer, the central processing unit 22 of the hard disk apparatus 13 transmits the AV data from the buffer memory 10 in step SP221, thereby going to step SP222 (FIG. 11).

In step SP222, the central processing unit 22 accesses the memory 23 to detect the link cluster number for file 2 based on target number 2. In step SP223, the central processing unit 22 determines whether EOF has been reached. If the decision is NO, the central processing unit 22 goes to step SP224.

In step SP224, the central processing unit 22 sequentially reproduces the AV data from the hard disk 3 on the basis of the start cluster number specified in the read command and the link cluster number detected in step SP223. In step SP225, the central processing unit 22 stores the AV data into the buffer memory 10. In step SP226, the central processing unit 22 determines whether the AV data have been stored in the buffer memory 10 by the predetermined amount. If the decision is NO, then the central processing unit 22 goes to step SP222. It should be noted that the specified data amount is the same as that in step SP217 (FIG. 10).

The central processing unit 22 repeats the processing procedure of steps SP222 to SP223 to SP224 to SP225 to SP226 to SP222 until the AV data of file 2 is stored in the buffer memory 10 by the predetermined amount. When the AV data have been stored in the buffer memory 10 by the predetermined amount, the decision becomes YES in step SP226 and the central processing unit 22 goes from step SP226 to SP227, thereby causing an interrupt onto the host apparatus 12. It should be noted that this interrupt is executed by transmitting the target number of the AV data stored in the buffer memory 10.

Figure 10:
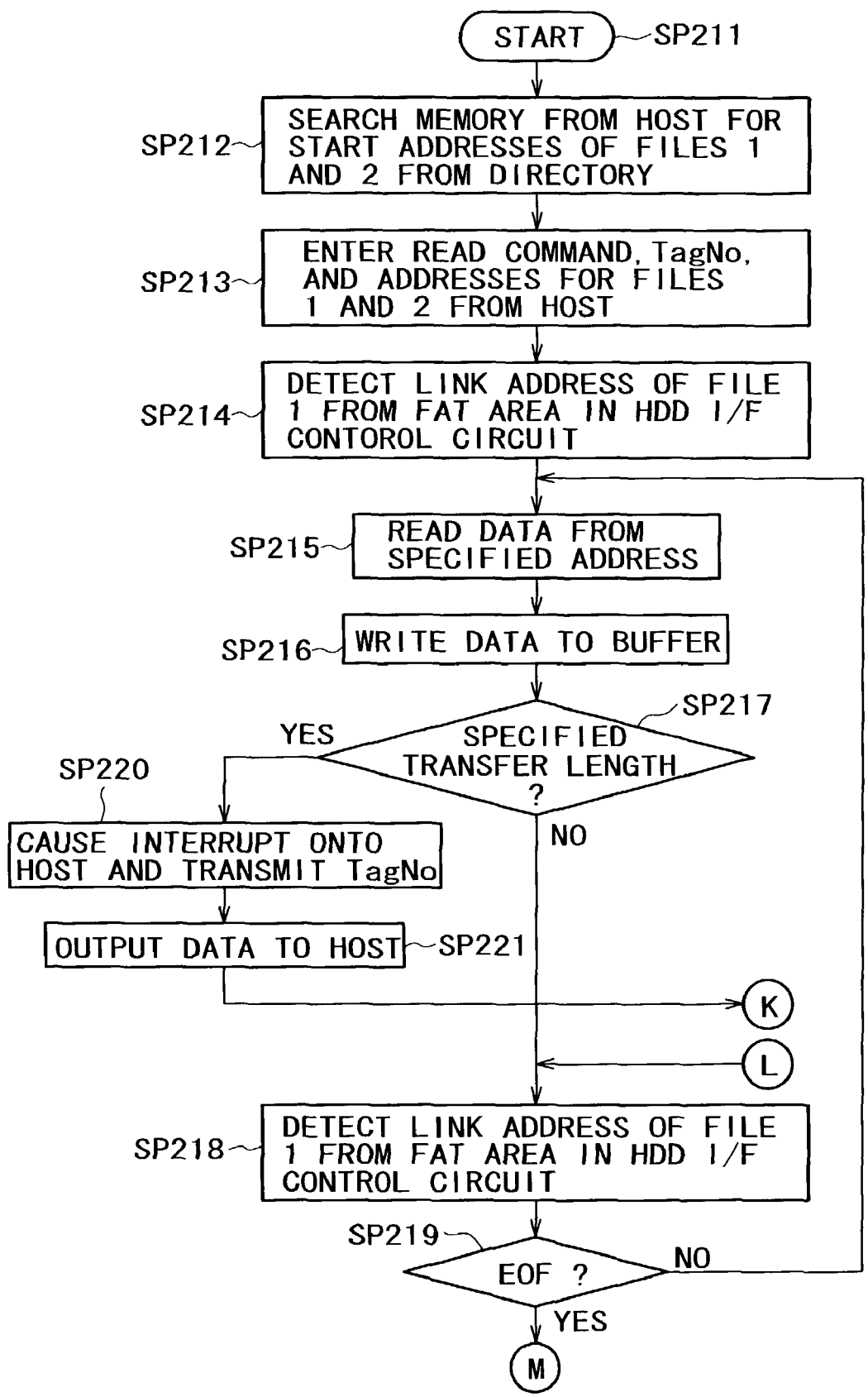
FIG. 10 is a flowchart describing a processing procedure of the AV system 11 to be executed at a multiple-read operation.

When this interrupt causes the host apparatus 12 to permit data transfer, the central processing unit 22 of the hard disk apparatus 13 transmits the AV data from the buffer memory 10 to the host apparatus 12 in step SP228, going to step SP218 (FIG. 10).

Consequently, in the present embodiment, in accordance with the recording of the system entry area downloaded into the memory 23, the cluster numbers resulted from the recording of files 1 and 2 are sequentially detected on the side of the hard disk apparatus 13 and, on the basis of the detection result, the file 1 and file 2 are alternately reproduced on a predetermined data amount basis to be outputted to the host apparatus 12.

Figure 12:
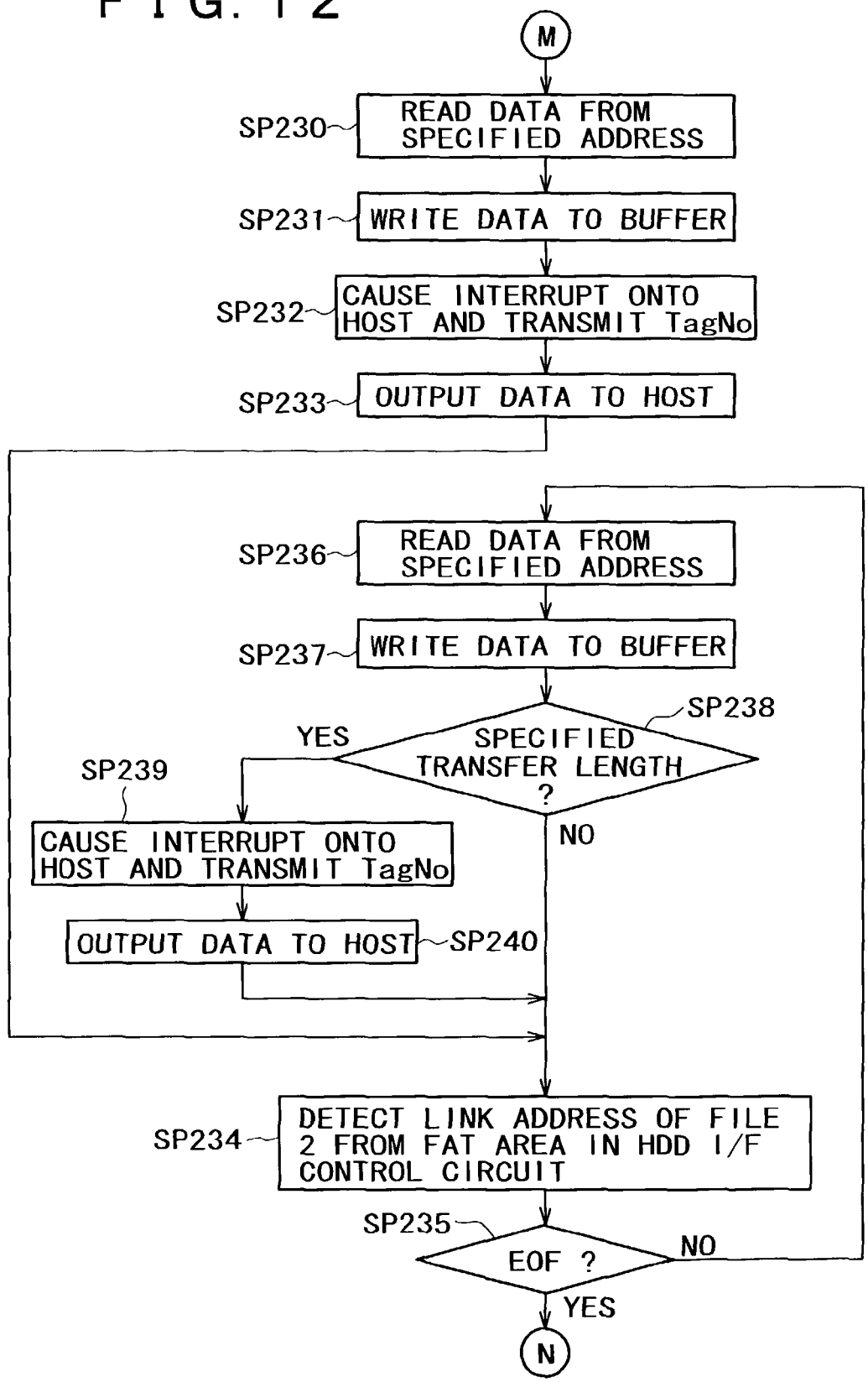
FIG. 12 is a flowchart continued from the flowchart of FIG. 11.

When EOF is detected on file 1 after the alternate reproduction of file 1 and file 2 as described above, the central processing unit 22 of the hard disk apparatus 13 gets YES in step SP219 (FIG. 10), thereby going from step SP219 to step SP230 (FIG. 12). The central processing unit 22 reproduces the remaining AV data of file 1 up to a cluster on which EOF has been detected. In step SP231, the central processing unit 22 stores the reproduced AV data into the buffer memory 10. In step SP232, the central processing unit 22 causes an interrupt onto the host apparatus 12 as with step SP220, causing the host apparatus 12 to permit data transfer. In step SP233, the host apparatus 12 transmits the AV data from the buffer memory 10 to the host apparatus 12, going to step SP234.

In step SP234, the central processing unit 22 accesses the memory 23 to detect the next link cluster number for file 2 based on target number 2. In step SP235, the central processing unit 22 determines whether EOF has been reached. If the decision is NO, the central processing unit 22 goes to step SP236.

In step SP236, the central processing unit 22 sequentially reproduces the AV data from the hard disk 3 on the basis of the link cluster number detected in step SP235. In step SP237, the central processing unit 22 stores the reproduced AV data into the buffer memory 10. In step SP238, the central processing unit 22 determines whether the AV data have been stored in the buffer memory 10 by the predetermined amount. If the decision is NO, the central processing unit 22 goes to step SP234.

The central processing unit 22 repeats the processing procedure of steps SP234 to SP235 to SP236 to SP237 to SP238 to SP234 until the AV data file 2 have been stored in the buffer memory 10 by the predetermined amount. When the AV data have been stored in the buffer memory 10 by the predetermined amount, the decision in step SP238 becomes YES and the central processing unit 22 goes from step SP238 to step SP239, thereby causing an interrupt onto the host apparatus 12 as with step SP227.

When this interrupt causes the host apparatus 12 to permit data transfer, the central processing unit 22 of the hard disk apparatus 13 transmits the AV data from the buffer memory 10 to the host apparatus 12 in step SP240, going to step SP234.

Figure 14:
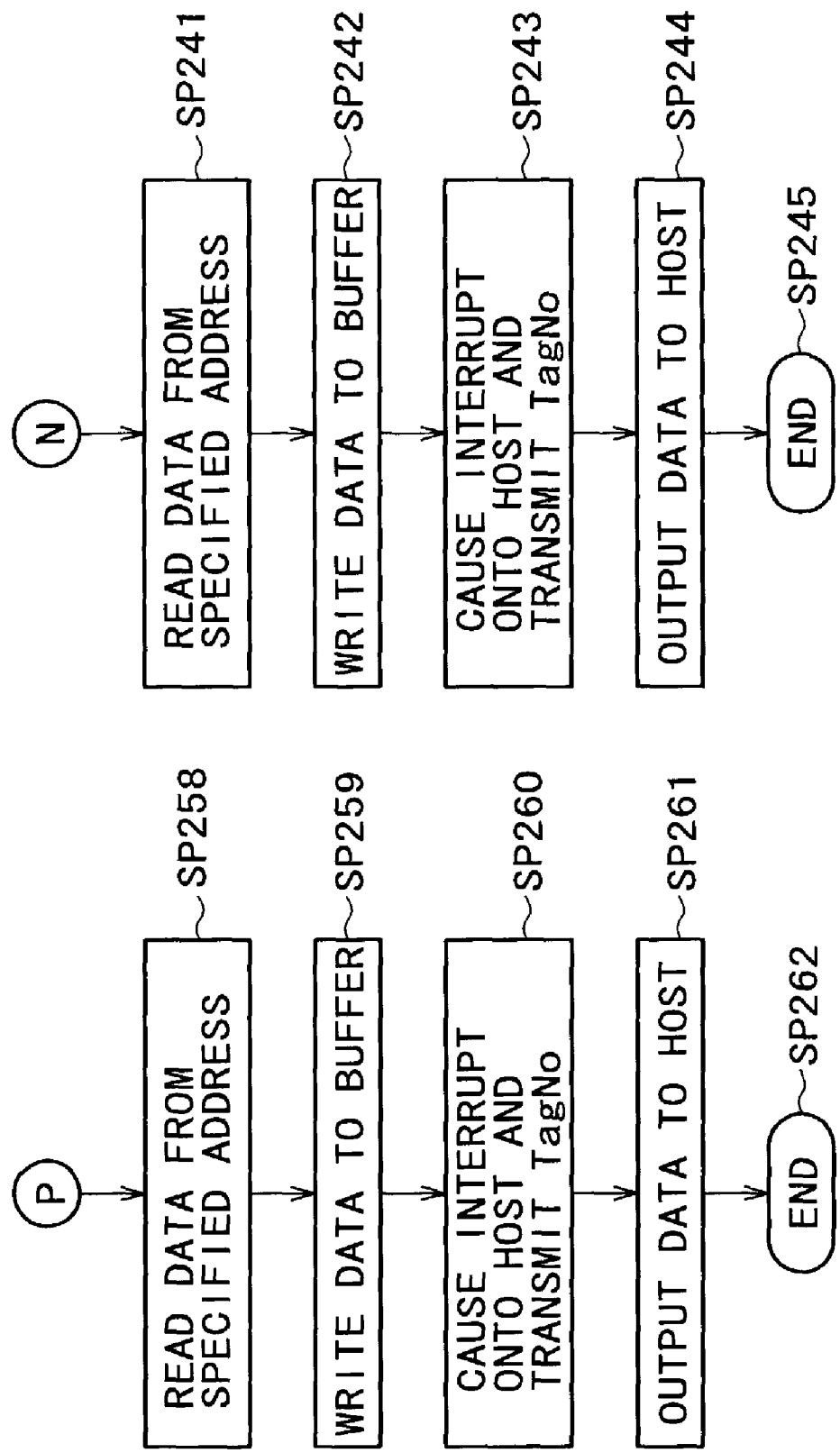
FIG. 14 is a flowchart continued from the flowchart of FIG. 13.

Consequently, in the present embodiment, when the downloading of file 1 has been completed, the downloading of file 2 continues in the manner described with reference to FIG. 4. When EOF is detected for file 2, the decision is YES in step SP235, so that the central processing unit 22 goes from step SP235 to step SP241 (FIG. 14).

The central processing unit 22 reproduces the remaining AV data of file 2 up to the cluster on which EOF has been detected. In step SP242, the central processing unit 22 stores the reproduced AV data into the buffer memory 10. In step SP243, the central processing unit 22 causes an interrupt onto the host apparatus 12 as with step SP227 to cause the host apparatus 12 to permit data transfer. In step SP244, the central processing unit 22 transmits the AV data from the buffer memory 10 to the host apparatus 12, going to step SP245 to end this processing procedure.

Figure 13:
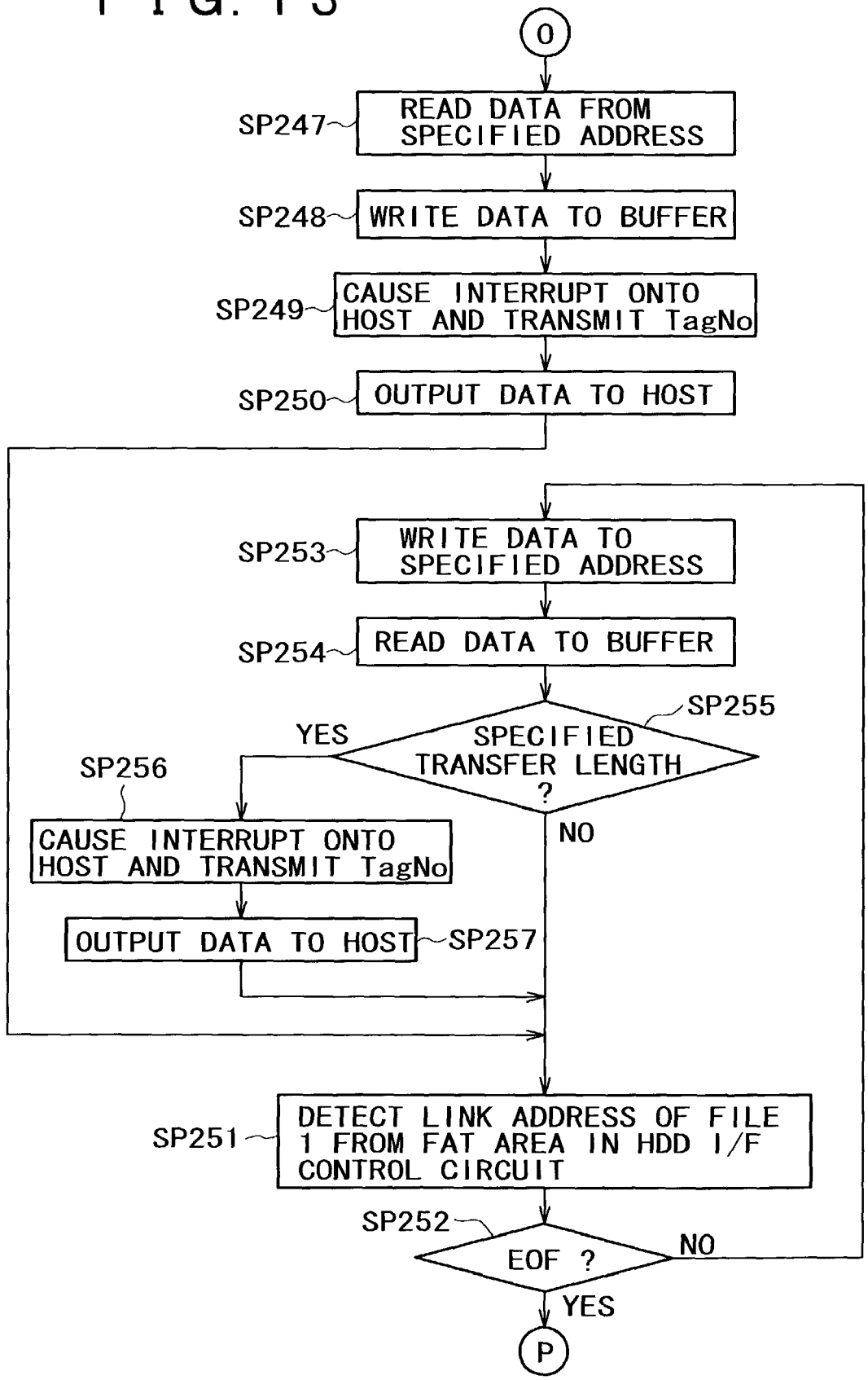
FIG. 13 is a flowchart continued from the flowchart of FIG. 12.

On the contrary, when EOF is first detected in file 2, the decision is YES in step SP223 (FIG. 11), so that the central processing unit 22 goes from step SP223 to step SP247 (FIG. 13).

The central processing unit 22 reproduces the AV data of file 2 up to the cluster on which EOF has been detected. In step SP248, the central processing unit 22 stores the reproduced AV data into buffer memory 10. In step SP249, the central processing unit 22 causes an interrupt onto the host apparatus 12 as with step SP227 to cause the host apparatus 12 to permit data transfer. In step SP250, the central processing unit 22 transmits the AV data from the buffer memory 10 to the host apparatus 12, going to step SP251.

In step SP251, the central processing unit 22 accesses the memory 23 to detect the next link cluster number for file 1 based on target number 1. In step SP252, the central processing unit 22 determines whether EOF has been reached. If the decision is NO, the central processing unit 22 goes to step SP253.

In step SP253, the central processing unit 22 sequentially reproduces the AV data from the hard disk 3 on the basis of the link cluster number detected in step SP251. In step SP254, the central processing unit 22 stores the reproduced AV data into the buffer memory 10. In step SP255, the central processing unit 22 determines whether the AV data have been stored in the buffer memory 10 by the predetermined amount. If the decision is NO, the central processing unit 22 goes to step SP251.

The central processing unit 22 repeats the processing procedure of steps SP251 to SP252 to SP253 to SP254 to SP255 to SP251 until the AV data of file 1 have been stored in the buffer memory 10 by the predetermined amount. When the AV data have been stored in the buffer memory 10 by the predetermined amount, the decision of step SP255 becomes YES, so that the central processing unit 22 goes from step SP255 to SP256, thereby causing an interrupt onto the host apparatus 12 as with step SP220.

When this interrupt causes the host apparatus 12 to permit data transfer, the central processing unit 22 of the hard disk apparatus 13 transmits the AV data from the buffer memory 10 to the host apparatus 12 in step SP257, going to step SP251.

Consequently, in the present embodiment, when the downloading of file 2 has been completed, the downloading of file 1 continues in the manner described with reference to FIG. 4. When EOF is detected for file 1, the decision is YES in step SP252, so that the central processing unit 22 goes from step SP252 to step SP258 (FIG. 14).

The central processing unit 22 reproduces the AV data of file 1 up to the cluster on which EOF has been detected. In step SP259, the central processing unit 22 stores the reproduced AV data into the buffer memory 10. In step SP260, the central processing unit 22 causes an interrupt onto the host apparatus 12 as with step SP220. When this interrupt causes the host apparatus 12 to permit data transfer, the central processing unit 22 transmits the AV data from the buffer memory 10 to the host apparatus 12 in step S261 and goes to step 262, ending this processing procedure.

In the processing procedure shown in FIGS. 10 through 14, the data of two files are alternately outputted to the host apparatus 12. In addition to the above-mentioned multiple-read operation for outputting two files, multiple-read operations for three or more files are also practicable, in which the hard disk apparatus 13 sequentially reproduces and outputs the AV data of three or more files from the hard disk 3 on the basis of the target numbers and start cluster numbers specified by the host apparatus.

(2) Operation of the First Embodiment

In the AV system 11 (FIG. 2) having the above-mentioned configuration, commands issued by the host apparatus 12 are interpreted by the central processing unit 22 of the hard disk apparatus 13, the operations of the hard disk control circuit 5 and so on are controlled by the central processing unit 22 on the basis of the result of the interpretation, various data recorded to the hard disk 3 are reproduced accordingly, and various data entered from the host apparatus 12 are recorded to the hard disk 3 accordingly.

Figure 16:
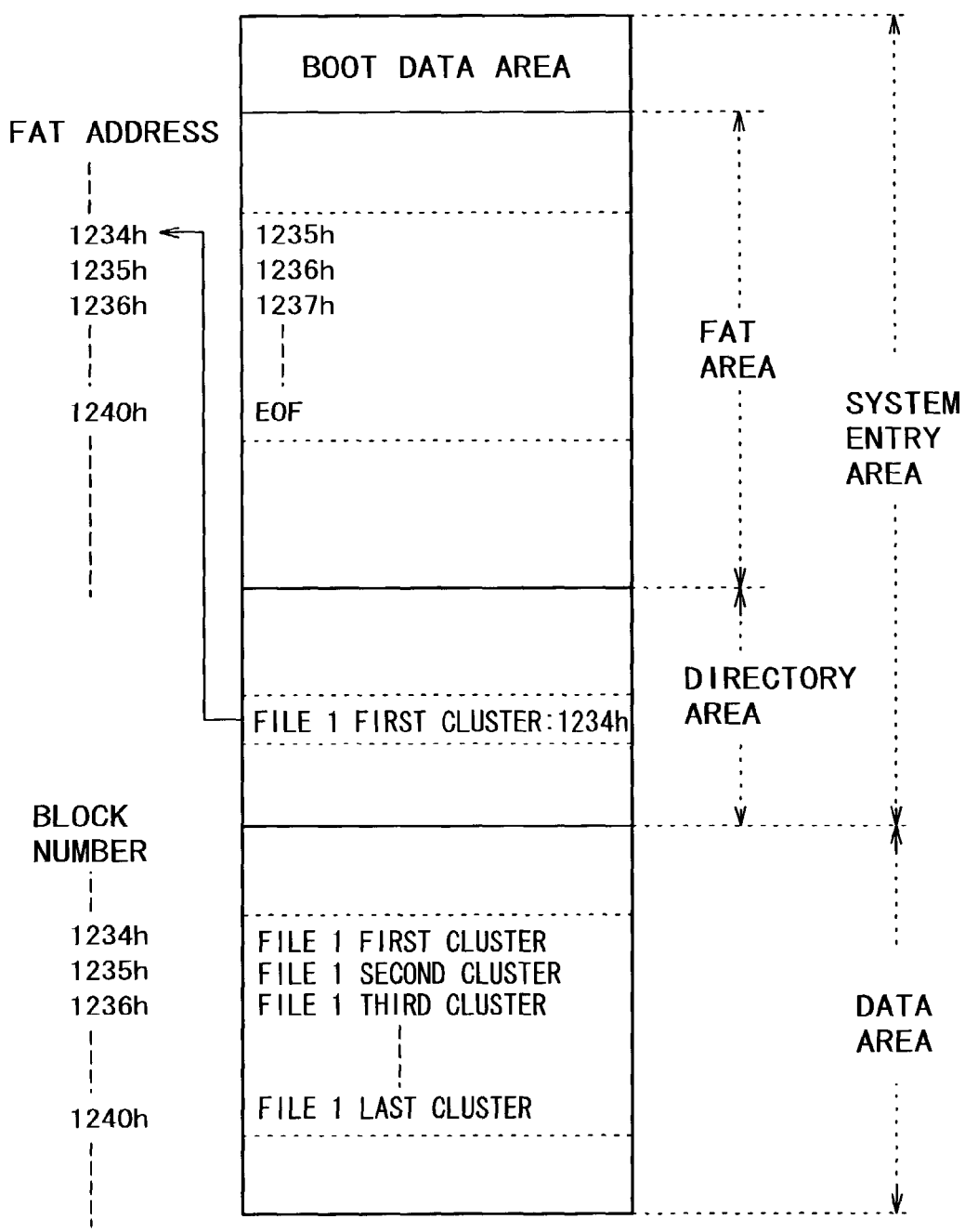
FIG. 16 is a diagram illustrating a recording format on a hard disk shown in FIG. 14.
Figure 19:
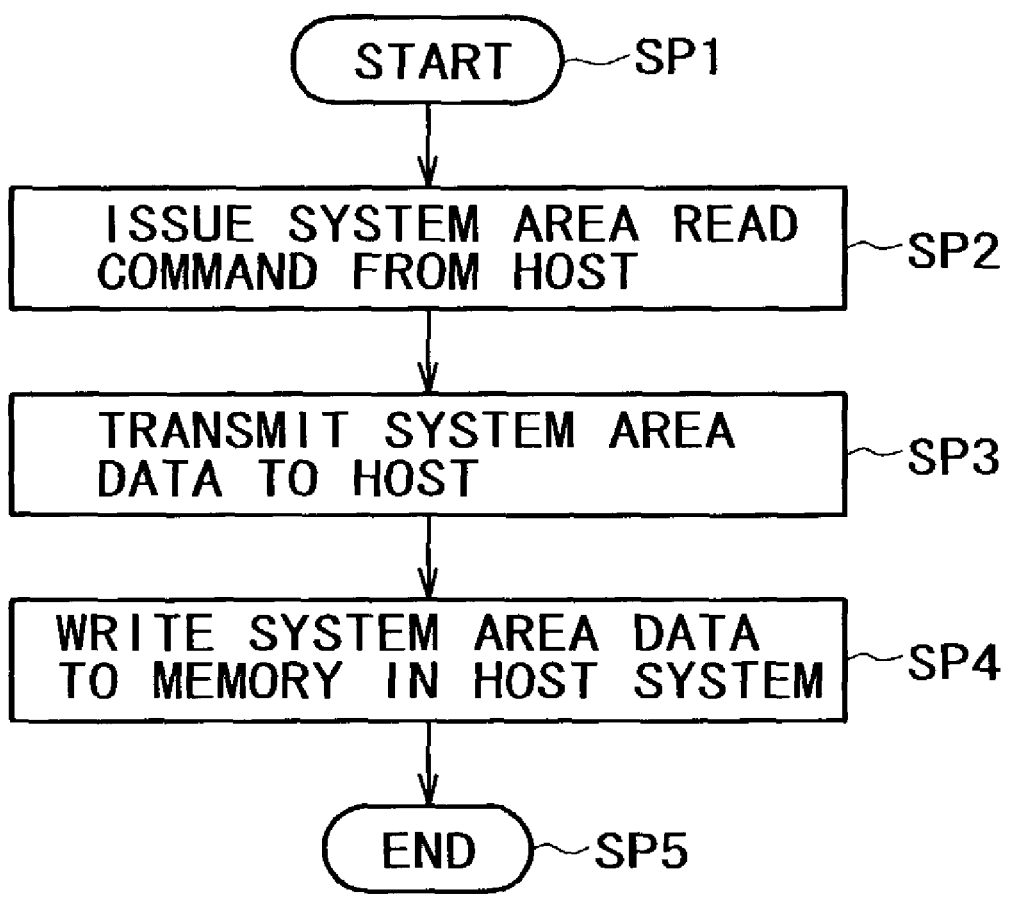
FIG. 19 is a flowchart describing a processing procedure of an AV system of FIG. 15 to be executed at a boot operation.
Figure 20:
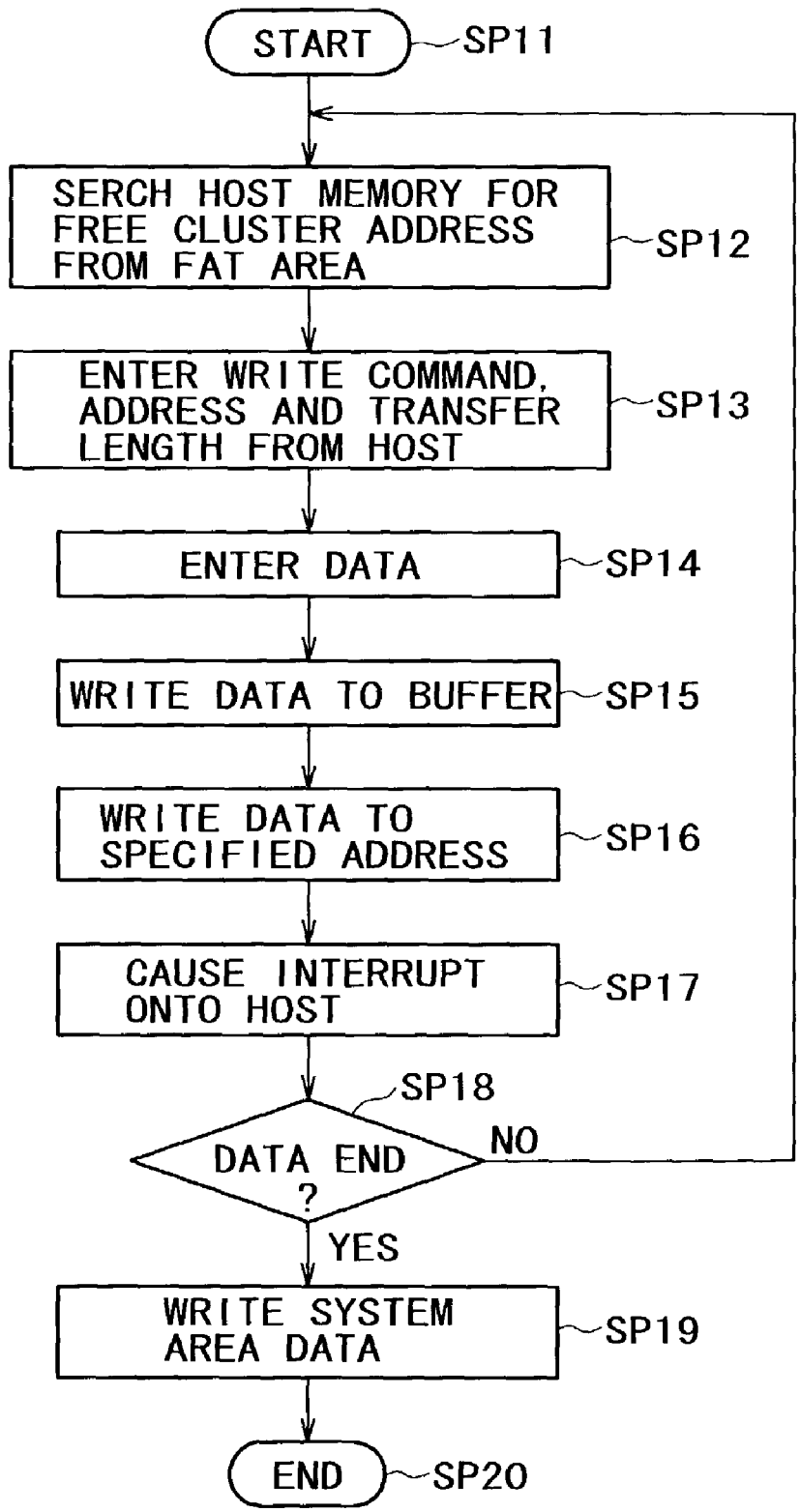
FIG. 20 is a flowchart describing a processing procedure of the AV system of FIG. 15 to be executed at a write operation.

In the above-mentioned processing, when the AV system 11 is powered on and the connection of the hard disk apparatus 13 is detected, a read command for reading the system entry area is issued from the host apparatus 12 to reproduce, on the hard disk apparatus 13, the control data recorded to the system entry area on the hard disk 3 (FIG. 16) in the AV system 11. In the AV system 11, of these control data, the data of the directory area based on the file control data for identifying each file recorded in the data recording area are transmitted to the host apparatus 12 along with the data in the boot area to be stored in the memory 12B of the host apparatus 12. Also, the data of the FAT area which is a collection of the identification codes which are associated with the file control data on the basis of the start cluster number allocated to the file control data to indicate the association with the cluster which is a control unit of the data recording area are stored in the memory 23 of the hard disk apparatus 13 along with the data of other system entry areas (FIG. 3).

Consequently, in the AV system 11, the host apparatus 12 issues a read command with reference to the file control data recorded in the memory 12B and the hard disk apparatus 13 sequentially detects the clusters recorded with accessed files on the basis of the data of the FAT area stored in the memory 23, thereby sequentially reproducing and outputting the data of the files associated with the read command on the basis of the result of the detection (FIGS. 4 and 5).

Figure 21:
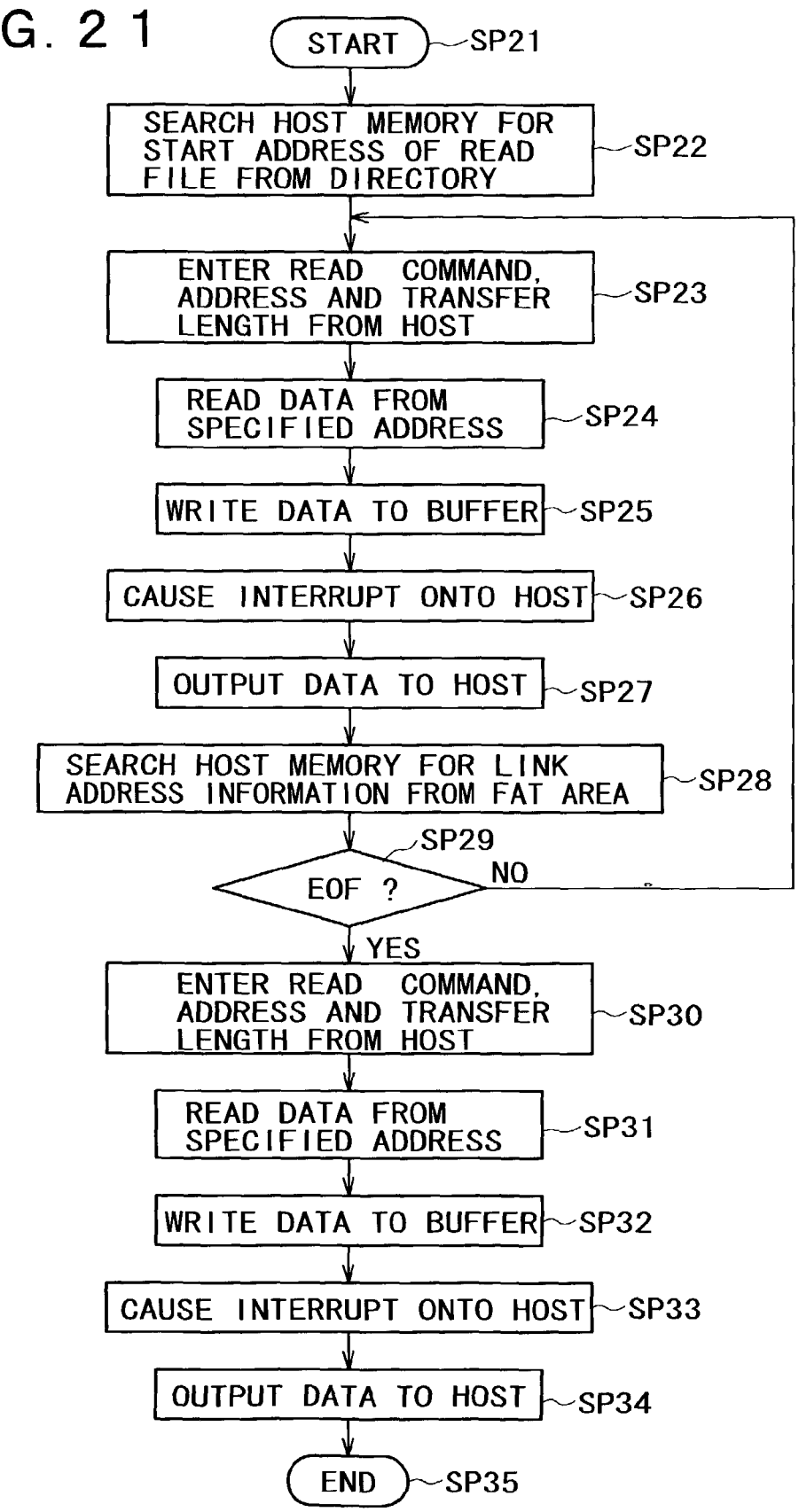
FIG. 21 is a flowchart describing a processing procedure of the AV system of FIG. 15 to be executed at a read operation.
Figure 23:
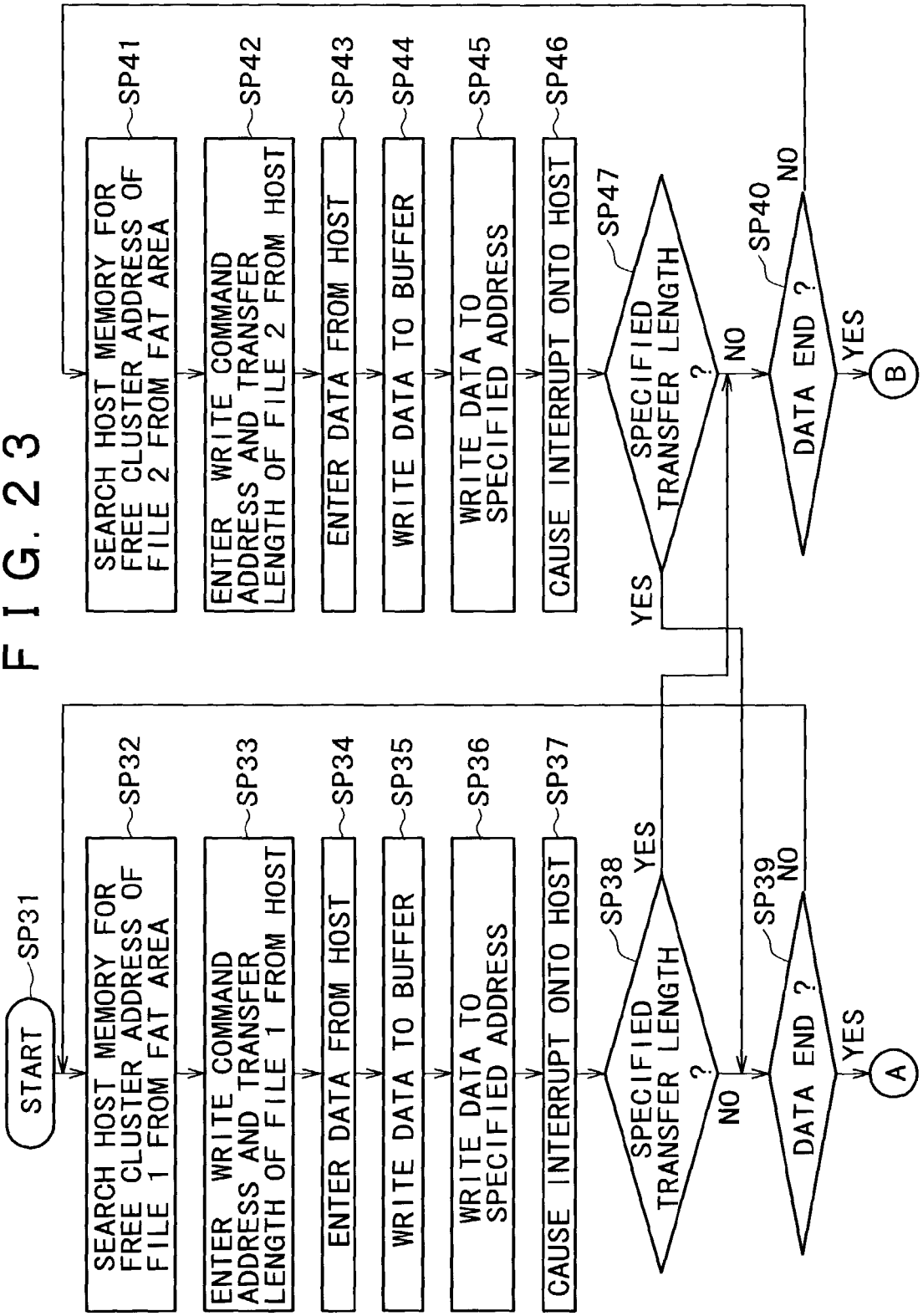
FIG. 23 is a flowchart describing a processing procedure of the AV system of FIG. 15 to be executed at a multiple-write operation.
Figure 24:
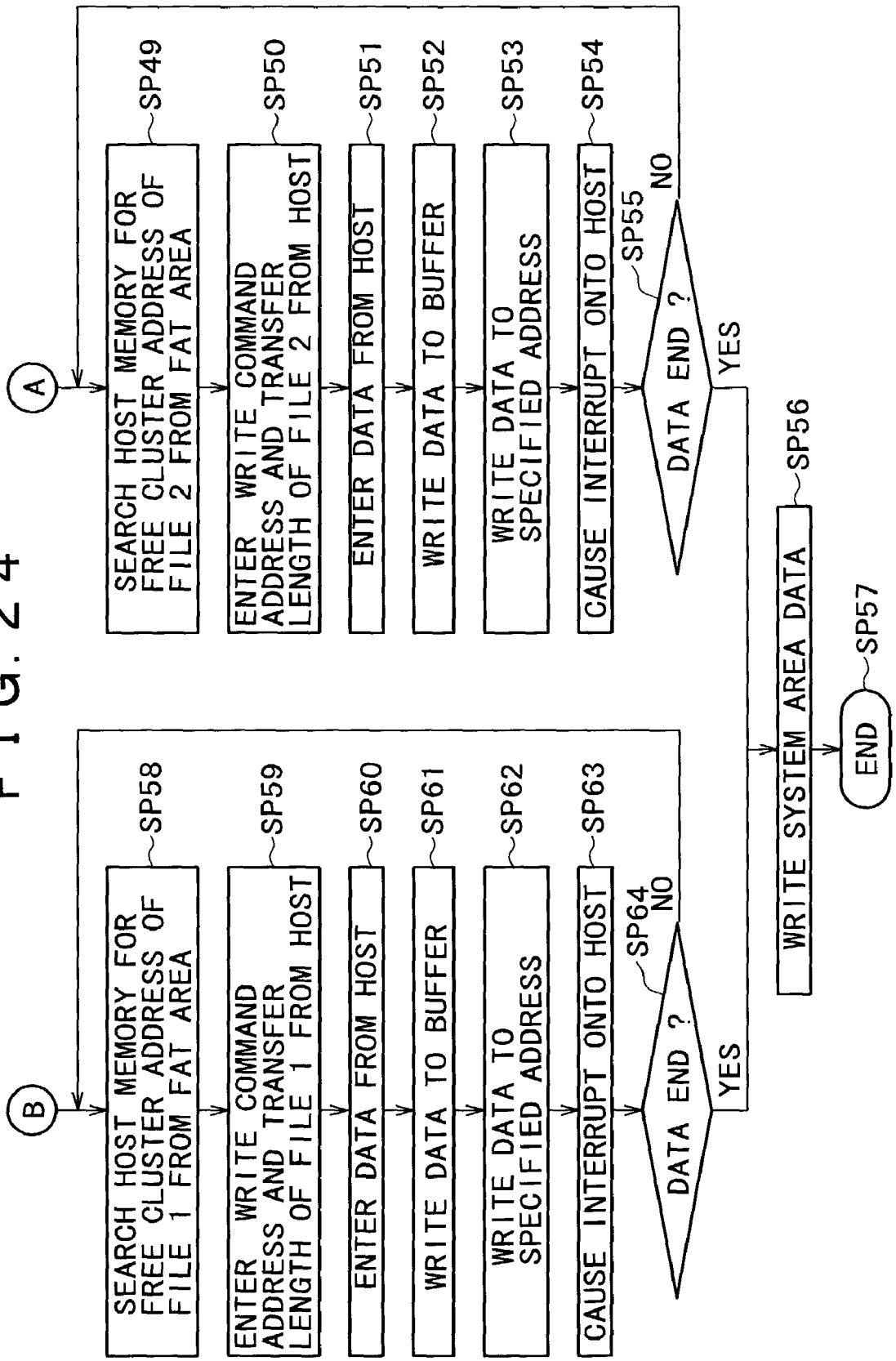
FIG. 24 is a flowchart continued from the flowchart of FIG. 23.
Figure 25:
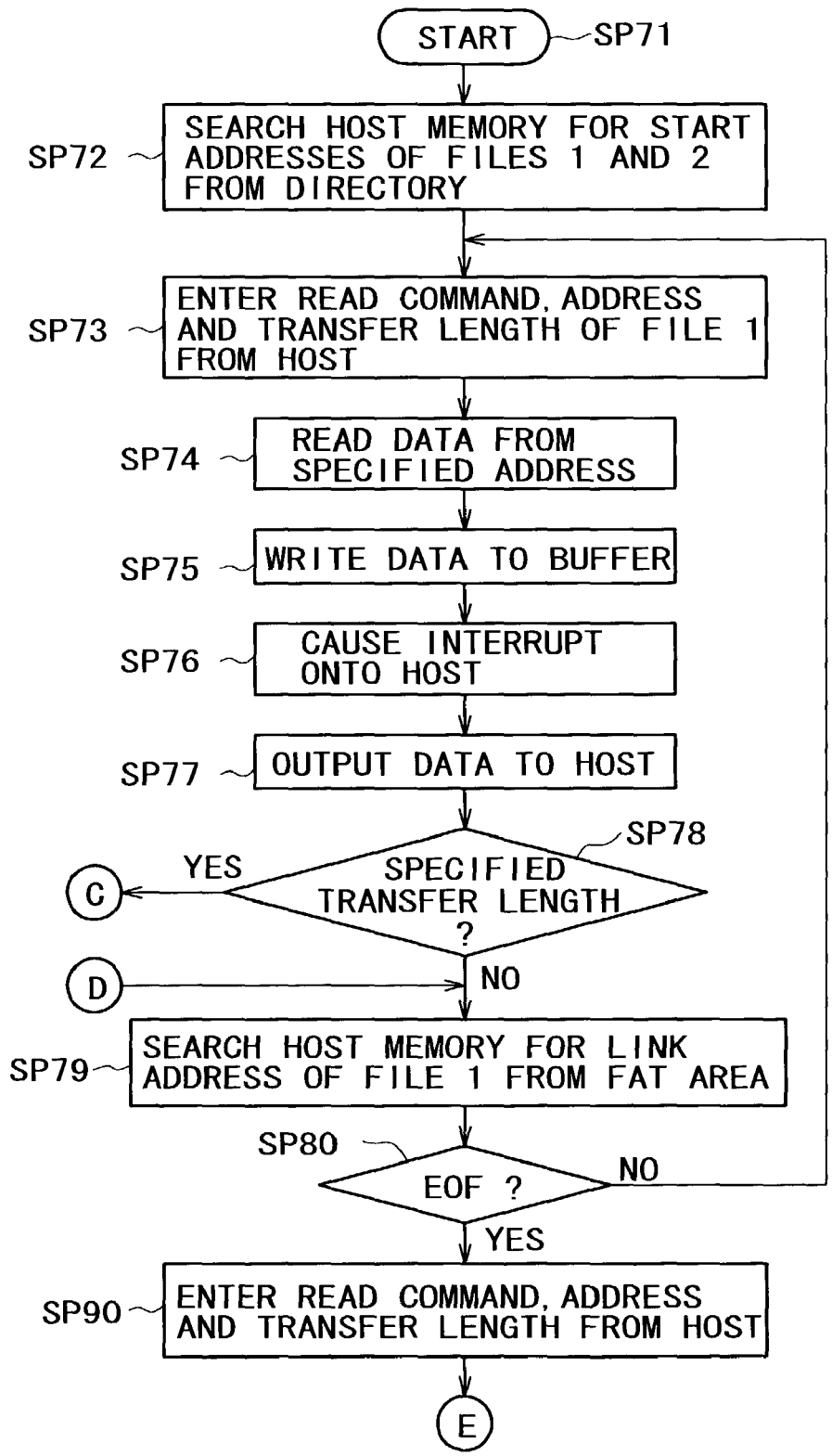
FIG. 25 is a flowchart describing a processing procedure of the AV system of FIG. 15 to be executed at a multiple-read operation.
Figure 26:
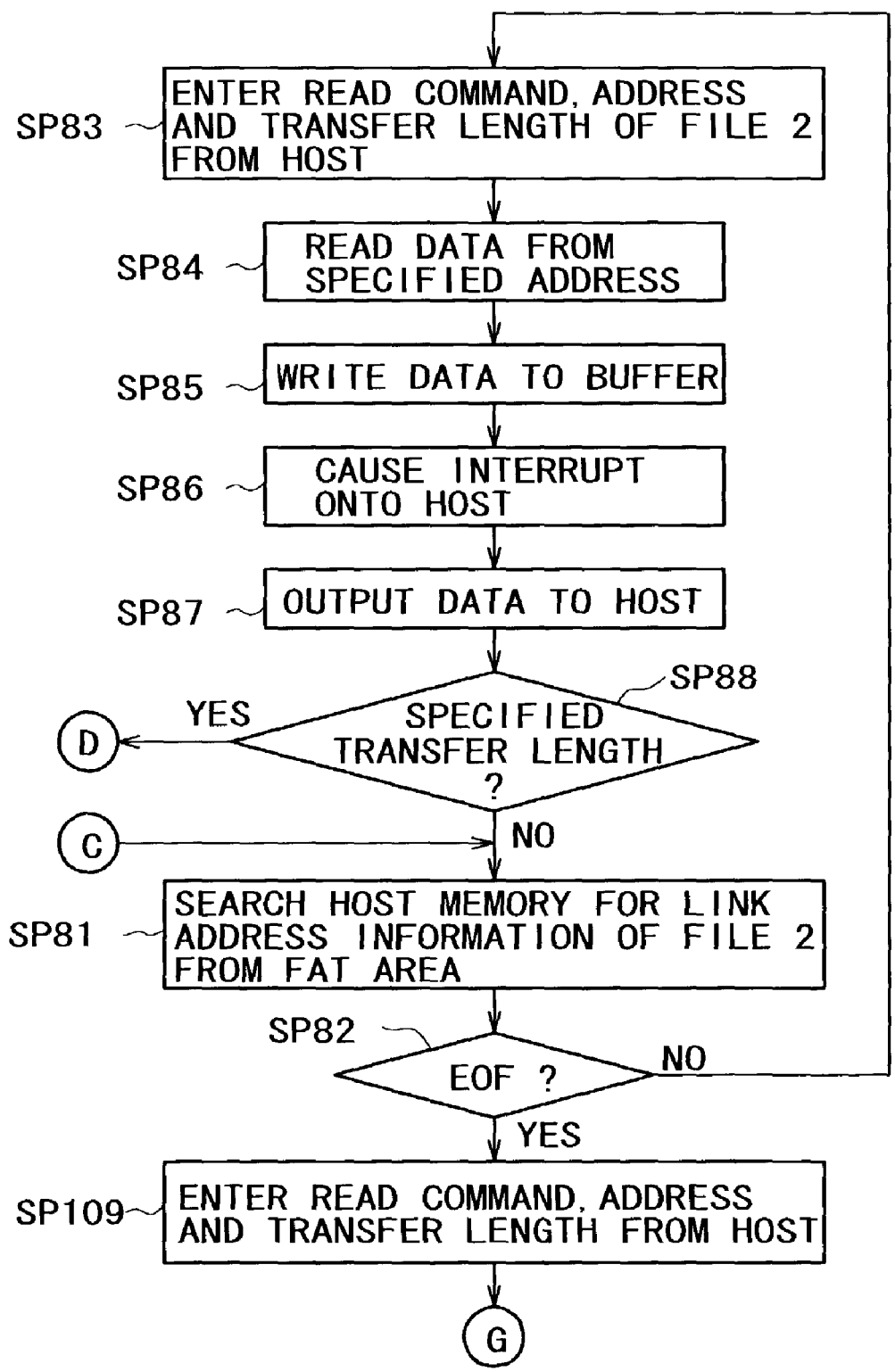
FIG. 26 is a flowchart continued from the flowchart of FIG. 25.
Figure 27:
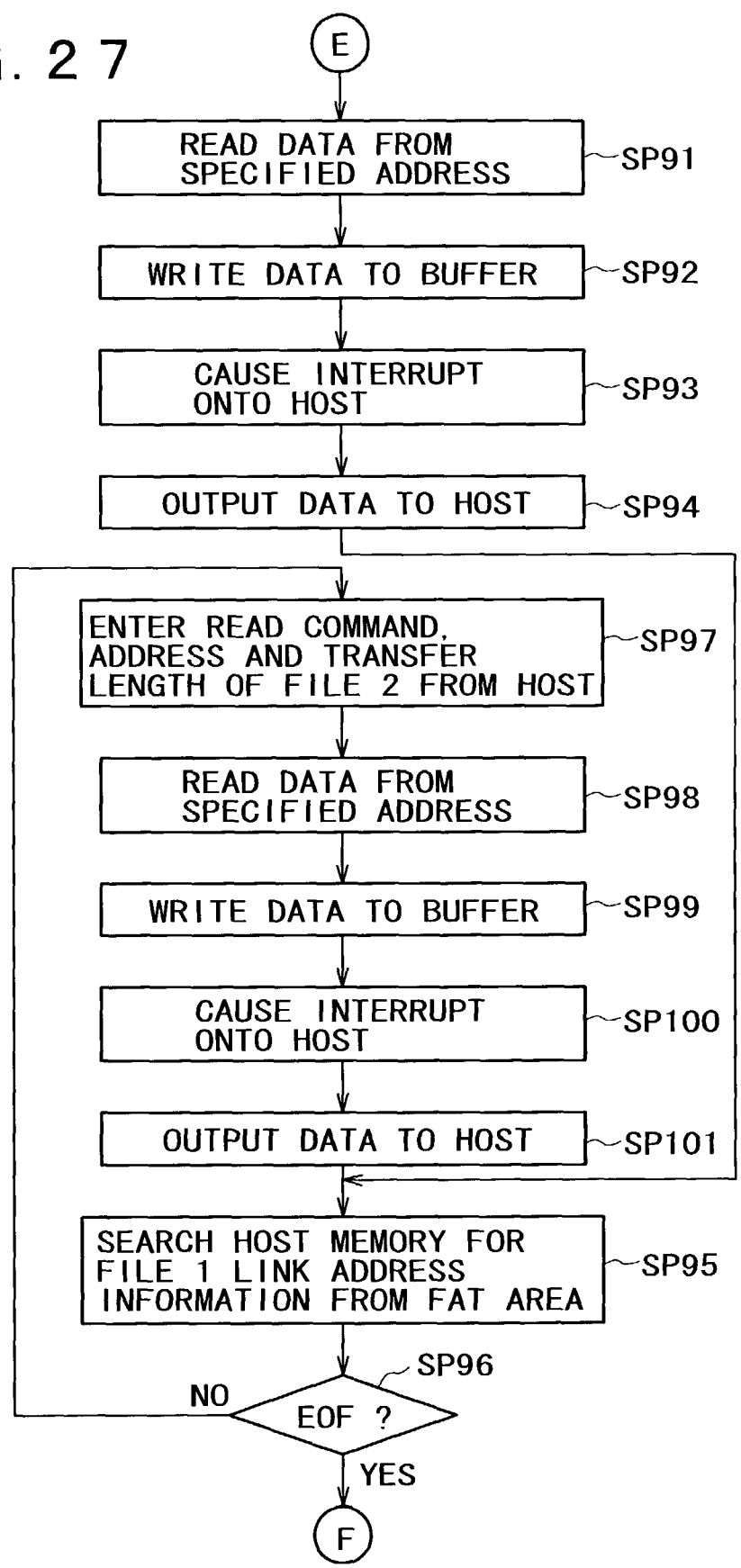
FIG. 27 is a flowchart continued from the flowchart of FIG. 26.
Figure 28:
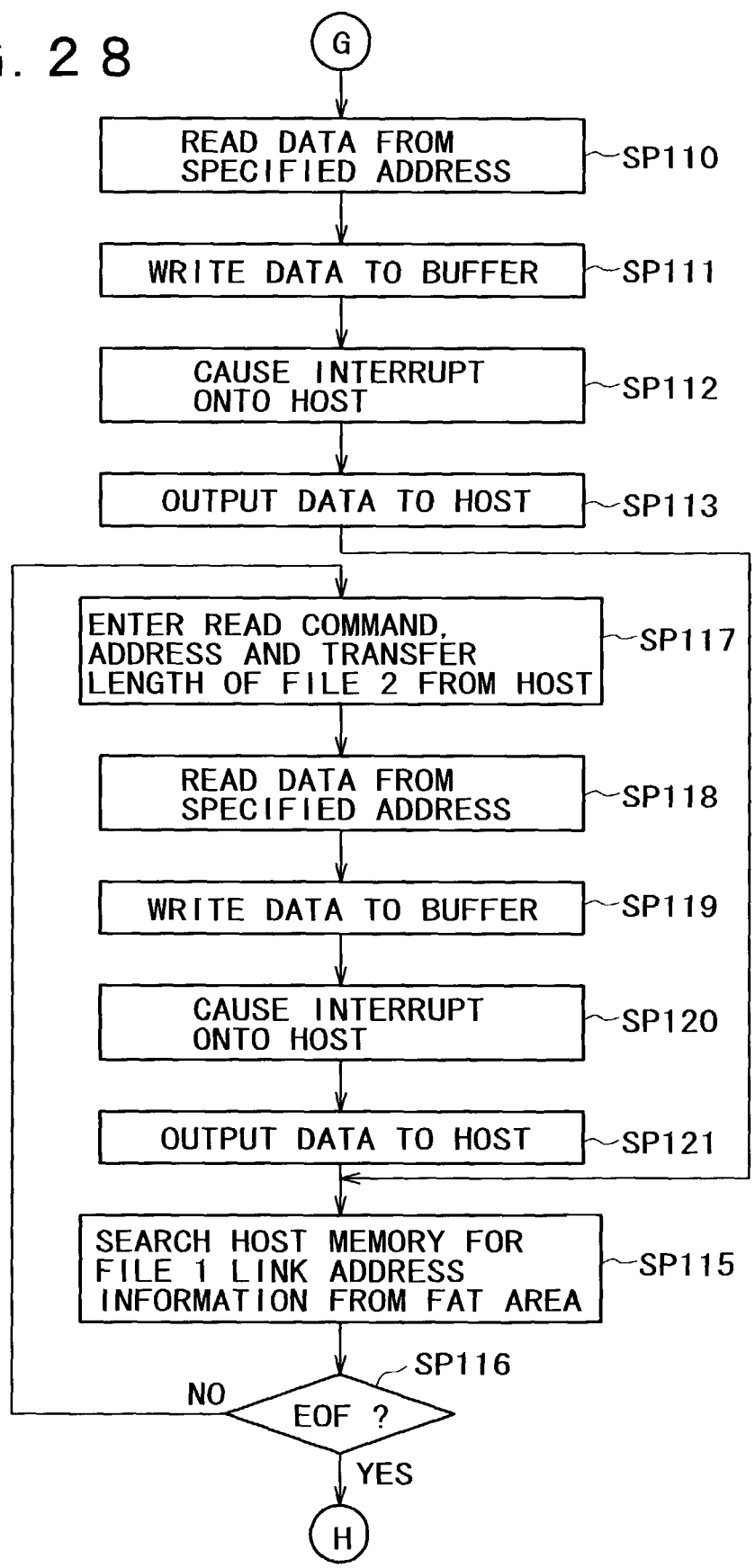
FIG. 28 is a flowchart continued from the flowchart of FIG. 27.
Figure 29:
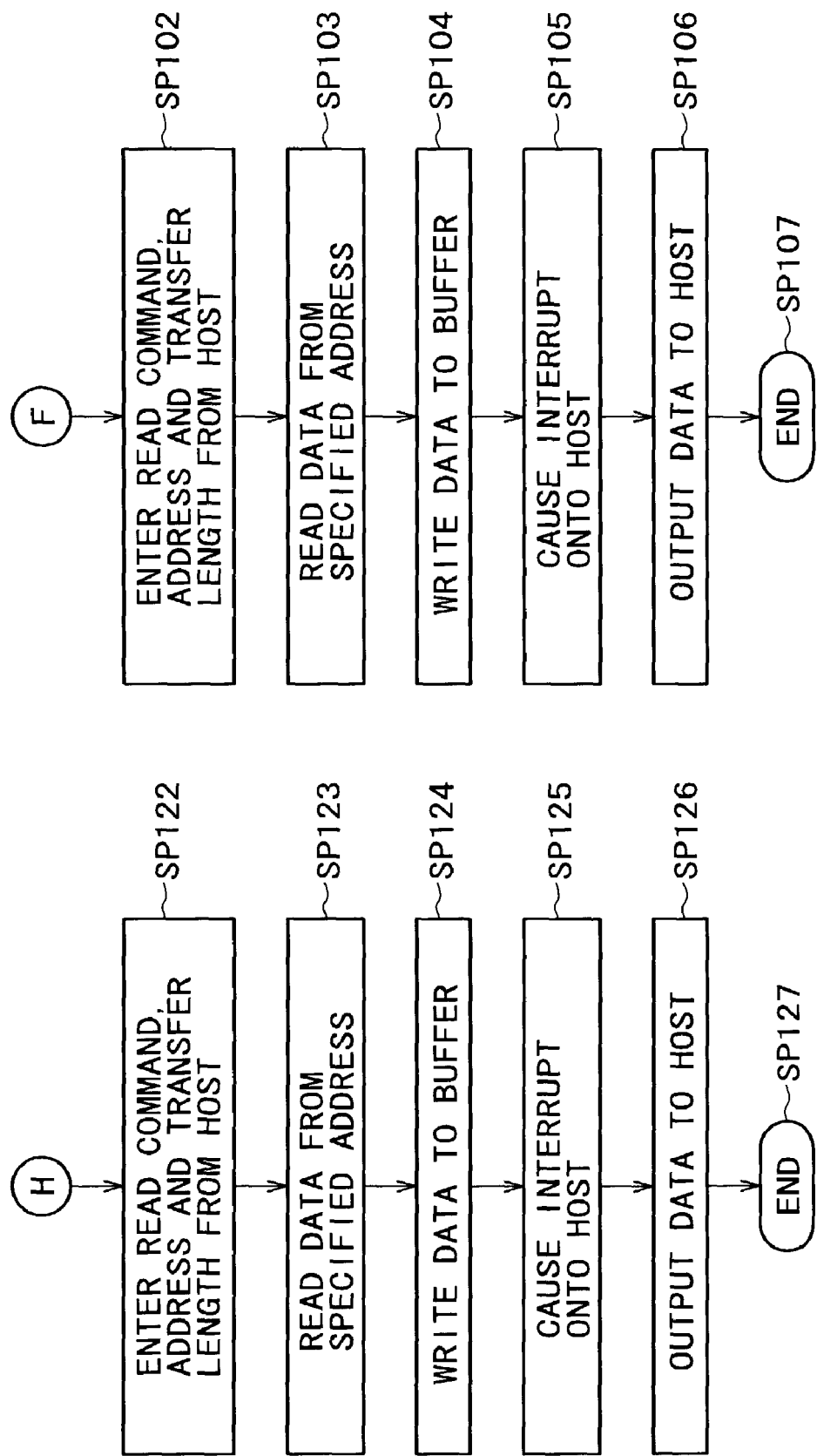
FIG. 29 is a flowchart continued from the flowchart of FIG. 28.

Therefore, in the AV system 11, as compared with the related-art configuration shown in FIG. 21, the repetitive issuance of read commands from the host apparatus 12 otherwise required every time a predetermined data amount has been reached or every time cluster continuity is lost is omitted; namely, a single issuance of a read command allows to output the files of continuous AV data to the host apparatus 12. As a result, the handshake process associated with this command can be omitted by omitting the repetitive issuance, thereby effectively enhancing the rate of transferring AV data to shorten the time necessary for dubbing. This, in turn, saves the power consumption and simplifies the processing to be performed in the host apparatus 12.

In the case of a write operation, free areas are sequentially detected on the side of the hard disk apparatus 13 by a single issuance of a write command as with a read command and the AV data are recorded from the host apparatus 12 to the detected free areas (FIG. 1). Consequently, as with a read command, the repetitive issuance of write commands from the host apparatus 12 otherwise required every time a predetermined data amount has been reached or every time cluster continuity is lost is omitted; namely, a single issuance of a write command allows the host apparatus 12 to record the files of continuous AV data. As a result, the handshake process associated with this command can be omitted by omitting the repetitive issuance, thereby effectively enhancing the rate of transferring AV data to shorten the time necessary for dubbing. This, in turn, saves the power consumption and simplifies the processing to be performed in the host apparatus 12.

In the case of a multiple-read operation, the code length is identified by the number of files associated with this operation to set file identification parameters such as start cluster number and target number, thereby issuing a read command (FIG. 9).

A multiple-read command allows the hard disk apparatus 13 to sequentially detect clusters recorded with the files associated with the multiple-read access by sequentially following the recordings in the memory 23 based on the start cluster numbers and, on the basis of the result of the detection, sequentially reproduce and output the data of the files associated with the read command (FIGS. 10 through 14). In this processing, the hard disk apparatus 13 divides each file by a predetermined data amount such that the continuity of the AV data in the files is not impaired, namely performs time-division multiplexing, to reproduce and output the AV data.

Consequently, in the AV system 11, as compared with the related-art configuration, the repetitive issuance of read commands from the host apparatus 12 otherwise required every time a predetermined data amount has been reached or every time cluster continuity is lost is omitted; namely, a single issuance of a read command allows to output the files of continuous AV data to the host apparatus 12. As a result, the handshake process associated with this command can be omitted by omitting the repetitive issuance, thereby effectively enhancing the rate of transferring AV data to shorten the time necessary for dubbing. This, in turn, saves the power consumption and simplifies the processing to be performed in the host apparatus 12.

In the case of a multiple-write operation, a write command is issued by setting the number of files associated with a multiple-write operation as a parameter (FIG. 8).

Consequently, in the hard disk apparatus 13, free areas are sequentially detected on the side of the hard disk apparatus 13 by identifying files by the target numbers transmitted with the AV data and the AV data outputted from the host apparatus 12 are recorded to these detected free areas (FIGS. 6 and 7). In this case, too, the repetitive issuance of write commands from the host apparatus 12 otherwise required every time a predetermined data amount has been reached or every time cluster continuity is lost is omitted; namely, a single issuance of a write command allows the host apparatus 12 to record the files of continuous AV data. As a result, the handshake process associated with this command can be omitted by omitting the repetitive issuance, thereby effectively enhancing the rate of transferring AV data to shorten the time necessary for dubbing. This, in turn, saves the power consumption and simplifies the processing to be performed in the host apparatus 12.

According to the above-mentioned configuration, the hard disk apparatus 13 which is the recording/reproducing apparatus to operate in response to a one command sequentially reproduces and outputs files and sequentially writes files by detecting free areas, thereby omitting the repetitive issuance of commands to effectively enhance the transfer rate of data, thereby shortening the time required for dubbing as compared with related-art configurations.

Likewise, recording the data of plural files outputted from the host apparatus in a time-division manner and reproducing and outputting plural files associated with a request from the host apparatus in a time-division manner effectively enhance the transfer rate of data to shorten the time necessary for dubbing as compared with the related-art configurations.

In addition, in the above-mentioned processing of reading plural files, reading of file 1 and file 2 based on control data is performed by one command set with parameters for identifying these two commands, so that issuance of one command can collectively specify plural files associated with reading. Consequently, the number of commands to be transferred between the host apparatus and the hard disk apparatus can be decreased to enhance the transfer rate of data, thereby shortening the time necessary for dubbing.

Moreover, in the processing of writing plural files, writing is performed by one command set with parameters corresponding to at least the number of files to be written, so that writing of plural files can be specified by one command having the minimum number of parameters. Consequently, the number of commands to be transferred between the host apparatus and the hard disk apparatus can be decreased to enhance the transfer rate of data, thereby shortening the time necessary for dubbing.

(3) Second Embodiment

In the above-mentioned embodiment, start cluster numbers are set as a parameter by a normal read command or a multiple-read command. The present invention is not limited to this configuration. Essentially, the same effects as those described with the above-mentioned embodiment can be achieved by setting information associated with the recording on the side of the hard disk apparatus so that the corresponding cluster numbers may be sequentially detected on the side of the hard disk apparatus. For example, a command may be issued by setting each file name as a parameter. In this case, the hard disk apparatus detects the start cluster number on the basis of the data in the directory area recorded to the memory and, with reference to the detected start cluster number, the data of the FAT area are sequentially followed.

In the above-mentioned embodiment, the application of the present invention to the hard disk apparatus based on an MS-DOS compliant file system. The present invention is not limited to this configuration but is widely applicable to any information processing apparatus based on various MS-DOS compliant systems such as magneto-optical disk, optical disk, and memory card for example.

As described and according to the invention, files are sequentially reproduced and outputted by the processing of a recording/reproducing apparatus in response to one command and the files are sequentially written by sequentially detecting free areas, so that the time for dubbing can be shortened as compared with the related-art configurations.

(4) Configuration of the Third Embodiment

Figure 30:
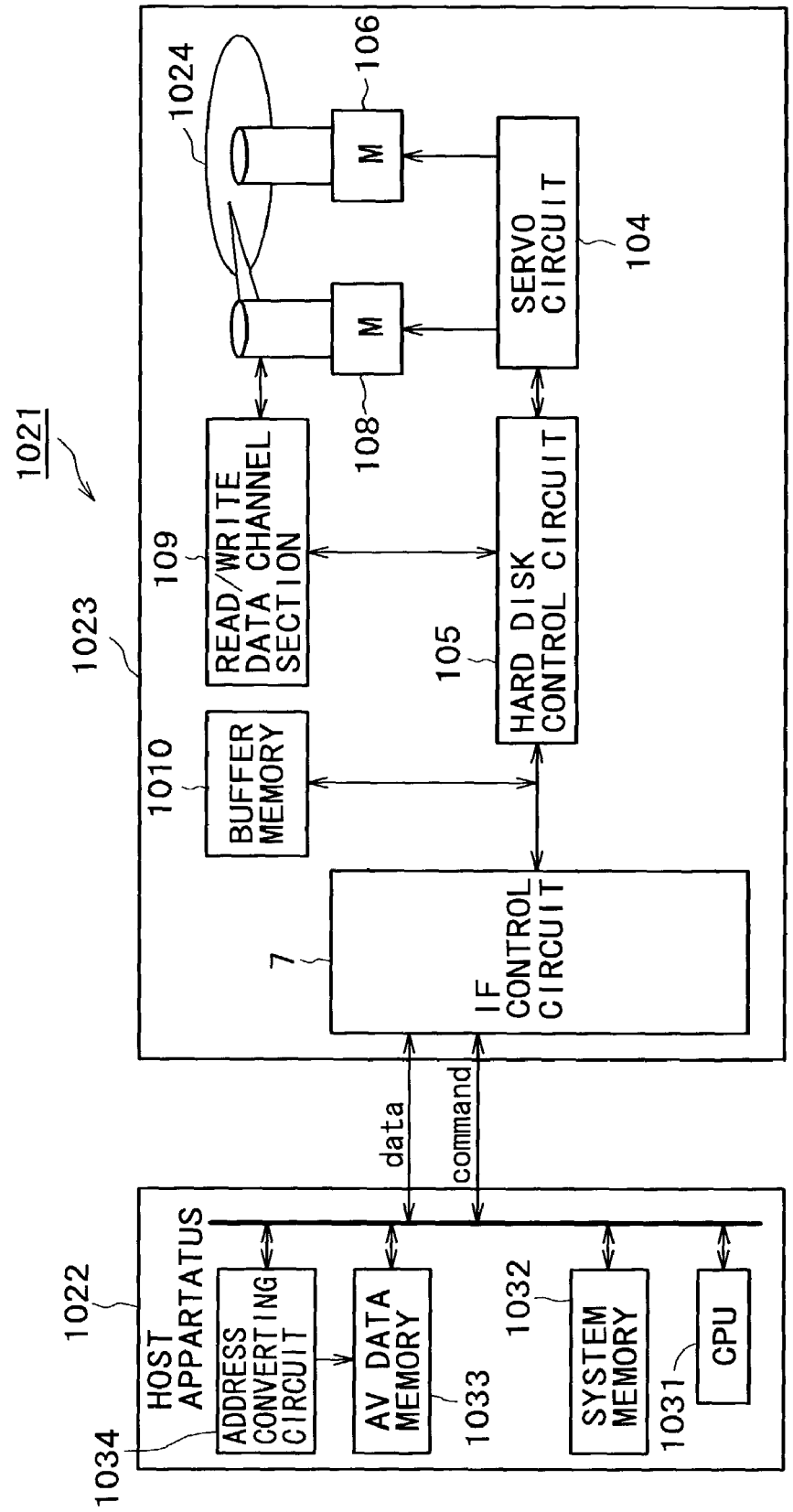
FIG. 30 is a block diagram illustrating a video camera practiced as a first embodiment of the invention.

Referring to FIG. 30, there is shown a block diagram illustrating a video camera practiced as a third embodiment of the invention. A video camera 1021 images a desired object by a host apparatus 1022 to generate AV data and records the AV data by a hard disk apparatus 1023. The video camera 1021 also reproduces the AV data recorded by the hard disk apparatus 1023. For this purpose, the host apparatus 1022 has an imaging mechanism for getting these AV data and outputting them to a bus, a signal processing circuit, and a monitor mechanism for monitoring the AV data outputted to the bus.

The hard disk apparatus 1023, which is connected to the host apparatus 1022, a set-top box, a personal computer (PC) or the like, records various data outputted from these equipment. Also, as connected to these equipment or disconnected from these equipment and connected to other devices, the hard disk apparatus 1023 reproduces and outputs the recorded data.

As shown in FIG. 31, an AV data area is formed on the hard disk 1024 in addition to a system entry area and a data area. The AV data area is used to selectively record the AV data by a predetermined number of seconds which is allocated to the start portion of each position to which access by a seek operation must be made at the reproduction of recorded AV data. This predetermined number of seconds is set to a value higher than the maximum length of time of the time required for a seek operation in the hard disk apparatus 1023. In the present embodiment, a value equivalent to one frame (33 msec) of video data is assigned.

The portion which must be accessed by a seek operation at the time of reproduction is set to the recording start position of this video camera 1021 or the start position at which the continuity of cluster numbers is lost in the recording of continuous AV data. It should be noted that, in the video camera 1021, the AV data are controlled with respect to file and recorded so that the recording start position comes to the file start position. In the hard disk 1024, the AV data following the AV data to be recorded in this AV data area are recorded in the data area.

In the hard disk 1024, the file management in the AV data area and the data area is performed by continuous cluster numbers and by the FAT area and directory area described above with reference to FIGS. 15 through 18 as with the related-art data area in a collective manner, the AV data of a corresponding file recorded in the AV data area are detected by detecting the start cluster number from the recording of the directory area, and, by following the recording of the FAT area, a file containing the AV data recorded in the AV data area and the data area in a divided manner are reproduced.

In the hard disk apparatus 1023, an interface control circuit (IF control circuit) 1027 is constituted by a SCSI controller or an IDE controller for example to configure an input/output circuit for inputting and outputting data and control commands to be transferred with the host apparatus 1022. Namely, the interface control circuit 1027 interprets commands entered from the host apparatus 1022 and the parameters of these commands to control the operations of a hard disk control circuit 105 and so on. At the time of writing, the interface control circuit 1027 outputs the AV data entered from a host apparatus 1022 to the hard disk control circuit 105 and, at the time of reading, outputs the AV data received from the hard disk control circuit 105 to the host apparatus 1022 via a buffer memory 1010.

In the above-mentioned processes, on the basis of a standby command issued by the host apparatus 1022, the interface control circuit 1027 instructs a servo circuit 104 for the retracting of the magnetic head and the stopping of the driving of the hard disk 1024, thereby preventing waste power dissipation from occurring. Conversely, on the basis of an idle command issued by the host apparatus 1022, the interface control circuit 1027 instructs the servo circuit 104 to start the driving of the hard disk 1024, thereby putting the hard disk 1024 into the state ready for access (this state is hereafter referred to as the idle state).

In the above-mentioned configuration, when the host apparatus 1022 is powered on, a central processing unit 1031 sends a reproduction command to the hard disk apparatus 1023 to indicate the reproduction of the system entry area and stores the resultant data in the FAT area and the directory area into a system memory 1032. Next, the central processing unit 1031 issues a command for reproducing the AV data area to the hard disk apparatus 1023 and stores the resultant data in the AV data area into an AV data memory 1033.

The AV data memory 1033 is dedicated to store the data recorded in the AV data area. As shown in FIG. 31, in the present embodiment, the same size as that of the AV data area of the hard disk 1024 is allocated to the AV data memory 1033, so that the data recorded in the AV data area can all be recorded. For the AV data memory 1033, the address setting is made so as to correspond to the cluster address in the AV data area. Consequently, the host apparatus 1022 converts the logical address for accessing the hard disk 1024 into the address of the AV data memory by a simple process to output the AV data recorded in the AV data memory 1033 instead of reproducing the AV data area. This allows, at the time of reproduction, the host apparatus 1022 to collectively record the AV data to be allocated to the position on which a seek operation must be performed into the AV data area, thereby storing these AV data in the AV data memory 1033 by prefetching at the time of starting up the hard disk apparatus.

After starting up the hard disk apparatus 1023 as described above, if access to the hard disk apparatus 1023 is not instructed by the user for a predetermined period of time and access to the hard disk apparatus 1023 is not instructed by the upper equipment, the central processing unit 1031 issues a save command to the hard disk apparatus 1023. This allows the central processing unit 1031 to prevent waste power dissipation caused by the hard disk 1024 from occurring.

If the reproduction of the AV data recorded to the hard disk 1024 is specified, the central processing unit 1031 searches the directory area and the FAT area recorded to the system memory 1032 to sequentially detecting continuous clusters recorded with the file to be reproduced on a predetermined data amount basis as with the related-art configuration. On the basis of the clusters detected as described above, the central processing unit 1031 sets the cluster address of reproduction start position and the transfer length as parameters to issue a read command to an address converting circuit 1034. This allows the central processing unit 1031 to repetitively issue read commands via the address converting circuit 1034, reproducing desired files.

In the above-mentioned processes, if the hard disk apparatus 1023 is in the standby state, the central processing unit 1031 instructs the hard disk apparatus 1023 for switching to the idle state and then issues a read command.

The address converting circuit 1034 interprets the address of the read command issued by the central processing unit 1031 and, if the area specified by the address indicated by the interpreted address is the cluster in the AV data area, converts this address into the address of the AV data memory 1033, thereby controlling the address of the AV data memory 1033. At the same time, the address converting circuit 1034 detects the cluster number following this address from the FAT area data recorded to the system memory 1032 and instructs the hard disk apparatus 1023 to seek this following cluster. If the address attached to the read command indicates the address of the data area, the address converting circuit 1034 outputs the command issued by the central processing unit 1031 to the hard disk apparatus 1023.

Consequently, for the read command, the address converting circuit 1034 is adapted to execute address conversion so that the corresponding AV data are outputted to the bus from the AV data memory 1033 instead of the AV data area of the hard disk 1024. At the same time, the address converting circuit 1034 controls the operation of the hard disk apparatus 1023 so as to prepare the reproduction of the following clusters during a period in which these AV data are outputted. For the write command, the address converting circuit 1034 records the AV data in the area of the AV data memory 1033 specified by the write command on the basis of the address control of the AV data memory 1033.

If a seek operation is required in read processing, the host apparatus 1022 outputs the corresponding AV data from the AV data memory 1033 during the seek operation and, upon completion of the seek operation, making it ready for accessing the hard disk 1024, outputs the following AV data from the hard disk 1024.

When a file write operation is instructed, the central processing unit 1031 searches the FAT area data recorded to the system memory 1032 to sequentially detect a free area and sets the cluster address of the recording start position of this free area and the data transfer length as parameters to issue a write command, as with the related-art configuration. Also in this case, the central processing unit 1031 repetitively issues write commands via the address converting circuit 1034 to output the sequentially obtained AV data to the hard disk apparatus 1023.

In the above-mentioned processing, at starting of a recording operation, the central processing unit 1031 detects a free cluster from the AV data area and issues a command so as to record the above-mentioned AV data of the predetermined amount to the AV data area. For the start position of a free area at which the continuity of cluster numbers is lost in the detection of free areas, the central processing unit 1031 detects a free cluster from the AV data area and issues a command so as to record the AV data of the predetermined amount to the AV data area. For the AV data that follow the above-mentioned AV data, the central processing unit 1031 sequentially detects free clusters from the data area and issues commands.

Consequently, when a seek operation is required, the central processing unit 1031 records, to the AV data memory 1033, the AV data to be recorded to the AV data area during the time in which the seek operation is executed and records the remaining data directly to the hard disk 1024.

When the writing of the AV data of one file has been completed, the central processing unit 1031 instructs the hard disk apparatus 1023 to reproduce the AV data recorded to the hard disk 1024 so that the recording of the AV data memory 1033 matches the AV data area and records the AV data obtained by this processing to the AV data memory 1033. When this recording of all AV data to the hard disk 1024 has been completed, the central processing unit 1031 updates the data in the FAT area and the directory area stored in the system memory 1032 so that these data correspond to the recording of this file and updates the system entry area of the hard disk 1024 in a predetermined timed relation.

Consequently, for the AV data up to a position at which the hard disk 1024 becomes accessible, the host apparatus 1022 records these AV data in the AV data memory 1033 and temporarily hold them therein and then records these AV data from the AV data memory 1033 to the hard disk 1024.

Figure 32:
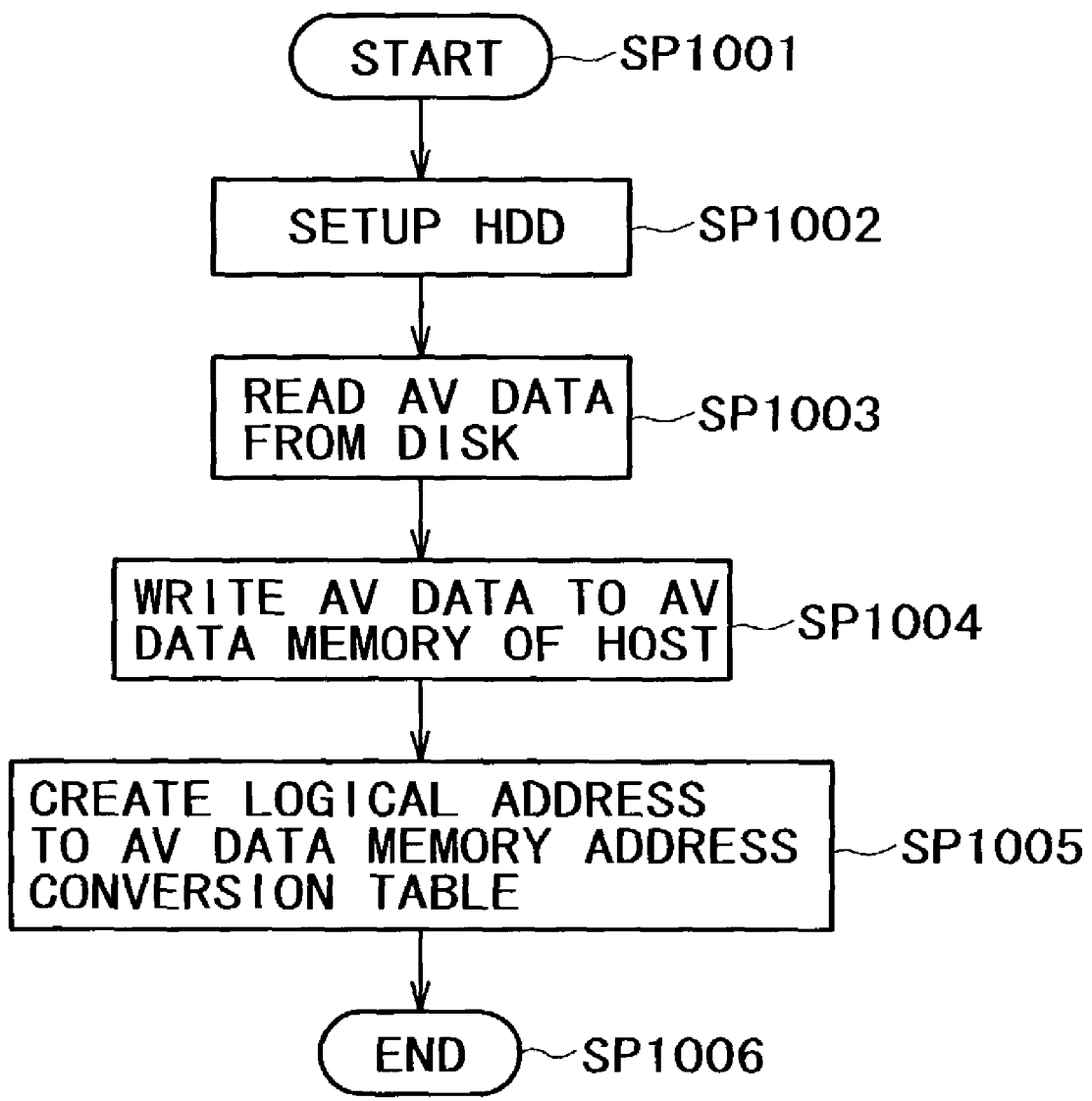
FIG. 32 is a flowchart describing a processing procedure at starting in the video camera shown in FIG. 30.

Now, referring to FIG. 32, there is shown a flowchart describing a processing procedure to be executed by the central processing unit 1031 at power-on sequence. When the central processing unit 1031 is powered on, it goes from step SP1001 to step SP1002 to start up the operation of the hard disk apparatus 1023. Next, the central processing unit 1031 issues a command for reading the system entry area to store the data in the directory area and the FAT area obtained from the hard disk apparatus 1023 into the system memory 1032.

In step SP1003, the central processing unit 1031 issues a command for reading the AV data area. In step SP1004, the data in the AV data area are read in response to this command and sent to the host apparatus, the central processing unit 1031 storing these data in the AV data memory 1033. In step SP1005, the central processing unit 1031 sets an address conversion table in the address converting circuit 1034 and then goes to step SP1006 to end this processing procedure.

Figure 33:
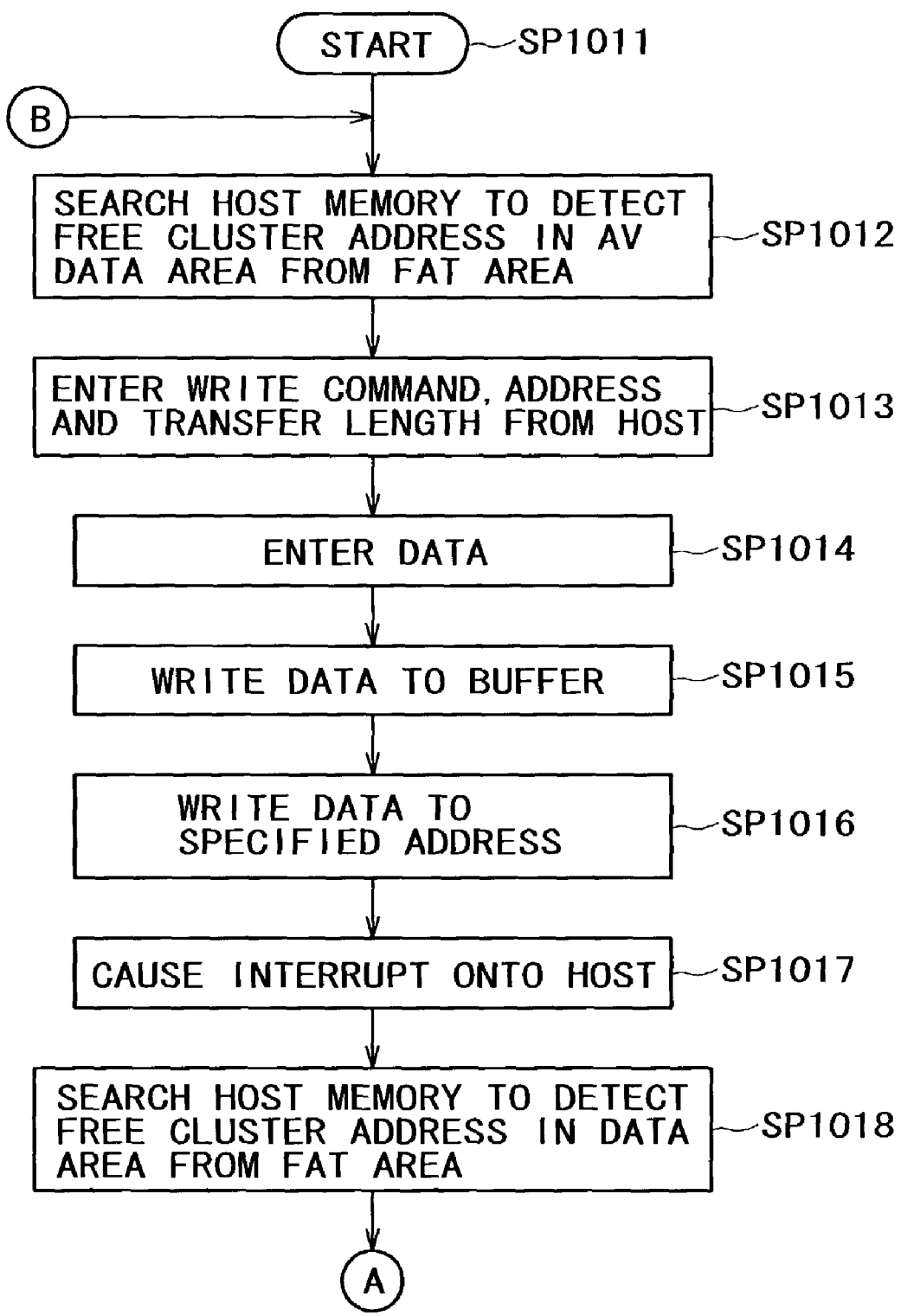
FIG. 33 is a flowchart describing a processing procedure at writing in the video camera shown in FIG. 30.
Figure 34:
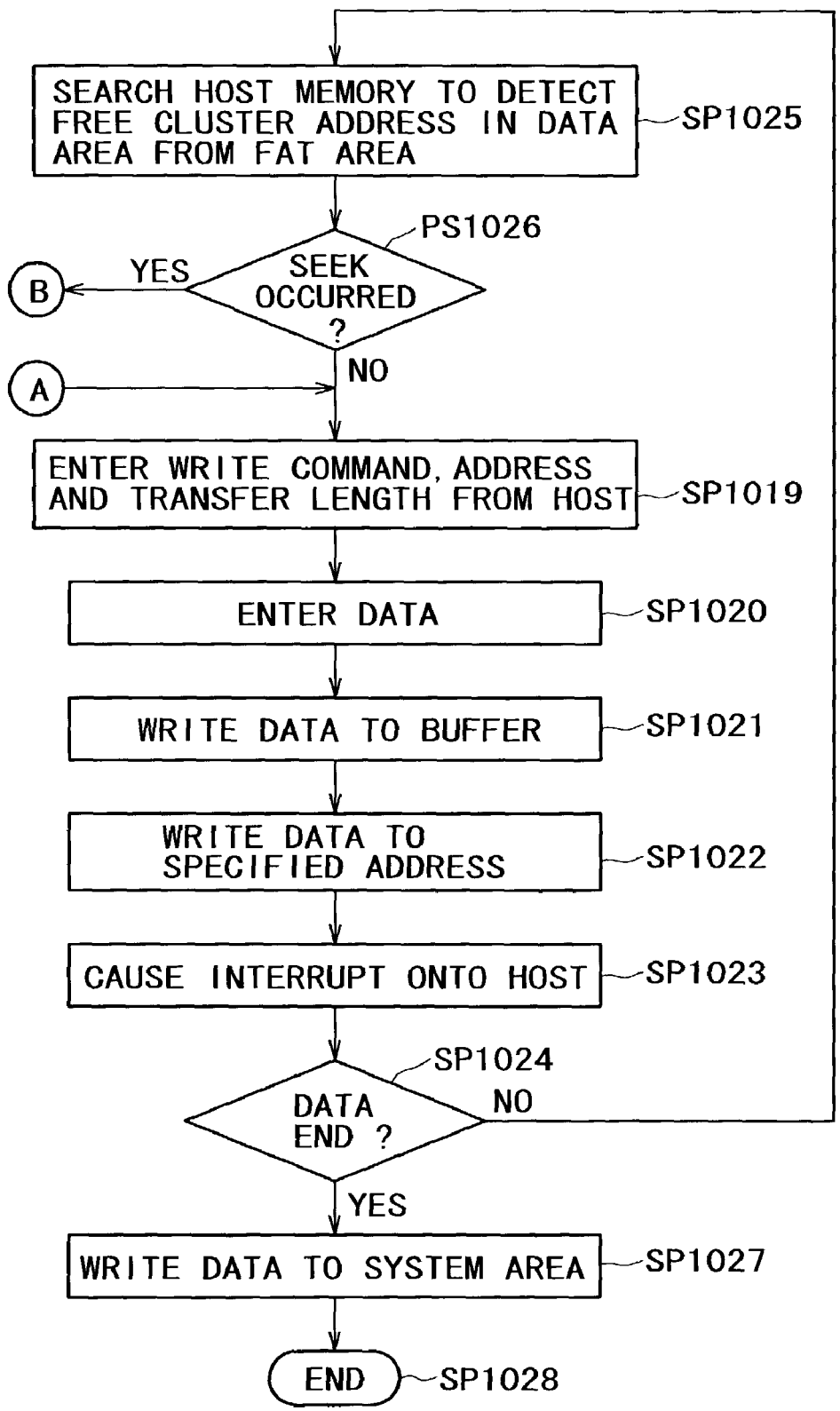
FIG. 34 is a flowchart continued from the flowchart shown in FIG. 33.

Referring to FIGS. 33 and 34, there are shown flowcharts describing write processing. In this case, issuing a write command, the central processing unit 1031 goes from step SP1011 to step SP1012 and searches the control data recorded in the system memory 1032 to detect, from the AV data area, a cluster number (a free cluster address) set with a code indicative of a free area.

When a free cluster address is detected, the central processing unit 1031 sets this free cluster address and the transfer length as parameters to issue a write command in step SP1013. In step SP1014, the central processing unit 1031 transmits the data to be recorded to the hard disk apparatus 1023 by an amount equivalent to the specified transfer length.

In step SP1015, the hard disk apparatus 1023 records the AV data transmitted in response to the write command to the buffer memory 1010. In step SP1016, the hard disk apparatus 1023 records the data from the buffer memory 1010 to the free cluster in the AV data area specified by the host apparatus 1022.

When the recording of the data transmitted from the host apparatus 1022 has been completed, the hard disk apparatus 1023 causes an interrupt onto the host apparatus 1022 in step SP1017. This causes the central processing unit 1031 to go to step SP1018 and search the control data recorded to the system memory 1032 to detect, from the data area, continuous cluster numbers set with a code indicative of a free area within the predetermined number of clusters.

In step SP1019, the central processing unit 1031 sets the free cluster address detected in step SP1018 and the transfer length as parameters to issue a write command. In step SP1020, the central processing unit 1031 transmits the data to be recorded to the hard disk apparatus 1023 by an amount equivalent to the transfer length. In step SP1021, the hard disk apparatus 1023 records the data transmitted in response to the write command to the buffer memory 1010. In step SP1022, the hard disk apparatus 1023 records the data from the buffer memory 1010 to the free cluster in the data area specified by the host apparatus 1022.

When the recording of the data transmitted from the host apparatus 1022 has been completed, the hard disk apparatus 1023 causes an interrupt onto the host apparatus 1022 in step SP1023. This interrupt causes the central processing unit 1031 to determine in step SP1024 whether or not the data to be recorded have all been recorded. If the decision is NO, the central processing unit 1031 goes to step SP1025.

Thus, the central processing unit 1031 records the data equivalent to the time required for a seek operation from the start of recording to the AV data area and the following AV data to the data area.

In step SP1025, the central processing unit 1031 searches the control data recorded in the system memory 1032 to detect, from the data area, continuous cluster numbers set with a code indicative of a free area within the predetermined number of clusters.

In step SP1026, the central processing unit 1031 determines whether or not the cluster numbers are continuous from the AV data area recorded before and determines whether or not a seek operation occurs when starting the recording to the cluster detected in step SP1025. If the decision is NO, the central processing unit 1031 goes to step SP1019 to record the AV data following the data area in the same manner as described above. If the decision is YES in step SP1026, the central processing unit 1031 returns to step SP1012 to detect a free cluster in the AV data area by ignoring the cluster number detected in step SP1025.

Thus, if a seek operation is required upon the losing of the continuity between cluster numbers, the central processing unit 1031 also records the AV data corresponding to the reproduction start position immediately after this seek operation to the AV data area.

When the data to be recorded have all been recorded to the hard disk 1024 by repeating the above-mentioned processing operations, the central processing unit 1031 gets YES in step SP1024. Consequently, the central processing unit 1031 goes from step SP1024 to step SP1027 and updates the data in the system entry area and the FAT area and directory area in the system memory 1032 so that these data correspond to these AV data. At the same time, to match the recording in the AV data memory 1033 with the recording in the AV data area, central processing unit 1031 instructs the hard disk apparatus 1023 to reproduce the AV data and stores the AV data obtained as a result of the instruction to the AV data memory 1033, going to step SP1028 to end this processing procedure.

Figure 35:
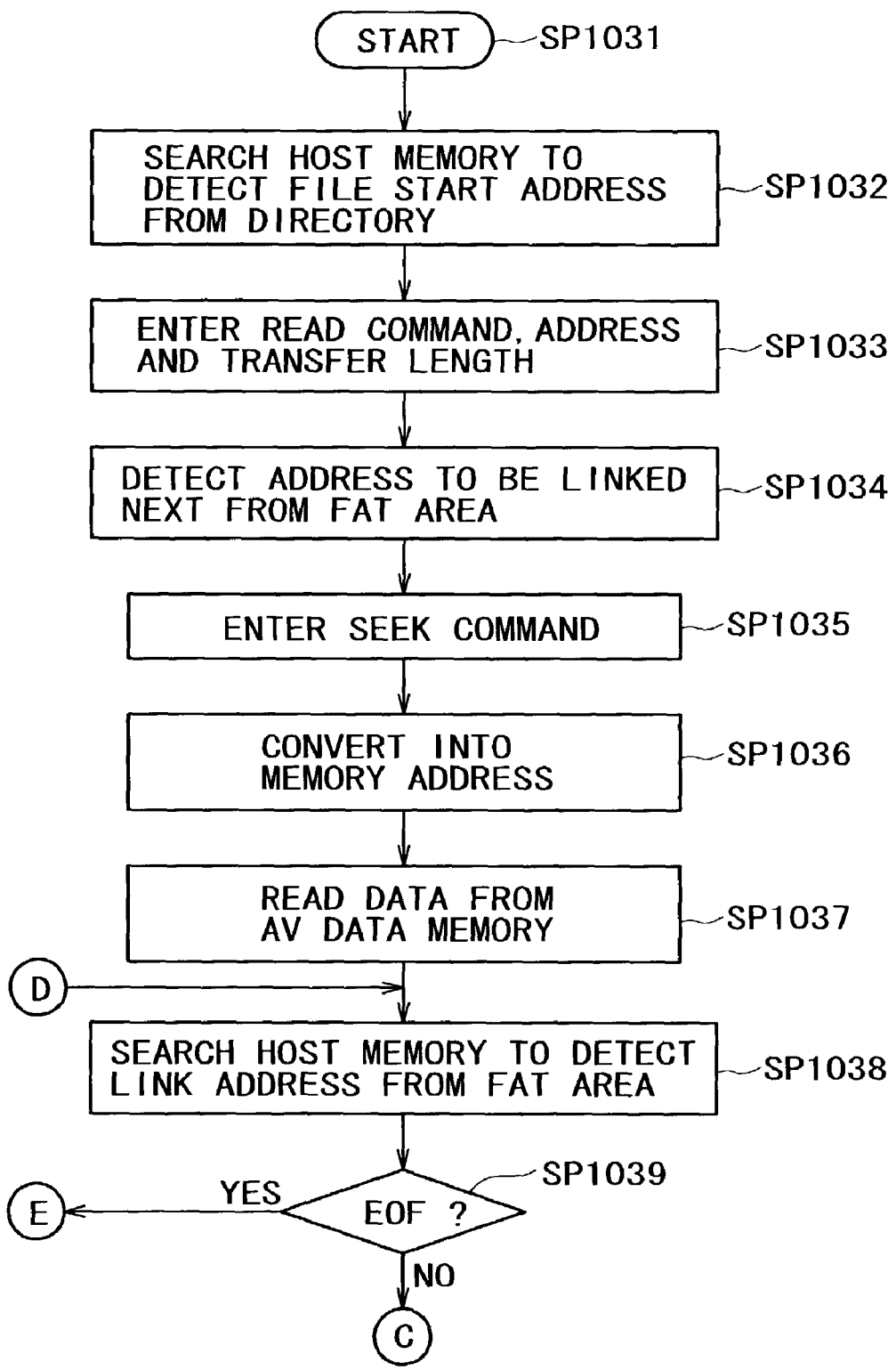
FIG. 35 is a flowchart describing a processing procedure at reading in the video camera shown in FIG. 30.
Figure 36:
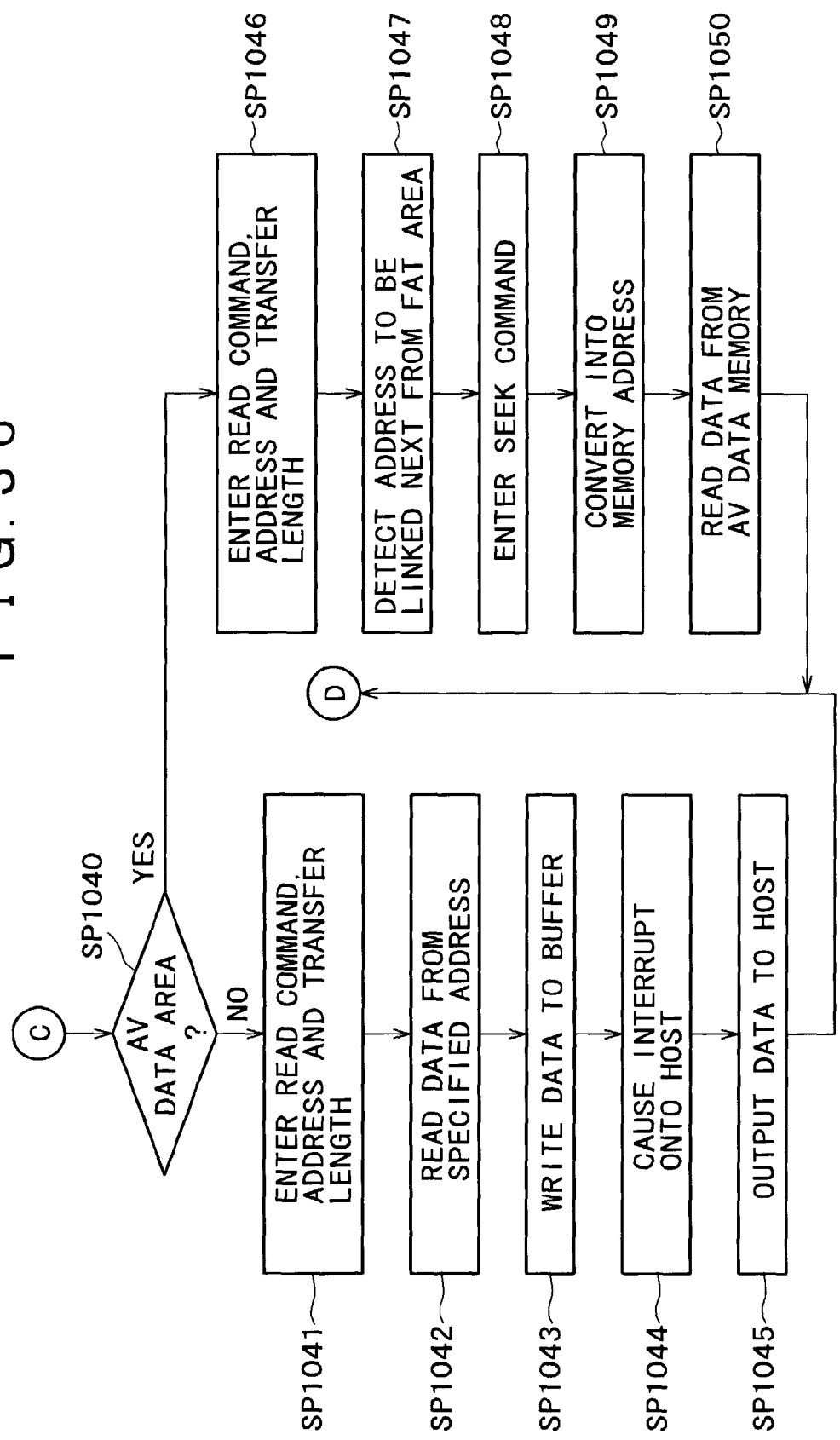
FIG. 36 is a flowchart continued from the flowchart shown in FIG. 35.
Figure 37:
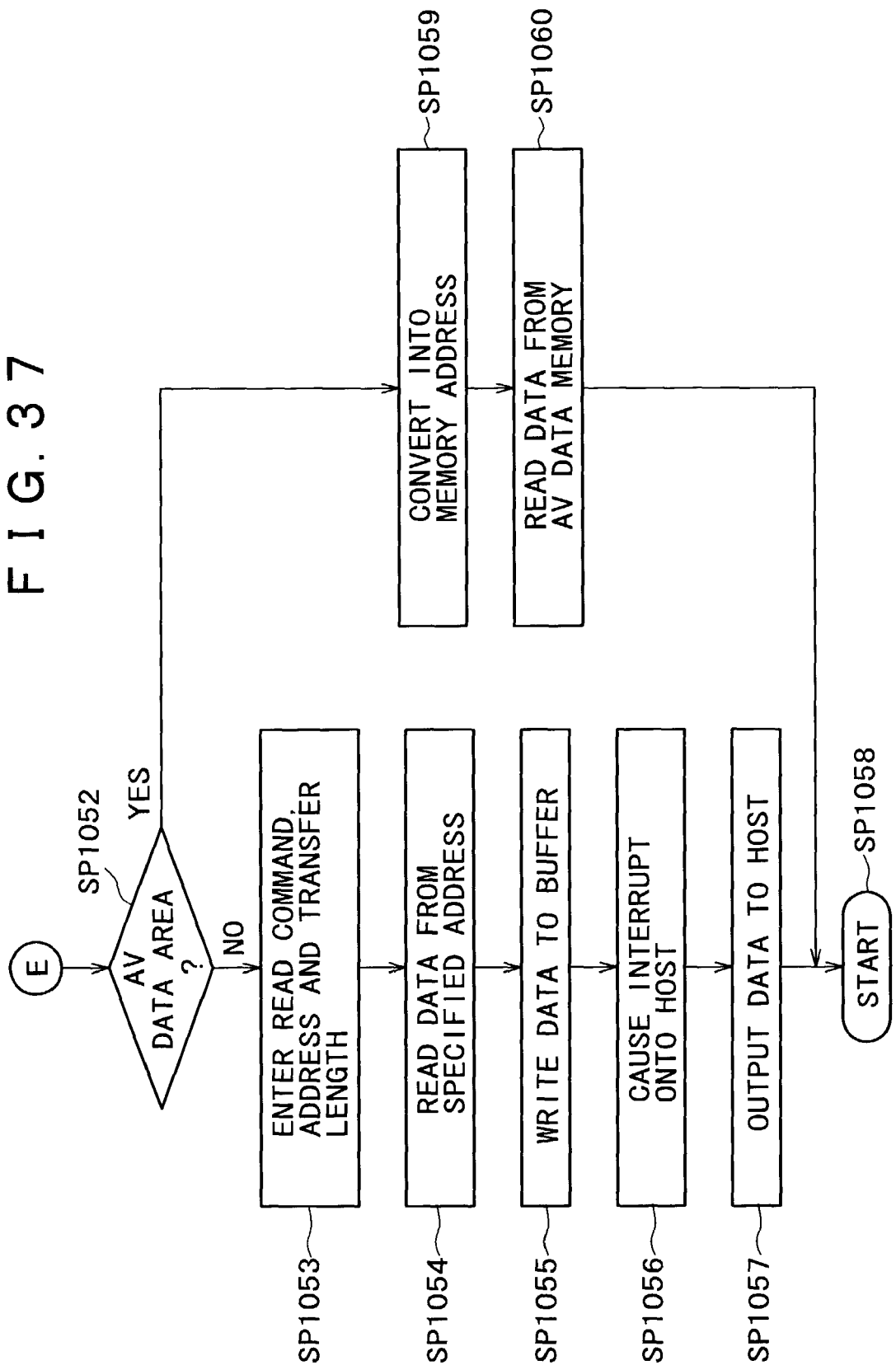
FIG. 37 is a flowchart continued from the flowchart shown in FIG. 36.

Referring to FIGS. 35 through 37, there are shown flowcharts describing a processing procedure to be executed when a read operation is instructed by the specification of a file name. In this procedure, the central processing unit 1031 goes from step SP1031 to step SP1032 and searches system memory 1032 for the file control data (FIG. 18) of the corresponding file from the data in the directory area to detect the address based on the start cluster number of this file.

In step SP1033, the central processing unit 1031 sets this start cluster address and the transfer length as parameters to issue a read command.

The cluster address added to the read command issued as described above indicates a cluster in the AV data area by the above-mentioned recording processing, so that the host apparatus 1022 interprets this read command through the address converting circuit 1034 to search the system memory 1032 through the address converting circuit 1034 to detect the following cluster address in step SP1034.

In step SP1035, the address converting circuit 1034 issues a seek command to the hard disk apparatus 1023 on the basis of the detected next cluster address. In step SP1036, to read, from the AV data memory 1033, the AV data specified by the read command issued by the central processing unit 1031, the address converting circuit 1034 converts the address set to this read command into the address in the AV data memory 1033. In step SP1037, the AV data are read from the AV data memory 1033 on the basis of this address and outputted to predetermined equipment.

Thus, upon starting a file access operation, the host apparatus 1022 starts reproducing the AV data of the start portion stored in the AV data memory 1033 under the control of the address converting circuit 1034, which issues a seek command to the hard disk apparatus 1023 to make the following cluster ready for reproduction.

When the outputting of the AV data starts as described above, the central processing unit 1031 accesses the recording in the system memory 1032 in step SP1038 to detect the continuous cluster numbers with the following AV data recorded within the predetermined number of clusters. In step SP1039, the central processing unit 1031 determines whether or not an EOF code has been detected in these detected cluster numbers. If the decision is NO, the central processing unit 1031 goes to step SP1040 (FIG. 36).

The central processing unit 1031 determines whether or not the cluster numbers detected as described above belong to the AV data area. If the decision is NO, then the central processing unit 1031 goes to step SP1041 and sets the cluster numbers detected in step SP1039 as a parameter to issue a read command having this parameter. The start cluster specified in this read command already waits for reproduction in the hard disk apparatus 1023 in response to a seek command issued by the address converting circuit 1034 in step SP1035. Consequently, the video camera 1021 can effectively prevent the access speed from being lowered by the seeking of file recording start position.

In step SP1042, the hard disk apparatus 1023 reproduces the AV data from the corresponding cluster without performing any seek processing. In step SP1043, the hard disk apparatus 1023 records the reproduced AV data to the buffer memory 1010. When the reproduction of AV data has been completed, the hard disk apparatus 1023 causes an interrupt onto the host apparatus 1022 in step SP1044. This causes the central processing unit 1031 to instruct the hard disk apparatus 1023 to transfer the AV data in step SP1045 and then returns to step SP1038.

Thus, when the AV data are recorded to continuous clusters, the video camera 1021 repeats the processing procedure step SP1038 to SP1039 to SP1040 to SP1041 to SP1042 to SP1043 to SP1044 to SP1045 to SP1038 to reproduce the AV data from the data area of the hard disk 1024 on a predetermined data amount basis, outputting the reproduced AV data to predetermined equipment.

If the cluster continuity is lost, the decision in step SP1040 is YES, so that the central processing unit 1031 goes from step SP1040 to step SP1046. The central processing unit 1031 issues a read command based on the cluster address detected in step SP1039. In this case, because the cluster address of this command indicates the AV data area according to the above-described recording processing, the host apparatus 1022 interprets this command through the address converting circuit 1034 in step SP1047 as with the processing at the time of starting reproduction, the address converting circuit 1034 searching the system memory 1032 to detect the following cluster address.

In step SP1048, the address converting circuit 1034 issues a seek command based on the detected following cluster address. In step SP1049, the address set to this command is converted into the address of the AV data memory 1033 so that the AV data corresponding to the read command issued by the central processing unit 1031 are read from the AV data memory 1033. In step SP1050, the AV data are read from the AV data memory 1033 on the basis of this converted address and outputted to predetermined equipment.

If a seek operation is required for accessing the hard disk 1024, the host apparatus 1022 starts reproducing, under the control of the address converting circuit 1034, the AV data at the reproduction start position after the seek operation stored in the AV data memory 1033 and, at the same time, outputs a seek command to the hard disk apparatus 1023 so that the following cluster is made ready for reproduction.

Having started outputting the AV data for seek processing, the central processing unit 1031 returns to step SP1038 and accesses the system memory 1032 to detect continuous cluster numbers with AV data recorded within the predetermined number of clusters, sequentially executing the processing procedure of steps SP1039 to step SP1040 to SP1041.

Thus, the start cluster specified in this read command issued in step SP1041 already waits for reproduction in the hard disk apparatus 1023 in response to a seek command issued by the address converting circuit 1034 in step SP1048. Consequently, if a seek operation is performed because of the loss of the continuity of the area with the AV data recorded in the hard disk 1024, the video camera 1021 can effectively prevent the access speed from being lowered by this access operation.

When the end of the file being reproduced has been reached by repeating the above-described procedure, EOF is found in the recording of the FAT area detected by accessing the system memory 1032. Consequently, the decision of step SP1039 is YES, so that the central processing unit 1031 goes to step SP1052 (FIG. 37).

The central processing unit 1031 determines whether or not the cluster number on which EOF has been detected belongs to the AV data area. If the decision is NO, the central processing unit 1031 goes to step SP1053 and sets the cluster number detected in step SP1039 as a parameter to issue a read command having this parameter. In step SP1054, the hard disk apparatus 1023 reproduces the AV data from the corresponding cluster and records the reproduced AV data to the buffer memory 1010 in step SP1055. When the reproduction of the AV data has been completed, the hard disk apparatus 1023 causes an interrupt onto the host apparatus 1022 in step SP1056. This interrupt causes the central processing unit 1031 to instruct the hard disk apparatus 1023 to transfer the AV data in step SP1057 and then goes to step SP1058 to end this processing procedure.

If the decision of step SP1052 is YES, the host apparatus 1022 converts the cluster address detected in step SP1039 into the address in the AV data memory 1033 through the control by the address converting circuit 1034 as described above. In step SP1060, the host apparatus 1022 reproduces the corresponding AV data from the AV data memory 1033 through the control by the AV data memory 1033 and outputs the reproduced AV data, going to step SP1058 to end this processing procedure.

(5) Operation of the Third Embodiment

In the above-described configuration, when the video camera 1021 (FIGS. 30 and 31) is powered on, the data in the system entry area are reproduced from the hard disk 1024 and, of these reproduced system entry area data, the data in the FAT area and the directory area, which are the control data of the AV data area and the data area, are stored in the system memory 1032 of the host apparatus 1022.

The video camera 1021 detects the recording position of the a desired file on the basis of the control data stored in the system memory 1032 to sequentially issue read commands to the hard disk apparatus 1023, thereby reproducing the desired file. Likewise, the video camera 1021 detects a free area from the control data and sets the address of the detected free area as a parameter to issue a write command having this parameter, thereby recording imaging results to the hard disk 1024.

Loading the data in the system entry area into the system memory 1032 at the time of starting up, the video camera 1021 reproduces the data by an amount equivalent to a predetermined duration of time from the start position of each file recorded to the hard disk 1024 or from the reproduction start position which is the start position of the portion on which cluster continuity is lost and stores the reproduced data into the AV data memory 1033. When a read operation is specified, the video camera 1021 outputs the corresponding data from the data stored in the AV data memory 1033 and then outputs the following data which are obtained by reproducing the hard disk 1024.

Consequently, if a seek operation is performed on the recording start position of each file, the video camera 1021 can reproduce the AV data following the seek operation during a period in which the AV data stored in the AV data memory 1033 are being outputted, thereby effectively preventing the access speed from being lowered by this seek operation. Also, if, upon indication by an upper application program or external equipment, two or more files are continuously reproduced in accordance with an editing list, the present embodiment can effectively prevent the access speed from being lowered by the seek operation performed on the start position of each of the files.

Further, to prevent the access speed from being lowered by a seek operation, the video camera 1021 records, at the time of recording processing, to the AV data area, the AV data of a predetermined amount at the start of each file or a predetermined data amount at the start in which cluster continuity is lost.

Thus, if the driving of the hard disk 1024 is temporarily stopped to save the power dissipation, the video camera 1021 outputs the AV data from the AV data memory 1033 until the hard disk 1024 becomes accessible by starting the driving of the hard disk 1024 based on a read command and, when the hard disk 1024 becomes accessible, outputs the AV data reproduced from the hard disk 1024, thereby supplying the data from the AV data memory 1033 until the hard disk 1024 becomes accessible. Consequently, the video camera 1021 can provide the data of a desired file instantaneously upon starting of reproduction.

Also, because the data held in the AV data memory 1033 in a prefetch manner are the data with the start of each file set to the reproduction start position, the video camera 1021 can provide the data of a desired file instantaneously upon starting of reproduction by effectively using the data held in the AV data memory 1033. Namely, the disk recording media of this type permit random access, so that a file can be reproduced starting halfway by so setting a processing program in the host apparatus 1022. However, in many cases, files are reproduced from their start positions, so that by prefetching and holding the data of an amount equivalent to a predetermined duration of time from the start of each file, the data of each desired file can be provided instantaneously upon starting of reproduction.

It should be noted that the data stored in the AV data memory 1033 may also be used for searching the files recorded to the hard disk 1024, which enhances the ease of use of the embodiment.

As described above, in the video camera 1021, the prefetched data are stored in an amount enough for the hard disk 1024 to become accessible after being driven, so that, if the AV data memory 1033 and the hard disk 1024 are switched between for data output, the data can be outputted with interruption.

If no access to the hard disk 1024 is specified for a predetermined duration of time, the driving of the hard disk 1024 is stopped, thereby saving the power dissipation.

In the video camera 1021, as described above, the data of each file transferred to the AV data memory 1033 and held therein are collectively held in the AV data area which is separate from the data area (FIG. 31). Consequently, the video camera 1021 can execute, at high speeds, the processing of storing these data in the AV data memory 1033 at the time of starting, thereby also saving the power dissipation.

In the video camera 1021, these AV data area and data area are allocated to the data area of a related-art MS-DOS compliant FAT file system and file management is executed by the recordings of the FAT area and the directory area based on continuous cluster numbers. Consequently, also when collectively recording only predetermined data to the AV data area and holding them therein, the video camera 1021 can access each file recorded to the hard disk 1024 without limitation by unloading the hard disk apparatus 1023 and loading the same on a device having related-art configuration such as a personal computer.

When recording imaging results, the video camera 1021 starts driving the hard disk 1024 upon instruction for recording by the user. The sequentially obtained AV data are recorded in the AV data memory 1033 until the hard disk 1024 becomes accessible after the driving is started and, when the hard disk 1024 becomes accessible, the following AV data are recorded to the hard disk 1024. Consequently, in this case, the video camera 1021 can use the AV data memory 1033 as a buffer memory to prevent waste power dissipation from occurring and record the imaging results immediately after the recording has started.

When the recording of one of file has been completed after recording continuous AV data as described above, the video camera 1021 records the AV data recorded to the AV data memory 1033 immediately after the start of recording to the AV data area of the hard disk 1024, thereby providing integrity between the AV data memory 1033 and the AV data area. At the same time, the data recorded to the system memory 1032 are updated. Consequently, also when reproducing a file recorded as described above, the video camera 1021 can output the AV data from the AV data memory 1033 immediately after the driving of the hard disk 1024 has started, thereby preventing waste power dissipation from occurring and outputting a desired file instantaneously.

In the above-mentioned processing operations, the video camera 1021, at the time of reproduction, searches the control data which are the data in the FAT area and the directory area recorded to the system memory 1032 on the basis of file name and sets parameters accordingly to issue a read command, thereby outputting the data from the AV data memory 1033 and the hard disk 1024 by the processing of the address converting circuit 1034. At the time of writing, the video camera 1021 searches the system memory 1032 to detect a free area from the AV data area and then detect a free area from the data area and sets parameters accordingly to issue a write command, thereby recording the prefetch AV data to the AV data memory 1033 and the following data to the data area of the hard disk 1024 by the processing of the address converting circuit 1034.

Thus, by the cooperative processing between the central processing unit 1031 and the address converting circuit 1034, the video camera 1021 selectively outputs the AV data from the AV data memory 1033 and the AV data reproduced from the recording media by searching the control data with reference to the file name set to the write command. Consequently, an upper application program and upper equipment controlling the operation of the video camera 1021 can reproduce desired files by issuing related-art control commands and, likewise, record desired files to the hard disk 1024.

Namely, as shown in FIG. 38A, to sequentially record the AV data in files 1 through 5 to continuous clusters and sequentially reproduce these files 1 through 5, each file can be recorded and reproduced in the conventional manner and with no seek operation, thereby effectively preventing the access speed from being lower by seek processing.

To sequentially record files 1 through 5 to continuous clusters as described above, the video camera 1021 record the data at the start of each file and of a predetermined amount to the AV data area and reads the AV data from the AV data memory 1033 to be held. Consequently, as shown in FIG. 39A, as indicated by the hatching on the data at the start of each file held in the AV data memory 1033, the present embodiment, when continuously reproducing these files, outputs the AV data from the AV data memory 1033 at the start of each file and then outputs the AV data reproduced from the data area.

As shown in FIG. 38B, if continuous files are sequentially reproduced by deleting file 3, the related-art method interrupts the output of the continuous AV data for a time required for a seek operation during a time after completion of the reproduction of file 2 and until the start of file 4 is reproduced. In the present embodiment, however, as shown in FIG. 39B, the AV data stored in the AV data memory 1033 are outputted for a time required for a seek operation during a time after the completion of file 2 and until file 4 is reproduced and then the following AV data of file 4 recorded to the data area are outputted, thereby effectively preventing the access speed from being lowered by the seek operation if the continuity between file 2 and file 4 is lost. It should be noted that, in the present embodiment, if file 3 is deleted, a code indicative of free area (FIG. 56) is obviously set to not only the data area but also the FAT area of the AV data area, thereby deleting the AV data of file 3 from the AV data area.

When file 6 having data greater in amount than file 3 is recorded by deleting file 3, file 6 is recorded to the area from which file 3 has been deleted (file 6*a*) as shown in FIG. 38C and then to the free area which follows file 5. Consequently, to reproduce these files continuously, the cluster continuity is lost between file 2 and file 4, file 5 and file 6*a*, and file 6*a* and file 6*b* in the related-art method, making it difficult to reproduce AV data during a time required for a seek operation, thereby lowering the access speed.

In the present embodiment, however, a predetermined amount of data at the starts of file 6*a* and file 6*b* are stored in the AV data memory 1033, so that the AV data stored in the AV data memory 1033 are outputted during times in which cluster continuity is lost between file 2 and file 4, file 5 and file 6*a*, and file 6*a* and file 6*b* as shown in FIG. 39C1, thereby effectively preventing the access speed from being lowered.

Also when reproducing data by changing file reproduction sequence as shown in FIG. 39C2, the present embodiment can effectively prevent the access speed from being lowered by a seek operation. It should be noted that FIG. 39C2 shows the change in file reproduction sequence between file 2 and file 4 from the sequence shown in FIG. 39C1.

If the recording of the file control data recorded to the directory area is updated to link file 1 and file 4 into one file 7 as shown in FIG. 38D, this file 7 is recorded to the data area as file 7*a* and file 7*b* which correspond to file 1 and file 4 respectively. In this case, too, as shown in FIG. 39D, these files are reproduced in the original reproduction sequence and in other various sequences, thereby effectively preventing the access speed from being lowered by a seek operation.

Further, for a portion in one file in which cluster continuity is lost, the video camera 1021 records the AV data of a predetermined amount from the start of that file to the AV data area, as with the file start position. In addition, the video camera 1021 stores the AV data recorded to the AV data area into the AV data memory 1033 and, after outputting the AV data from the AV data memory 1033, reproduces and outputs the following AV data from the AV data area. Consequently, when a seek operation is performed because cluster continuity is lost in one file, the present embodiment can effectively prevent the access speed from being lowered by the seek operation.

It should be noted that, when reproducing plural files continuously, the central processing unit 1031 separately forms link file information indicative of the link relationship between these files into a recording area in the system memory 1032 in accordance with the edit list and sequentially reproduces the files with reference to this link file information.

Figures 40A, 40B:
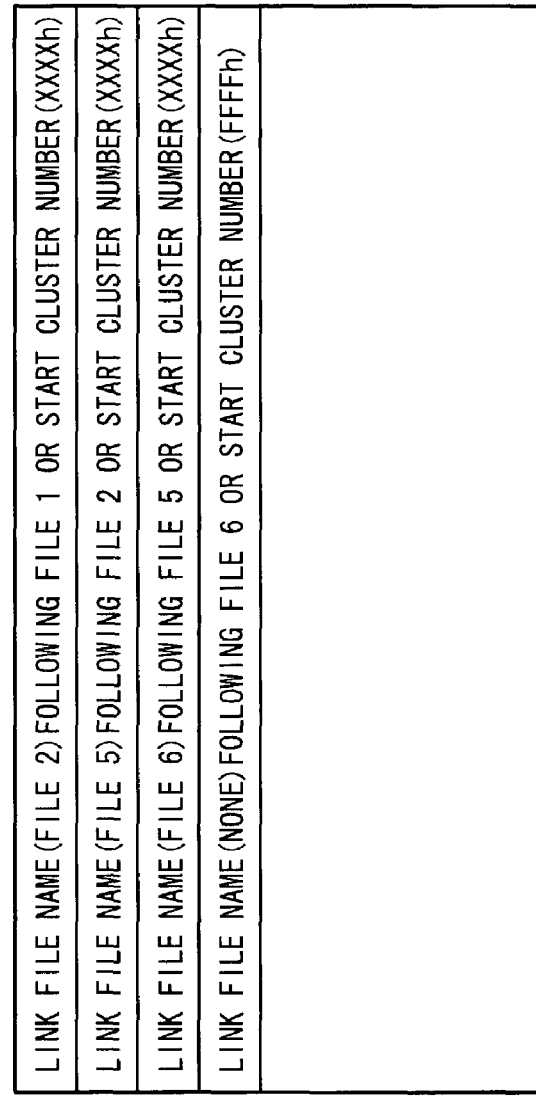
FIGS. 40A and 40B are diagrams illustrating file information indicative of link relationships between files.

FIG. 40B shows a link file information area for the link file information formed in the system memory 1032 as contrasted with the recording in the directory area. When reproducing files 1, 2, 5 and 6 continuously, this link file information area stores the file name or start cluster number of file 2 to be reproduced after file 1, the file name or start cluster number of file 5 to be reproduced after file 2, the file name or start cluster number of file 6 to be reproduced after file 5, and a no-link-file code or an EOF code indicative of that file 6 is the last file to be reproduced.

Consequently, in the present embodiment, after reproducing file 1 by following the recordings of the directory area and the FAT area, the file to be reproduced on the basis of the link file information is found to be file 2, which is reproduced by following the recordings of the directory area and/or the FAT area. By repeating the above-mentioned processing, the end of the reproduction of these continuous files is detected when completing the reproduction of the last file 6.

In the link file information formed as described above, the last cluster number of each file may be used as a key to describe and create the start cluster number of the file to be reproduced next as shown in FIG. 41. In this case, when the cluster number of each file is detected on the basis of the data in the FAT area and EOF is detected, the central processing unit 1031 searches the link file information based on the cluster number on which EOF has been detected to detect the start cluster number of the file, thereby sequentially reproducing the following files. It should be noted that the list based on the link file information may be recorded to the data area of the hard disk 1024 for example.

(6) Effects of the Third Embodiment

According to the above-mentioned configuration, the data of the start portion of the position which must be accessed by a seek operation at the time of reproduction are recorded to the AV data memory 1033 by a predetermined data amount and held therein. While it is difficult to reproduce the data from the hard disk 1024 which is a disk type recording medium because of the seek operation, the AV data held in the AV data memory 1033 are outputted, followed by the outputting of the data reproduced from the hard disk 1024. Consequently, this configuration can prevent the access speed from being lowered by the seek operation.

Because the start portion to be recorded in the AV data memory is the start portion of each file, when a seek operation is performed up to the file start position, the AV data stored in the AV data memory are outputted during this seek operation, thereby effectively preventing the access speed from being lowered. Consequently, the AV data of each desired file can be reproduced instantaneously upon a file reproducing instruction by the user. In addition, when plural files are reproduced in various sequences, the AV data can be outputted without interruption from file to file.

Because the start portion to be recorded in the AV data memory 1033 is the start cluster after the recording to continuous clusters is discontinued, if a seek operation is performed because of lost cluster continuity, the present embodiment can effectively prevent the access speed from being lowered by the seek operation, thereby outputting the AV data without interruption.

Further, the AV data held in the AV data memory 1033 are reproduced from the hard disk 1024 in a predetermined timed relation and recorded to the AV data memory. This allows the use of a hard disk apparatus based on the same file management system as the related-art system, executing the processing of this type.

Still further, because the timing described above is at the start-up time of the embodiment, the above-mentioned processing can be performed on each existing file recorded on the hard disk 1024 without failure.

Yet further, because this predetermined timing is after the completion of the recording of one file to the hard disk 1024, the present embodiment can prevent the access speed from being lowered by the seek operation also in the case of accessing each file just recorded.

Moreover, the AV data to be recorded in the AV data memory 1033 are collectively recorded in the AV data area, which is a predetermined area on the hard disk 1024, so that the present embodiment can transfer the AV data to the AV data memory 1033 at high speeds, thereby shortening the time required for the processing.

According to the above-mentioned configuration, the data of an amount equivalent to a predetermined length of time from the reproduction start position are held in memory by prefetching at startup, so that the data of a desired file can be instantaneously outputted by effectively preventing waste power dissipation from occurring.

Because this predetermined length of time is the time at which data becomes reproducible at least after starting up the driving of the recording medium, the continuous data can be outputted without interruption.

Because this reproduction start position is the start position of each file, the prefetched data can be effectively used to instantaneously output the data of a desired file and, at the same time, used for a search operation for example.

If the recording medium is not accessed for a predetermined period of time, the driving of the recording medium is stopped and, upon instruction for access, the driving is started, thereby preventing waste power dissipation from occurring.

Of the data sequentially entered upon instruction for recording, the data of an amount equivalent to a predetermined period of time from the reproduction start position are recorded in memory and other data and the data recorded in memory are recorded to a recording medium to provide integrity with the above-mentioned prefetch processing, thereby processing the sequentially entered data.

The data to be prefetched can be collectively recorded to the AV data area which is a predetermined area set to a recording medium, thereby executing a prefetch operation at startup at high-speeds.

The above-mentioned AV data area and data area are managed on the basis of continuous addresses, thereby providing compatibility with other equipment.

By the cooperative operation between the central processing unit 1031 and the address converting circuit 1034 and on the basis of control data search results with reference to the file name set to the command, the data recorded to the AV data memory 1033 and the data reproduced from a recording medium can be selectively outputted, thereby allowing an upper control program and various equipment to reproduce and record a desired file by use of the same control commands as related-art control commands.

(7) Configuration of the Fourth Embodiment

The video camera practiced as a fourth embodiment of the invention operates each individual file by edit processing. The configuration of this video camera is generally the same as that of the video camera shown in FIG. 30 except that a central processing unit 1031 executes the processing procedure associated with this edit processing. Therefore, the configuration of the video camera according to the fourth embodiment will be described with reference to FIG. 30.

Namely, in the present embodiment, the central processing unit 1031 updates the recordings of the FAT area and the directory area under the control of an upper application program or external equipment, divides one file into plural files accordingly, couples plural files into one file, and partially deletes files.

Every time each file is processed in the above-mentioned processing operations, the central processing unit 1031 updates the recordings of the AV data area and a AV data memory 1033 accordingly.

To be more specific, if one file is divided into plural files, the central processing unit 1031 records the start AV data of each of the divided files to the AV data area and the AV data memory 1033 and deletes the recording of the AV data of the corresponding start portion from the data area. Also, the central processing unit 1031 updates the recordings of the FAT area and the directory area accordingly.

If plural files are linked into one file, the cluster continuity is lost, in the resultant one file, at the start portion of each file before linking, so that the central processing unit 1031 does not update the recordings of the AV data area and the AV data memory 1033 but updates the recordings of the FAT area and the directory area.

If files are partially deleted and the cluster continuity is lost by this deletion, the central processing unit 1031 records the AV data of the start portion of the deleted portion to the AV data area and the AV data memory 1033. At the same time, the central processing unit 1031 updates the recordings of the FAT area and the directory area.

Consequently, the present embodiment can effectively prevent the access speed from being lowered by a seek operation when the edit operation which manipulates each individual file is performed.

Figure 43A:
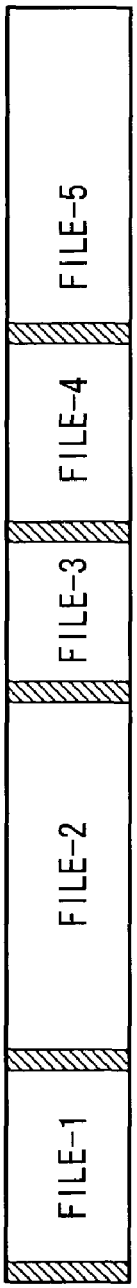
FIGS. 43A through 43E are diagrams illustrating a reproducing operation as contrasted with FIGS. 42A through 42D.
Figure 43B:
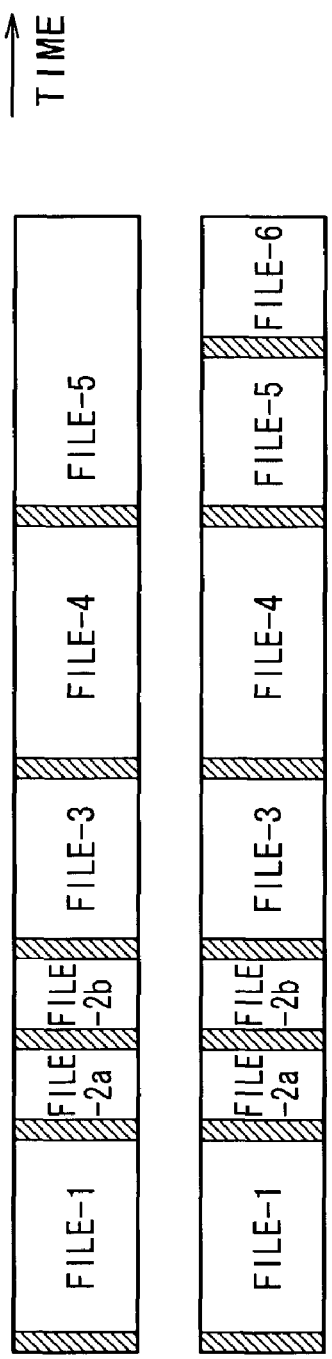

To be more specific, as shown in FIGS. 42A through 42D and 43A through 43D as contrasted with FIGS. 40A, 40B and 41, when files 1 through 5 are continuously recorded on a hard disk 1024 (FIGS. 43A and 43B), deleting a portion halfway in file 2 (the portions which remain after the deletion are indicated by 2*a* and 2*b*) causes the central processing unit 1031 to record the AV data at last half portion 2*b* to the AV data memory 1033 and the AV data area. Consequently, as shown in FIG. 43B, when these files 1 through 5 are continuously reproduced, if the cluster continuity is lost between these first half portion 2*a* and the last half portion 2*b* to cause a seek operation, the AV data recorded in the AV data memory 1033 can be supplied during a period in which it is difficult to reproduce the AV data because of the seek operation, thus preventing the access speed from being lowered by the seek operation when the edit processing requires the seek operation.

Figure 43C:
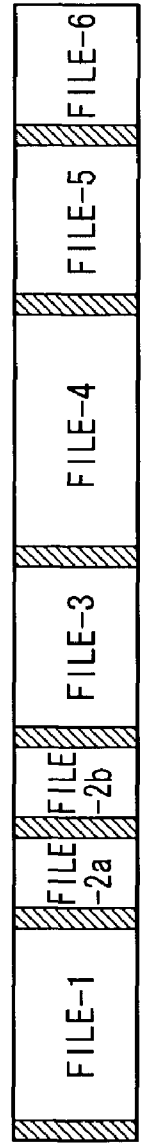

As shown in FIG. 42C, if a portion of file 5 is divided to provide file 6, the central processing unit 1031 records the AV data at the start portion of file 6 to the AV data memory 1033 and the AV data area. Consequently, as shown in FIG. 43C1, when these files 1 through 6 are continuously reproduced, the present embodiment can prevent the access speed from being lowered by the seek operation. As shown in FIG. 43C2, if the sequence of reproducing file 6 is set after file 1 for example and a seek operation is required between file 1 and file 6, the AV data in file 6 recorded to the AV data memory 1033 can be supplied during a period in which it is difficult to reproduce the AV data because of this seek operation, thereby effectively preventing the access speed from being lowered by the seek operation.

Figure 43D:
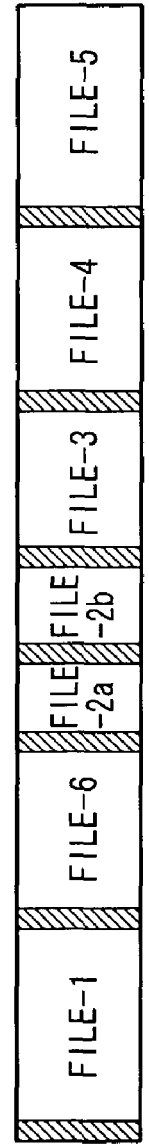
Figure 43E:
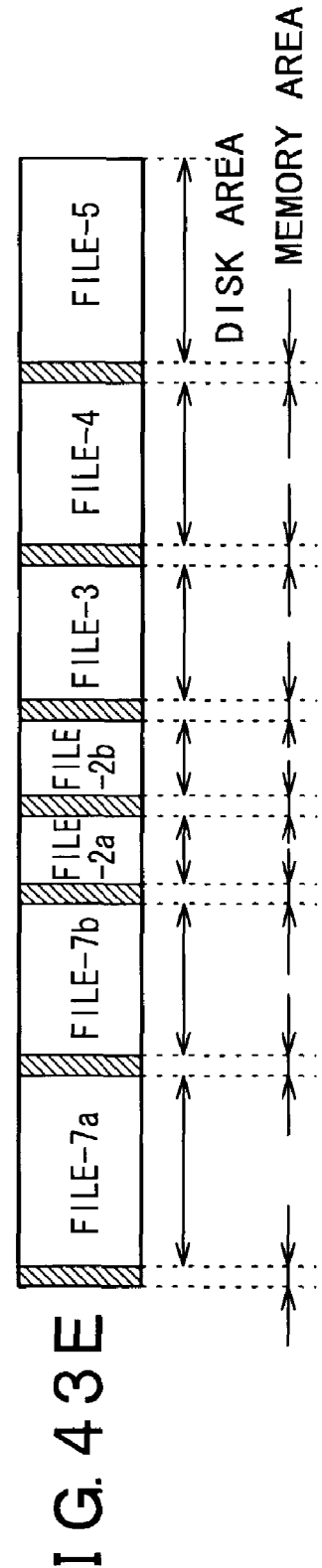

As shown in FIG. 42D, if file 6 is attached to file 1 at its end to provide one file 7 (the portions corresponding to file 1 and file 6 are indicated by 7*a* and 7*b* respectively), the central processing unit 1031 does not update the recordings in the AV data area and the AV data memory 1033 at all, the start portion of the last half portion 7*b* of file 7 being left recorded in the AV data memory 1033. Consequently, as shown in FIG. 43D, if these files are sequentially reproduced and a seek operation is performed between first half portion 7*a* and last half portion 7*b*, the AV data recorded to the AV data memory 1033 can be supplied during a period in which it is difficult to reproduce the AV data because of this seek operation, thereby effectively preventing the access speed from being lowered by the seek operation.

According to the present embodiment, in the edit processing for manipulating each individual file, the recordings of the AV data memory 1033 and the AV data area are updated accordingly, thereby effectively preventing the access speed from being lowered by the seek operation when the edit processing for manipulating each file is performed.

(8) Configuration of the Fifth Embodiment

Figure 44:
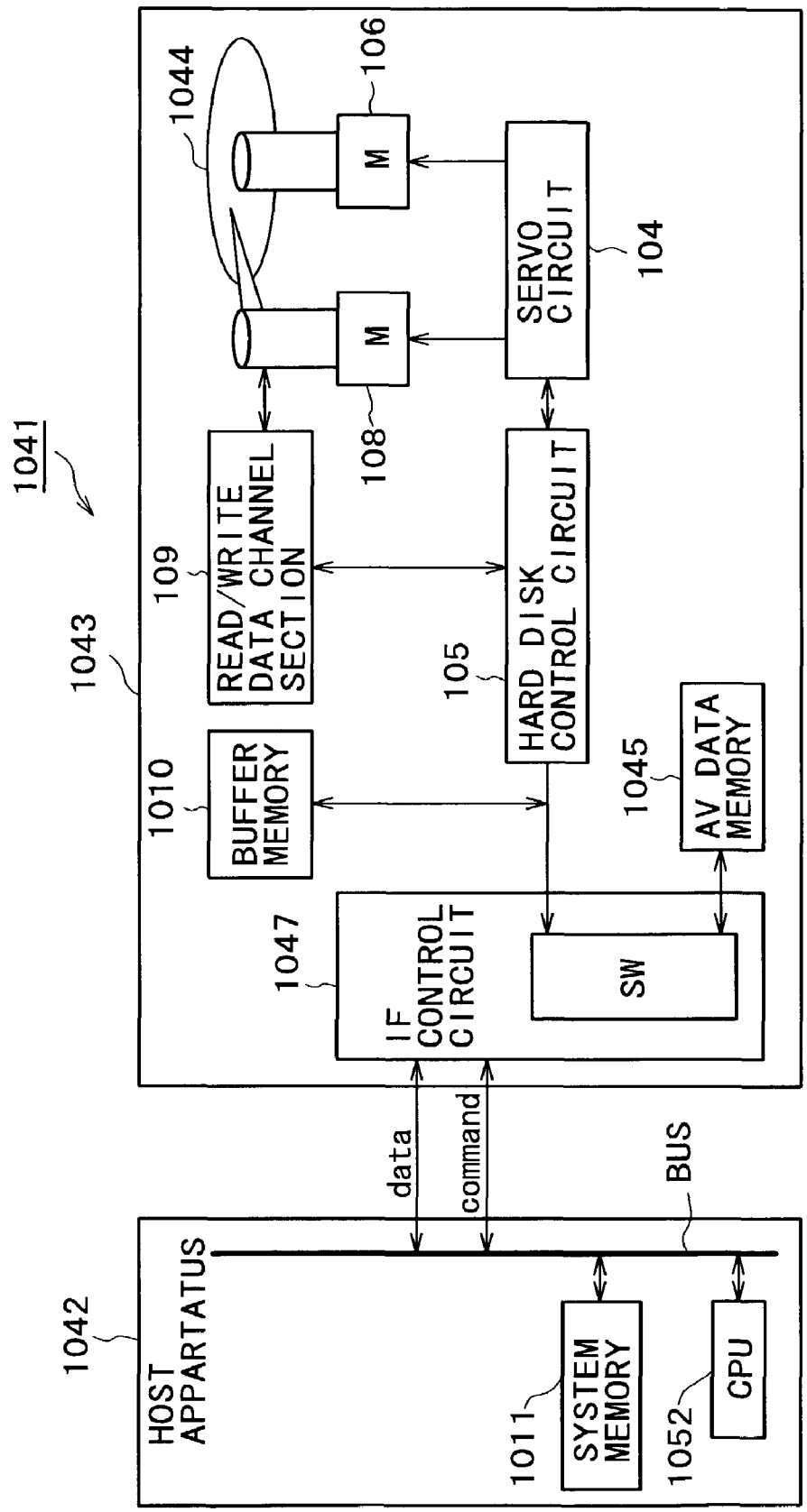
FIG. 44 is a block diagram illustrating a video camera practiced as a third embodiment of the invention.

Referring to FIG. 44, there is shown a block diagram illustrating a video camera 1041 practiced as a fifth embodiment of the invention. With reference to FIG. 44, the components of the video camera 1041 similar to those previously described with reference to FIG. 30 are denoted by the same reference numerals and the duplicate descriptions will be skipped.

In the video camera 1041, an AV data memory 1045 is constituted by a non-volatile memory and arranged on the side of a hard disk apparatus 1043, the AV data memory 1045 forming an AV data area as shown in FIG. 45. Consequently, the video camera 1041 can effectively prevent the access speed from being lowered by a seek operation without performing the processing of transferring the recording of the AV data area to the AV data memory 1033 and the processing of providing integrity between the recording of the AV data area and the recording of the AV data memory 1033 as practiced in the third embodiment of the invention.

In a hard disk 1044, the data area and the AV data memory 1045 are controlled by continuous cluster addresses and a FAT area stores the FAT addresses of these data area and AV data memory 1045.

Figure 46:
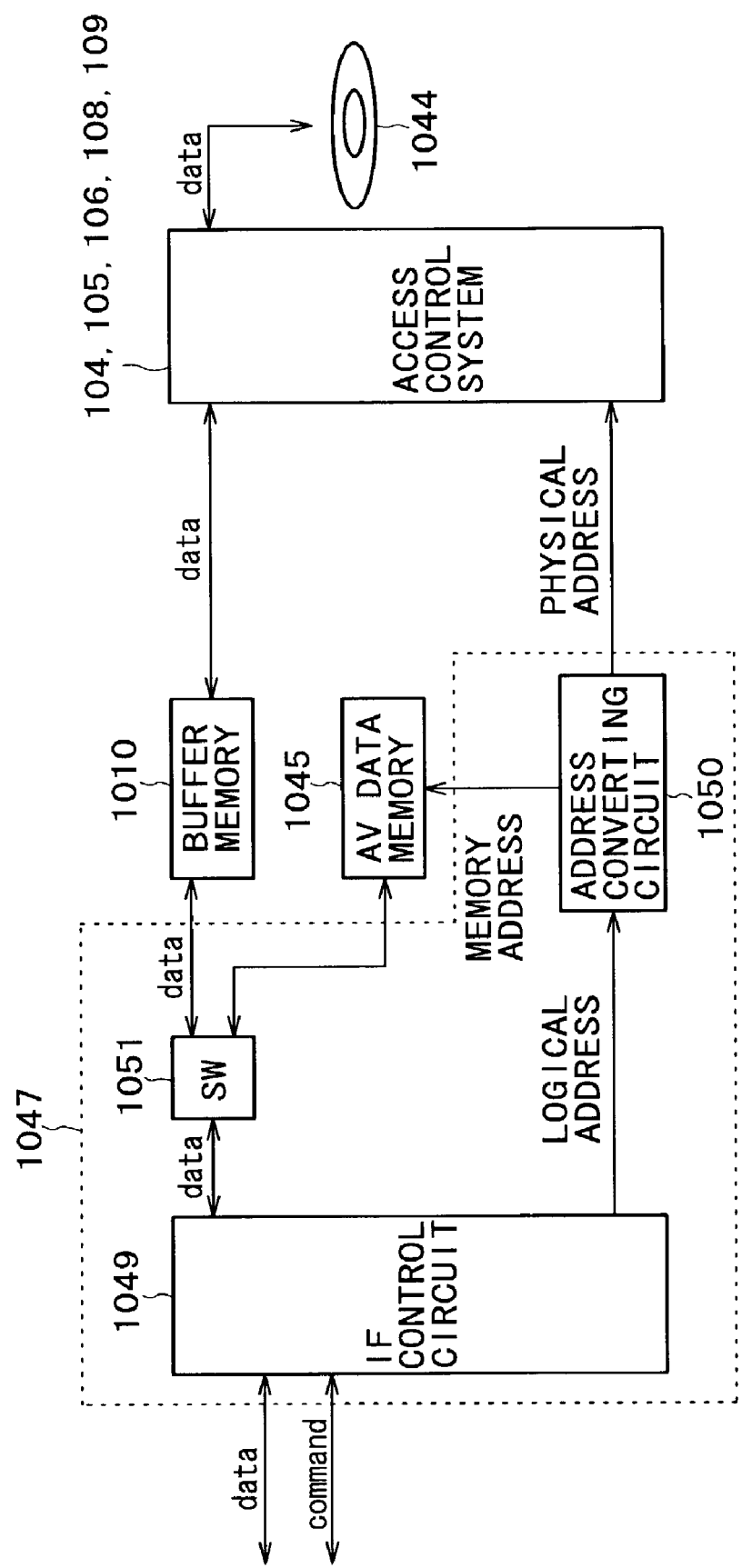
FIG. 46 is a block diagram illustrating in detail a hard disk apparatus in the video camera shown in FIG. 44.

As shown in FIG. 46 with emphasis placed on AV data flows, an interface control circuit 1047 controls the operations of the components by interpreting, through an interface control section 1049, commands issued by a host apparatus 1042. In this processing, the interface control circuit 1047 converts the logical addresses set to a read command and a write command into physical addresses through the address converting circuit 1050, outputting these physical addresses to a hard disk control circuit 105 which constitutes an access control system with a servo circuit 104.

In this processing, the interface control circuit 1047 selectively supplies the AV data to be written to the AV data memory 1045 and a buffer memory 1010 through an incorporated selecting circuit 1051 by the address control shown in FIG. 45, thereby recording, to the AV data memory 1045, the AV data of an amount equivalent to a predetermined period of time at the start of a file or the start of a portion at which cluster continuity is lost and the remaining data to the hard disk 1044. By the same address control, the interface control circuit 1047 selectively supplies the AV data based on the data reproduced from the hard disk 1044 and the AV data obtained from the AV data memory 1045 to the host apparatus 1042.

In the host apparatus 1042, a central processing unit 1052 obtains the data in the FAT area and the directory area under the control of the hard disk apparatus 1043 at the time of startup and stores the obtained data in the system memory 1011. When a write command comes, the central processing unit 1052 searches the system memory 1011 for a free area in the AV data area from the start of each file or the start of a portion at which cluster continuity is lost and sets parameters on the basis of the result of this search to issue a write command. Consequently, the video camera 1041 stores the data at the start of each file and having an amount equivalent to a predetermined period of time to the AV data memory 1045 forming the AV data area.

For the following AV data, the central processing unit 1052 searches the system memory 1011 for a free area in the data area and sets parameters on the basis of the result of the search to issue a write command. Consequently, the video camera 1041 records the following AV data to the hard disk 1044.

Having recorded the data in one file to the hard disk apparatus 1043 by the above-mentioned processing operations, the central processing unit 1052 updates the contents of the system memory 1011 or updates the recording of the system entry area.

In the above-mentioned processing, the central processing unit 1052 controls the operation of the hard disk apparatus 1043 so as to perform a seek operation to the recording start position of the following AV data during a period of time in which the AV data are being recorded to the AV data memory 1045, thereby preventing the access speed from being lowered by the seek operation also at the time of recording.

Upon instruction for reproduction, the central processing unit 1052 sequentially sets parameters in accordance with the recording of the system memory 1011 to issue a read command and obtains the AV data from the AV data memory 1045 for the data at the start of each file and having a predetermined amount and the remaining data from the hard disk 1044.

In this processing, if the hard disk 1044 is not accessed longer than a predetermined period of time, the central processing unit 1052 instructs the hard disk apparatus 1043 to stop driving the hard disk 1044. If the driving of the hard disk 1044 is in the stopped state when issuing a write command or a read command, the central processing unit 1052 issues an idle command.

As shown in FIG. 32, the AV data memory 1045 is constituted by a non-volatile memory, the data of an amount equivalent to a predetermined period of time from the reproduction start position are recorded to this memory, and the remaining data are recorded to a recording medium, so that the effects similar to those of the third embodiment may be obtained without executing the above-mentioned prefetch processing and the processing of providing integrity between the contents of the AV data memory and the contents of the hard disk described with reference to the third embodiment.

In addition, by controlling the data areas of this memory and the hard disk by the control data based on continuous cluster addresses, the hard drive side determines the address set to a command to output the data stored in the memory or the data reproduced from a recording medium selectively to command-associated equipment. This simple processing can effectively prevent waste power dissipation from occurring, thereby instantaneously outputting the data in each file. On the host apparatus side, a simple address control operation can perform these processing operations.

Figure 47:
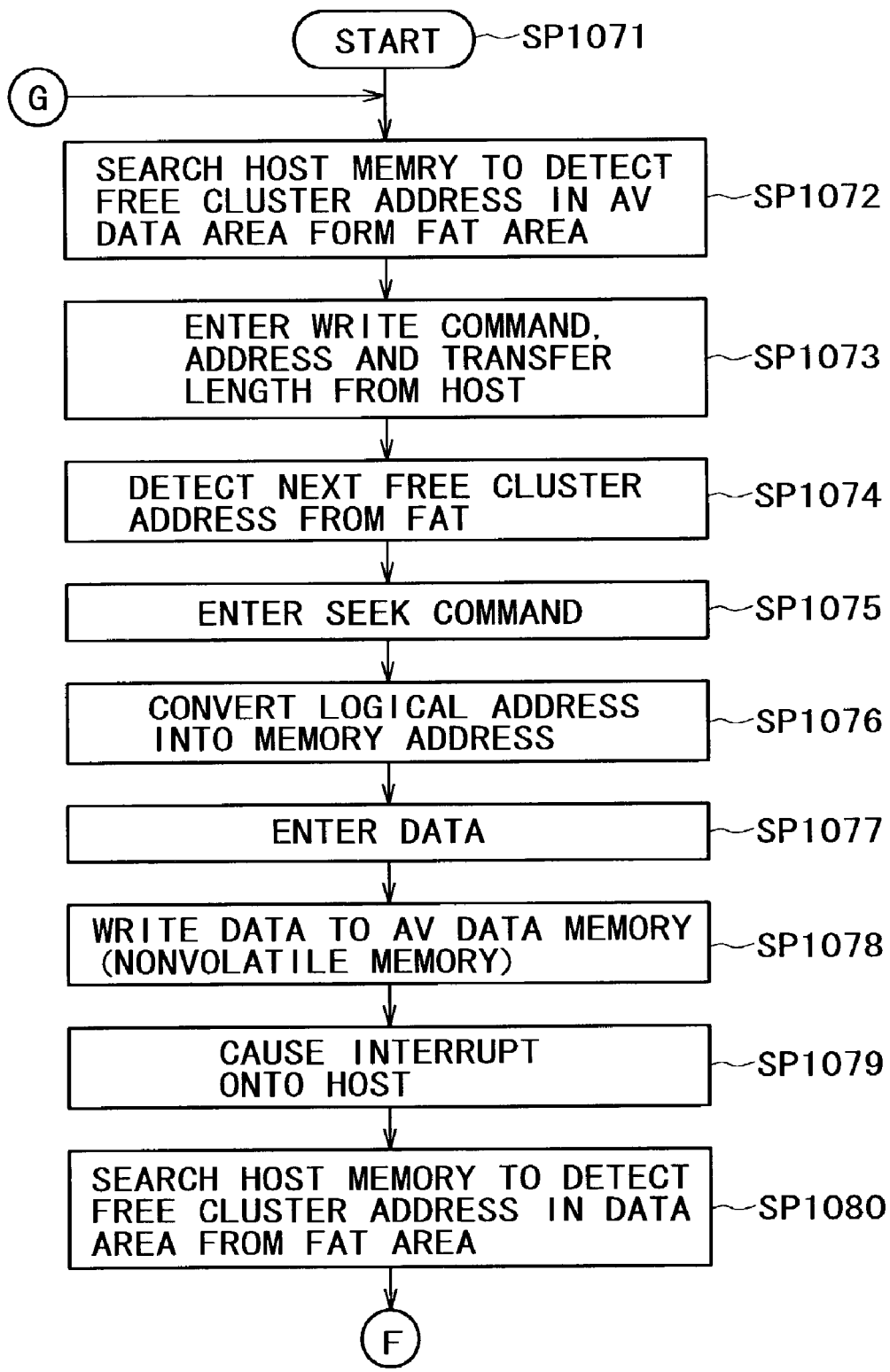
FIG. 47 is a flowchart describing a processing procedure at writing in the video camera shown in FIG. 44.
Figure 48:
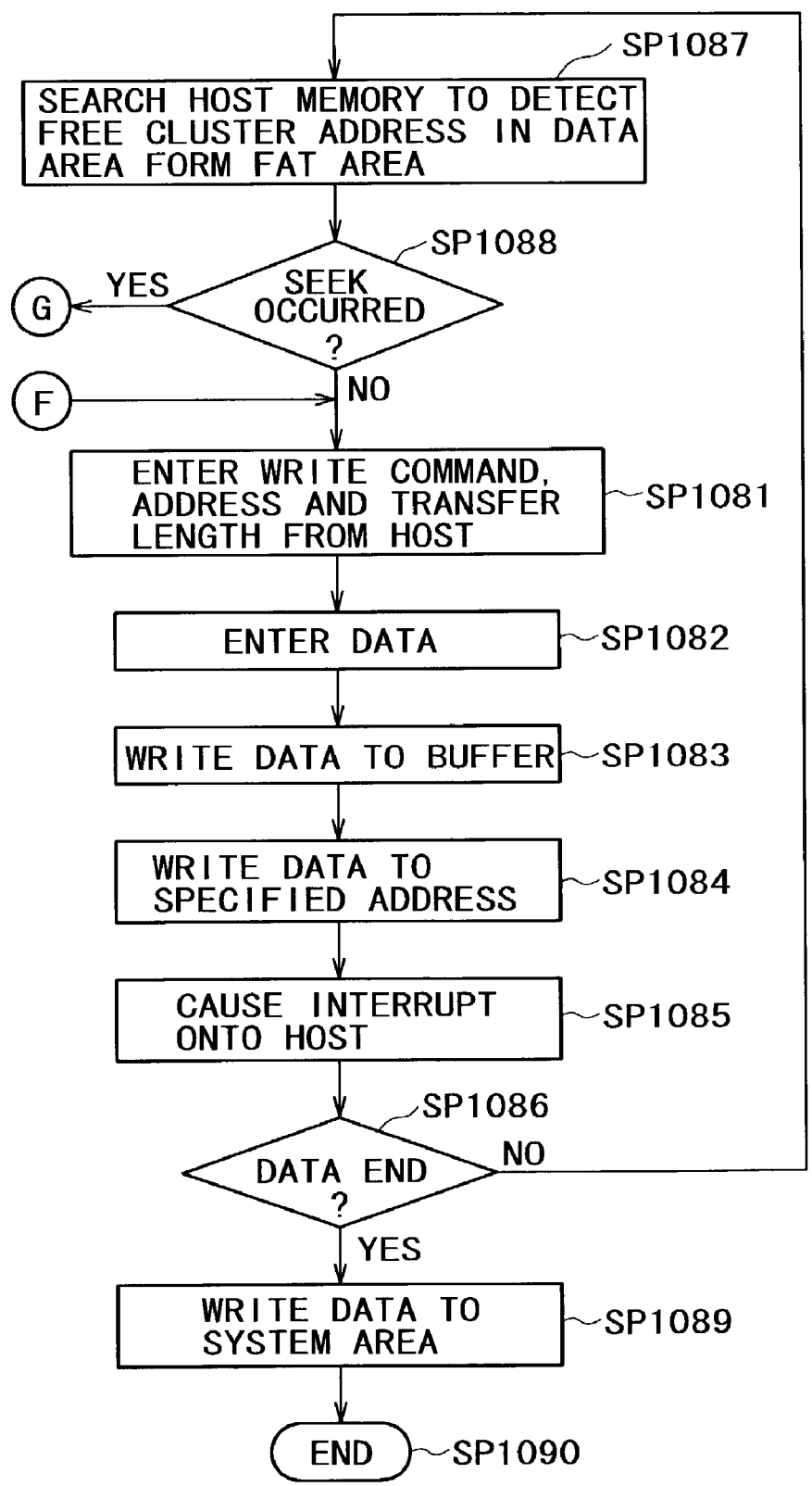
FIG. 48 is a flowchart continued from the flowchart shown in FIG. 47.

Referring to FIGS. 47 and 48, there are shown flowcharts describing the processing procedure at the time of writing. When a write command is issued, the central processing unit 1052 goes from step SP1071 to step SP1072 to search the control data recorded in the system memory 1011 to detect a cluster number to which a code indicative of free area from the AV data area.

When a free cluster address is detected, the central processing unit 1052 sets this free cluster address and the transfer length as parameters to issue a write command in step SP1073. In step SP1074, the central processing unit 1052 searches the system memory 1011 to detect continuous cluster numbers with a code indicative of free area set and detects, on the basis of these cluster numbers, the recording start position of the following AV data in advance.

In step SP1075, the central processing unit 1052 outputs a seek command for seeking the destination of recording these following AV data, which causes the hard disk apparatus 1043 to start seeking the following recording start position in advance. In step SP1076, the central processing unit 1052 converts the address specified by the write command entered in step SP1073 into the address in the AV data memory 1045 and, in response to the hard disk apparatus 1043 obtained by sequentially sending the commands, outputs the data to be recorded in step SP1077.

In step SP1078, the hard disk apparatus 1043 stores the AV data at the file start into the AV data memory 1045 and, upon storage, causes an interrupt onto the host apparatus 1042 in step SP1079. This causes the central processing unit 1052 to search the system memory 1011 in step SP1080 to detect continuous cluster numbers with a code indicative of free area from the data area within the predetermined number of clusters, thereby detecting the recording destination of the AV data which is the recording start position to which seek was made detected in step SP1074.

In step 1081, the central processing unit 1052 sets the free cluster address detected in step SP1080 and the transfer length as parameters to issue a write command and then transmits the data to be recorded to the hard disk apparatus 1043 by an amount equivalent to the transfer length in step SP1082. In step SP1083, the hard disk apparatus 1043 records the data transferred in response to the write command to the buffer memory 1010. In step SP1084, the hard disk apparatus 1043 records the data recorded in the buffer memory 1010 to the free cluster of the data specified by the host apparatus 1042.

Thus, at the start cluster specified in the write command issued in step SP1081, the hard disk apparatus 1043 is already waiting for the start of recording by the seek command issued in step SP1075. Consequently, the video camera 1041 can effectively prevent the access speed from being lowered by the seek operation performed at the start of recording.

When the recording of the data transmitted from the host apparatus 1042 has been completed as described above, the hard disk apparatus 1043 causes an interrupt onto the host apparatus 1042 in step SP1085. This causes the central processing unit 1052 to determine in step SP1086 whether or not the data to be recorded have all been transferred. If the decision is NO, then the central processing unit 1052 goes to step SP1087.

The central processing unit 1052 records the AV data of an amount equivalent to a predetermined period of time from the start of file to the AV data memory 1045 and the following AV data to the data area.

In step SP1087, the central processing unit 1052 searches the control data recorded in the system memory 1011 to detect continuous cluster numbers on which a code indicative of free area is set within the predetermined number of clusters from the data area.

In step SP1088, the central processing unit 1052 determines whether or not cluster numbers are continuous with the AV data area recorded before, thereby determining whether or not seek operation occurs when starting the recording of the data to the clusters detected in step SP1087. If the decision is NO, the central processing unit 1052 goes to step SP1081 to record the following AV data to the data area in the same manner as described above. If the decision is YES in step SP1088, then the central processing unit 1052 returns to step SP1072 and detects free clusters from the AV data area by ignoring the cluster numbers detected in step SP1087.

Consequently, if the a seek operation is required because the continuity in record area is lost, the central processing unit 1052 also records, to the AV data memory 1045, the AV data at the reproduction start position immediately after the seek operation.

In this case, too, the hard disk apparatus 1043 is already waiting for the start of recording because of the seek command issued in step SP1075 at the start cluster specified by the write command issued in step SP1081. Consequently, if a seek operation is performed because the continuity between the areas recorded with AV data on the hard disk 1044 is lost, the video camera 1041 can effectively prevent the access speed from being lowered by this seek operation.

When the data to be recorded have all been recorded to the hard disk 1044 by repeating the above-mentioned processing operations, the central processing unit 1052 gets YES in step SP1086. Then, the central processing unit 1052 goes from step SP1086 to step SP1089 and updates the data in the system entry area and the FAT area and directory area of the system memory 1011 so as to make them correspond to the recording of these AV data, going to step SP1090 to end this processing procedure.

Figure 49:
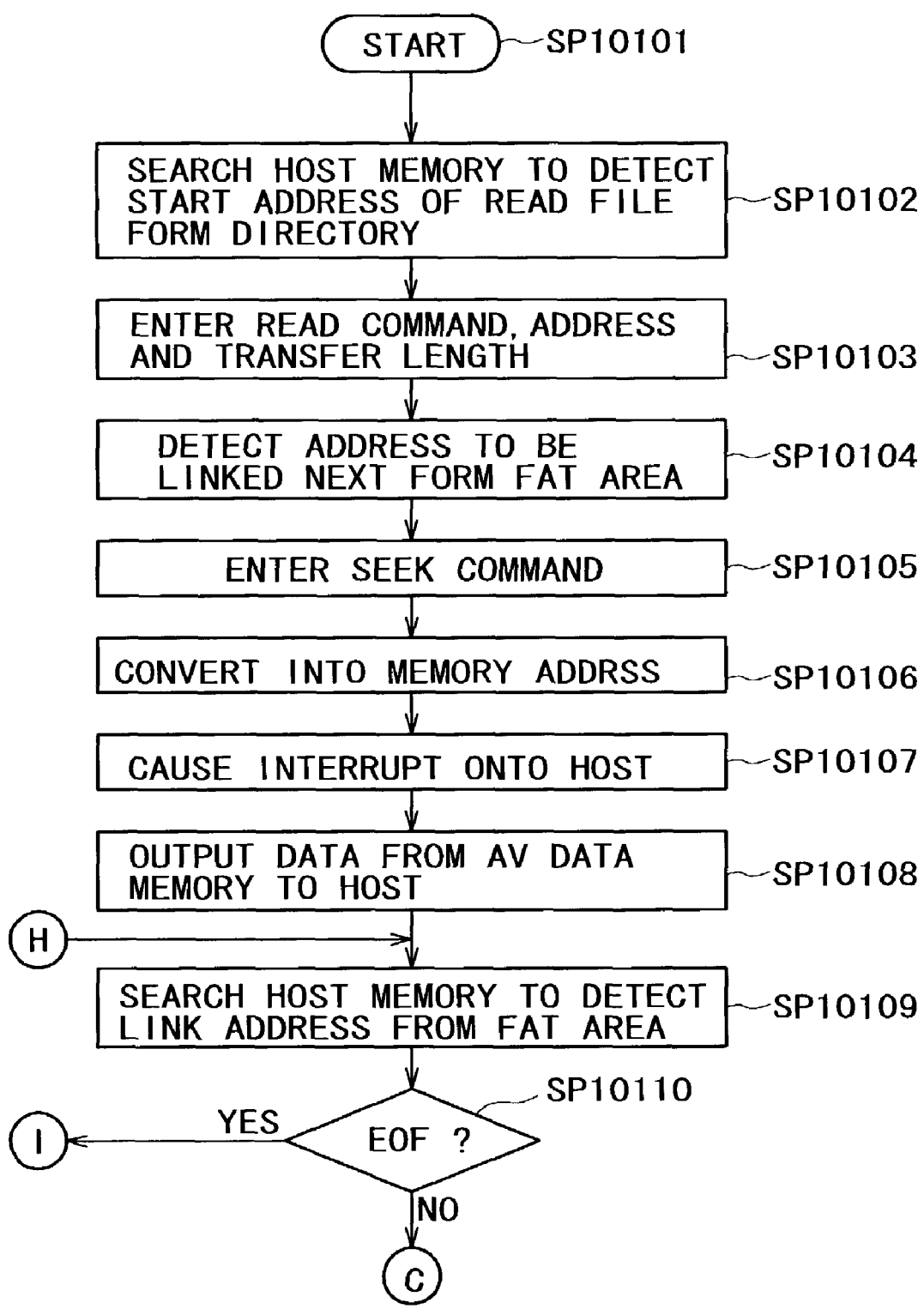
FIG. 49 is a flow chart describing a processing procedure at reading in the video camera shown in FIG. 44.
Figure 50:
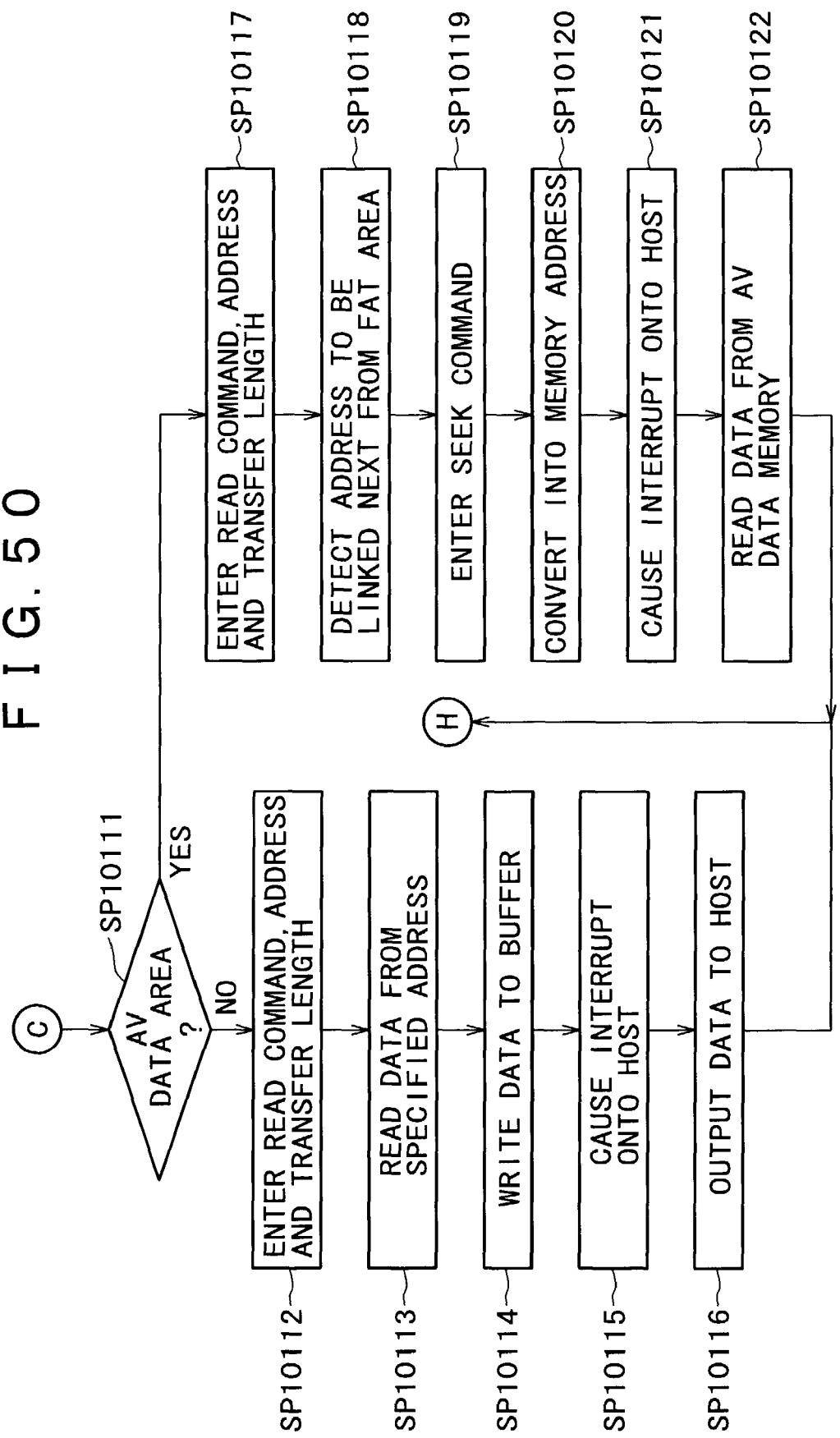
FIG. 50 is a flowchart continued from the flowchart shown in FIG. 49.
Figure 51:
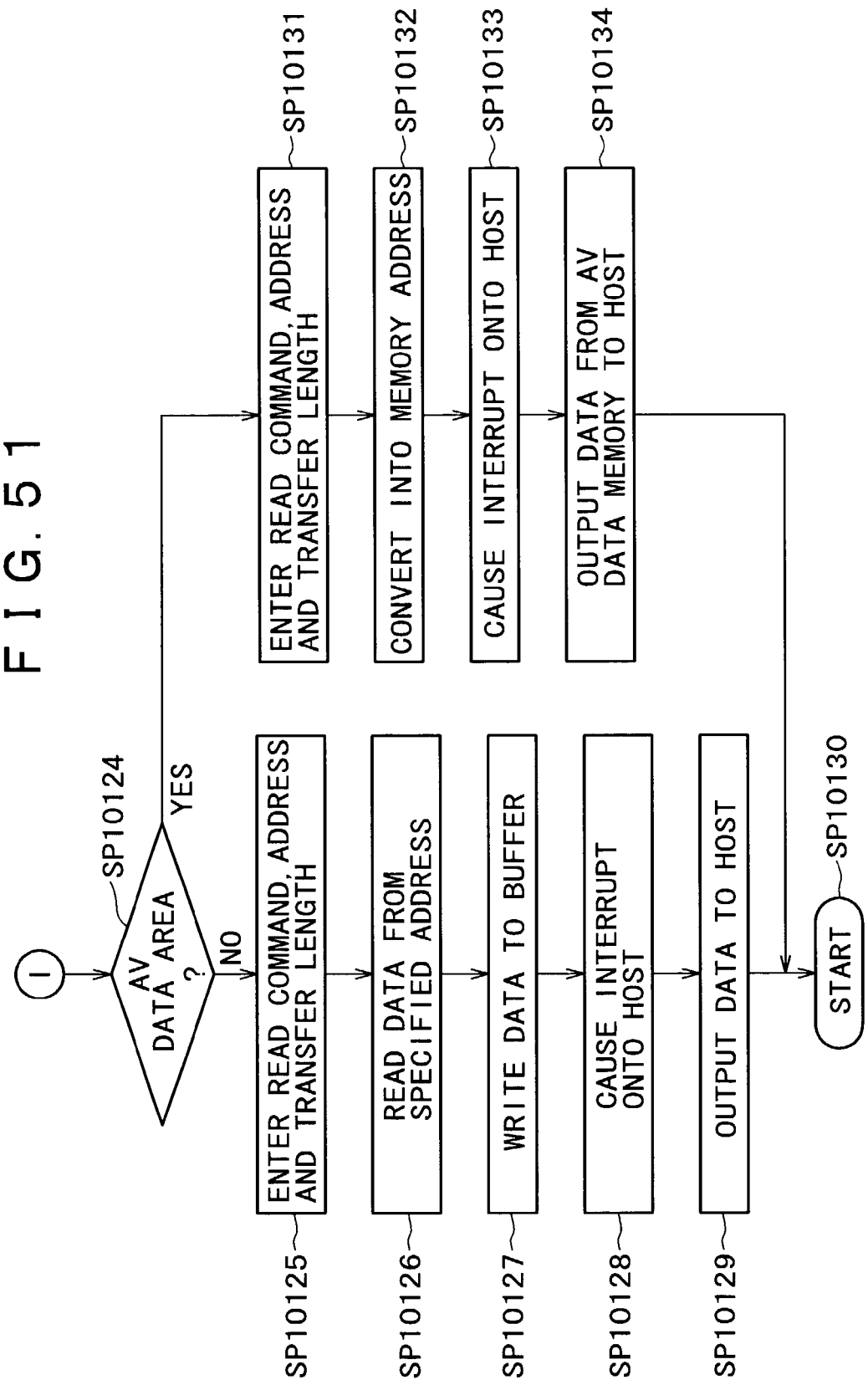
FIG. 51 is a flowchart continued from the flowchart shown in FIG. 50.

Referring to FIGS. 49 through 51, there are shown flowcharts describing a processing procedure for data reproduction. In this case, the central processing unit 1052 goes from step SP10101 to step SP10102 and searches the control data recorded in the system memory 1011 to detect the file control data of the corresponding file from the data in the directory area, thereby detecting the address based on the start cluster number of this file.

Upon detection of this start cluster number, the central processing unit 1052 goes to step SP10103 and sets the start cluster address and the transfer length as parameters to issue a read command. The cluster address attached to the command thus issued belongs to the AV data area by the recording processing described above.

In step SP10104, the central processing unit 1052 searches the FAT area data recorded in the system memory 1011 to detect the cluster address to be reproduced next. In step SP10105, the central processing unit 1052 issues a seek command to the hard disk apparatus 1043 on the basis of this detected next cluster address. Consequently, when reproducing the recording of the AV data area, the video camera 1041 also seeks, in advance, the reproduction start position to be reproduced next.

In step SP10106, to read the AV data corresponding to the command issued by the central processing unit 1052 from the AV data memory 1045, the hard disk apparatus 1043 converts the address set to this command into the address in the AV data memory 1045. In step SP10107, the hard disk apparatus 1043 causes an interrupt onto the host apparatus 1042. This causes the central processing unit 1052 to instructs the hard disk apparatus 1043 to transfer the AV data in step SP10108, outputting the corresponding AV data to the host apparatus 1042 from the AV data memory 1045.

In step SP10109, the host apparatus 1042 accesses the system memory 1011 to detect continuous cluster numbers recorded with the following AV data within the predetermined number of clusters. In step SP10110, the central processing unit 1052 determines whether or not an EOF code has been detected on these detected cluster numbers. If the decision is NO, the central processing unit 1052 goes to step SP10111 (FIG. 50).

The central processing unit 1052 determines whether or not the detected cluster numbers belong to the AV data area. If the decision is NO, the central processing unit 1052 goes to step SP10112 and sets parameters on the basis of the cluster numbers detected in step SP10109 to issue a read command. Thus, by the seek command issued in step SP10105, the hard disk apparatus 1043 is already waiting for the starting of reproduction at the start cluster specified in this read command. Consequently, when seeking the recording start position of each file, the video camera 1041 can also effectively prevent the access speed from being lowered by the seek operation.

In step SP10113, the hard disk apparatus 1043 reproduces the AV data from the corresponding clusters without executing any seek operation. In step SP10114, the hard disk apparatus 1043 records the reproduced AV data to the buffer memory 1010. When the reproduction of the AV data has been completed, the hard disk apparatus 1043 causes an interrupt onto the host apparatus 1042 in step SP10115. This causes the central processing unit 1052 to go to step SP10116 to instruct the hard disk apparatus 1023 to transfer the AV data, returning to step SP10109.

If AV data are recorded to continuous clusters, the video camera 1021 repeats the processing procedure of steps SP10109 to SP10110 to SP10111 to SP10112 to SP10113 to SP10114 to SP10115 to SP10116 to SP10119 to reproduce the AV data from the data area of the hard disk 1044 by a predetermined data amount, outputting the reproduced AV data to predetermined equipment.

If the continuity of clusters is lost, the decision of step SP10111 becomes YES, so that the central processing unit 1052 goes from step SP10111 to step SP10117 and issues a read command on the basis of the cluster address detected in step SP10109. In this case, by the above-described recording processing, the cluster address specified by this command indicates the AV data area.

In step SP10118, the central processing unit 1052 searches the system memory 1011 to detect the following cluster address. In step SP10119, the central processing unit 1052 issues a seek command on the basis of the detected cluster address. In step SP10120, in the hard disk apparatus 1043, the address set to this command is converted into the address in the AV data memory 1045. In step SP10121, the hard disk apparatus 1043 causes an interrupt onto the host apparatus 1042. This causes the central processing unit 1052 to instruct the hard disk apparatus 1023 to transfer the AV data. In step SP10122, the AV data are outputted to the host apparatus 1042, upon which the central processing unit 1052 returns to step SP10109.

Back in step SP10108, the central processing unit 1052 accesses the recording of the system memory 1011 to detect continuous cluster numbers recorded with the AV data within the predetermined number of clusters and sequentially executes the processing procedure of steps SP10110 to SP10111 to SP10112.

In this case, the hard disk apparatus 1043 is already waiting for the starting of reproduction by the seek command issued in step SP1019 at the start cluster specified in the read command issued in step SP10112. Consequently, if a seek operation is performed because the continuity between the areas recorded with the AV data on the hard disk 1044 is lost, the video camera 1041 can effectively prevent the access speed from being lowered by this seek operation.

When the end of file to be reproduced has been reached by repeating the above-mentioned processing procedure, an EOF code is found in the recording of the FAT area detected by accessing the system memory 1011. Consequently, the central processing unit 1052 gets YES in step SP10111, going to step SP10124 (FIG. 51).

The central processing unit 1052 determines whether the cluster number on which the EOF code has been detected belongs to the AV data area in step SP10124. If the decision is NO, the central processing unit 1052 goes to step SP10125 and sets the cluster number detected in step SP10109 as a parameter to issue a read command. In step SP10126, the hard disk apparatus 1023 reproduces the AV data from the corresponding cluster and records the reproduced AV data to the buffer memory 1010 in step SP10127. When the reproduction of the AV data has been completed, the hard disk apparatus 1023 causes an interrupt onto the host apparatus 1042 in step SP10128. This causes the central processing unit 1052 to instruct the hard disk apparatus 1043 to transfer the AV data, going to step SP10130 to end this processing procedure.

If the decision of step SP10124 is YES, the central processing unit 1052 goes to step SP10131 to issue a read command on the basis of the cluster address detected in step SP10109. In step SP10132, the hard disk apparatus 1043 converts the cluster address attached to this command into the address in the AV data memory 1045. In step SP10133, the hard disk apparatus 1043 causes an interrupt onto the host apparatus 1042. In response from the interrupted host apparatus 1042, the hard disk apparatus 1043 outputs the corresponding AV data from the AV data memory 1045 to the host apparatus 1042 in step SP10134, going to step SP10130 to end this processing procedure.

According to the configuration shown in FIG. 44, the AV data memory 1045 is constituted by a non-volatile memory, so that the same effects as those of the third embodiment can be provided without executing the processing of transferring the recording of the AV data area to the AV data memory 1045 and the processing of providing integrity between the recording of the AV data area and the recording of the AV data memory 1033.

By controlling this memory and the data area of the hard disk 1044 by the control data based on continuous cluster addresses, the hard disk apparatus side determines the address set to a command to output the data stored in the memory or the data reproduced from a recording medium selectively to command-associated equipment. This simple processing can effectively prevent waste power dissipation from occurring, thereby instantaneously outputting the data in each file. On the host apparatus side, a simple address control operation can perform these processing operations.

During a period of time in which it is difficult to record data to the hard disk 1044 because of a seek operation, AV data are recorded to the AV data memory and the following AV data are recorded to the hard disk 1044, thereby effectively preventing the access speed from being lowered by the seek operation also at the time of recording.

(9) Configuration of the Sixth Embodiment

A video camera practiced as a sixth embodiment of the invention records AV data to a hard disk along with a cueing index image. It should be noted that the configuration of the video camera practiced as the sixth embodiment is generally the same as that of the video camera shown in FIG. 44 except for the portion associated with the processing of the index image. Therefore, the following description will be made by use of the description of the configuration shown in FIG. 44.

In the video camera practiced as the sixth embodiment, after the user has set the operation mode to the camera mode, a central processing unit 1052 records, as one file, plural scenes imaged until this setting is reset to a hard disk apparatus 1043. In the recording of one file such as above, every time the user operates a trigger switch to start recording each scene, the central processing unit 1052 separately creates a still image for indexing by one field at the starting of recording. Further, the central processing unit 1052 records the created still image to a predetermined area of a hard disk 1044 along with a corresponding address and information such as recording time. Consequently, this video camera uses this still image and the information such as recording time as indexing information to instantaneously cueing any scene in each file.

In addition to the start for example of each file, the central processing unit 1052 controls the entire operation of the video camera such that AV data are selectively recorded to a AV data memory 1045 and other data to a data area for the reproduction start position based on the indexing set as above.

Consequently, in the present embodiment, also for the portion at which cueing reproduction starts set halfway in a file, the AV data recorded in the AV data memory 1045 are outputted during a period of time in which it is difficult to read the AV data from the hard disk 1044 by a seek operation. Therefore, the present embodiment can effectively prevent the access speed from being lowered by the seek operation for cueing.

When reproducing a file from a reproduction start position halfway in the file by holding the data of an amount equivalent to a predetermined period of time in the memory for each reproduction start position set halfway in the file as with the present embodiment, the present embodiment can effectively prevent waste power dissipation from occurring to instantaneously output the data of each desired file.

(10) Configuration of the Seventh Embodiment

Figure 52:
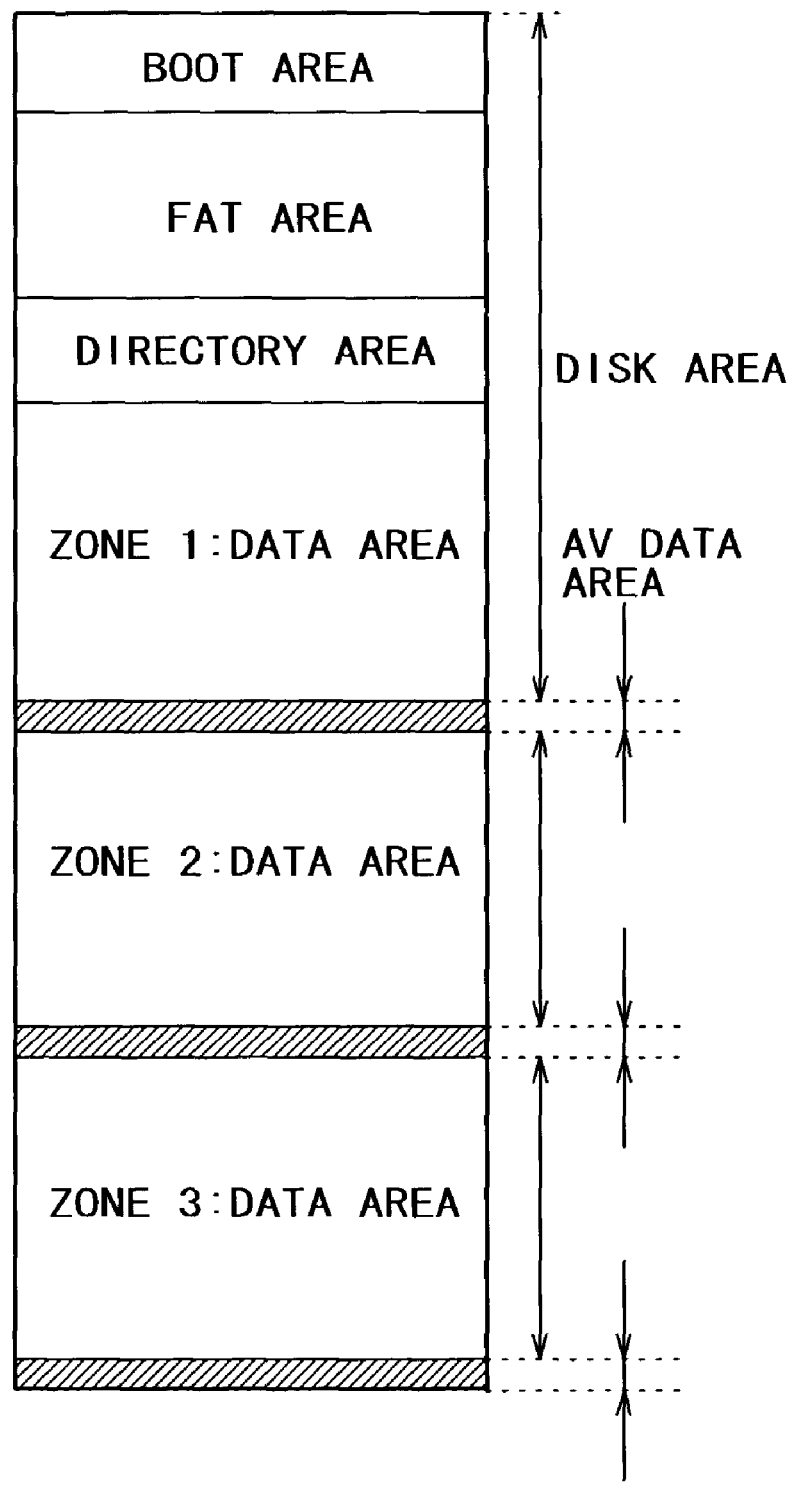
FIG. 52 is a diagram illustrating another example of recording areas.

In each of the above-mentioned embodiments of the invention, one AV data area is arranged for the entire data area of a hard disk. The present invention is not limited to this configuration. For example, as shown in FIG. 52 as contrasted with FIG. 45, the data area may be divided into plural areas and an AV data area may be arranged in each of the plural data area. This configuration can simplify the processing of searching for link clusters with the AV data area and the processing of detecting a free area in each AV data area.

In the above-mentioned sixth embodiment, the index is set by operating the trigger switch. The present invention is not limited to this configuration. For example, the index may be set by the user.

In the above-mentioned third and fourth embodiments, integrity is provided between the recording of the AV data memory and the recording of the AV data area after completing the recording of one file. The present invention is not limited to this configuration. For example, these processing operations may be executed concurrently with the recording of AV data to the hard disk.

In each of the above-mentioned embodiments, the cases have been described in which edit processing is executed by processing each individual file and by setting the sequence in which files are reproduced. The present invention is not limited to this configuration. For example, the present invention is widely applicable to the edit processing based on the setting of the in-point and out-point of an edit list. In this case, a portion set to an in-point requires a seek operation, so that the host apparatus side may reproduce AV data in advance for such a position in accordance with the recording of the edit list and record the reproduced AV data to the AV data memory.

In each of the above-mentioned embodiments, AV data of one frame (33 msec) are recorded to the AV data memory. The present invention is not limited to this configuration. One frame may be set to other periods of time as required.

In each of the above-mentioned embodiments, the present invention is applied to hard disk units based on the MS-DOS compliant file system. The present invention is not limited to this configuration. The present invention is widely applicable to the hard disk units based on various other file control systems. Also, the present invention is widely applicable to various other seek-requiring recording/reproducing units which use optical disks and magneto-optical disks.

As described and according to the invention, at the time of data reproduction, the data of the start portion of a position which must be accessed by a seek operation are recorded in a memory by a predetermined amount and, during a period of time in which it is difficult to reproduce the data from a disk type recording medium because of the seek operation, the data stored in this memory are outputted, thereby effectively preventing the access speed from being lowered by the seek operation. Consequently, the novel configuration realizes a high-speed access operation in AV data processing, thereby making it practicable to simultaneously recording or reproducing plural AV streams and execute the editing and dubbing of AV data without interruption.

Further, in each of the embodiments of the present invention, the data of an amount equivalent to a predetermined period of time from the reproduction start position are held in the memory. Consequently, the novel configuration can effectively prevent waste power dissipation from occurring, thereby instantaneously outputting the data of desired files.

While the preferred embodiments of the present invention have been described using specific terms, such description is for illustrative purposes only, and it is to be understood that changes and variations may be made without departing from the spirit or scope of the appended claims.

What is claimed is:

1. A hard disk apparatus for accessing a disk type recording medium, comprising:
    recording means for recording data to said disk type recording medium;
    seek means for making a pickup seeking a desired track;
    access means for signal-processing a reproduced signal obtained through said pickup to reproduce data recorded in said disk type recording medium;
    a buffer memory for holding data to be stored in the disk type recording medium;
    another memory for holding, when said data are recorded to said disk type recording medium, said data allocated to a portion which must be accessed by seeking at the time of reproduction at least for a period of time from starting of said seeking to a time at which said disk type recording medium becomes reproducible,
    selecting means for selectively outputting the data to the buffer memory or the another memory; and
    control means for controlling operations of said recording means, said seek means, said access means, and said another memory,
    wherein the start address of the portion which is accessed during seeking is set to a start position where a continuity of cluster number is lost during recording continuous data,
    wherein the control means sequentially detects a free area and sets a cluster address of a start position of the detected free area as parameters for issuing a write command,
    wherein if seeking is performed upon a losing of the continuity between cluster numbers, the control means records the data corresponding to the start position immediately after the seeking,
    wherein a system entry area of the recording medium is divided into a FAT area where recorded data is managed by the hard disk apparatus and a directory area where recorded data is managed by an external apparatus, and
    wherein, under the control of said control means, said data held in said another memory are outputted at least for a period in which it is difficult to reproduce data from said disk type recording medium because of the seeking by said seek means, and
    whereupon starting the driving of the recording medium upon instruction for reproduction to prevent power dissipation, the data held in the another memory is used until the recording medium becomes accessible, thereby effectively preventing waste power dissipation and instantaneously outputting the data of the file.

2. The hard disk apparatus according to claim 1, wherein said start portion is the start portion of a file.

3. The hard disk apparatus according to claim 1, wherein said disk type recording medium records said data in units of clusters of a predetermined data amount and said start portion is a start cluster that follows discontinuity of the recording to said continuous clusters.

4. The hard disk apparatus according to claim 1, wherein said start portion is a position set halfway in a file at which reproduction by cueing starts.

5. The hard disk apparatus according to claim 1, wherein, under the control of said control means, data reproduced from said disk type recording medium are recorded in said another memory with a predetermined timing and said data are held therein.

6. The hard disk apparatus according to claim 5, wherein said predetermined timing is a timing of startup.

7. The hard disk apparatus according to claim 5, wherein said predetermined timing is a timing after completion of the recording of one file to said disk type recording medium.

8. The hard disk apparatus according to claim 5, wherein said predetermined timing is a timing at which one file is divided into a plurality of files.

9. The hard disk apparatus according to claim 5, wherein said predetermined timing is a timing at which a portion halfway in one file is deleted.

10. The hard disk apparatus according to claim 1, wherein, under the control of said control means, at the time of recording said data to said disk type recording medium, said data to be recorded are recorded in said another memory at least for a period of time in which it is difficult to record data to said disk type recording medium because of the seeking by said seek means and data that follow said data to be recorded in said another memory to said disk type recording medium.

11. The hard disk apparatus according to claim 1, wherein said disk type recording medium records the same data as said data to be held in said another memory into a predetermined area and records data except for said data to be held in said another memory to an area other than said predetermined area.

12. The hard disk apparatus according to claim 1, wherein said another memory is a non-volatile memory.

13. A control method for a hard disk apparatus for accessing a disk type recording medium, comprising the steps of:
holding the data to be recorded to the disk type recording medium in a buffer memory;
recording, when said data are recorded to said disk type recording medium, in another memory, said data allocated to a portion which must be accessed by seeking at the time of reproduction at least for a period of time from starting of said seeking to a time at which said disk type recording medium becomes reproducible;
reproducing said data by outputting said data held in said another memory at least for a period in which it is difficult to reproduce data from said disk type recording medium because of the seeking, and
selectively outputting the data to the buffer memory or the another memory,
wherein the start address of the portion which is accessed during seeking is set to a start position where a continuity of cluster number is lost during recording continuous data,
wherein the hard disk apparatus sequentially detects a free area and sets a cluster address of a start position of the detected free area as parameters for issuing a write command,
wherein if seeking is performed upon a losing of the continuity between cluster numbers, the hard disk apparatus records the data corresponding to the start position immediately after the seeking,
wherein a system entry area of the recording medium is divided into a FAT area where recorded data is managed by the hard disk apparatus and a directory area where recorded data is managed by an external apparatus, and
whereupon starting the driving of the recording medium upon instruction for reproduction to prevent power dissipation, the data held in the another memory is used until the recording medium becomes accessible, thereby effectively preventing waste power dissipation and instantaneously outputting the data of the file.

14. A non-transitory computer readable medium storing a computer program for a hard disk apparatus for accessing a disk type recording medium, the program comprising the steps of: holding the data to be recorded in the disk type recording medium in a buffer memory; recording, when said data are recorded to said disk type recording medium, in another memory, said data allocated to a portion which must be accessed by seeking at the time of reproduction at least for a period of time from starting of said seeking to a time at which said disk type recording medium becomes reproducible; reproducing said data by outputting said data held in said another memory at least for a period in which it is difficult to reproduce data from said disk type recording medium because of the seeking, and selectively outputting the data to the buffer memory or the another memory; wherein said disk type recording medium is a heard disk apparatus, wherein the start address of the portion which is accessed during seeking is set to a start position where a continuity of cluster number is lost during recording continuous data, wherein the hard disk apparatus sequentially detects a free area and sets a cluster address of a start of the detected free area as parameters for issuing a write command, wherein if seeking is performed upon a losing of the continuity to the start position immediately after the seeking, wherein a system entry area of the recording medium is divided into a FAT area where recorded data is managed by an instruction for reproduction to prevent power dissipation, the data held in the another memory is used until the recording medium becomes accessible, thereby effectively preventing waste power dissipation and instantaneously outputting the data of the file.

* * * * *